AUTOMATIC TELEPHONE SYSTEM

Filed July 23, 1951 13 Sheets-Sheet 1

INVENTORS.
WILLIAM H. BLASHFIELD
JAMES M. BLACKHALL
ARNE OXAAL
WALTER J. BERGMAN
BY
Brown, Jackson, Boettcher & Dienner
ATTYS.

AUTOMATIC TELEPHONE SYSTEM

Filed July 23, 1951

13 Sheets-Sheet 2

INVENTORS.
WILLIAM H. BLASHFIELD
JAMES M. BLACKHALL
ARNE OXAAL
WALTER J. BERGMAN
BY Brown, Jackson, Boettcher & Dienner
ATTYS.

INVENTORS.
WILLIAM H. BLASHFIELD
JAMES M. BLACKHALL
ARNE OXAAL
WALTER J. BERGMAN
BY
Brown, Jackson, Boettcher & Dienner
ATTYS.

INVENTORS.
WILLIAM H. BLASHFIELD
JAMES M. BLACKHALL
ARNE OXAAL
WALTER J. BERGMAN
BY
Brown, Jackson, Boettcher & Dienner
ATTYS.

*INVENTORS*
WILLIAM H. BLASHFIELD
JAMES M. BLACKHALL
ARNE OXAAL
WALTER J. BERGMAN
*BY* Brown, Jackson, Boettcher & Dienner
ATTYS.

AUTOMATIC TELEPHONE SYSTEM

Filed July 23, 1951 13 Sheets-Sheet 6

INVENTORS.
WILLIAM H. BLASHFIELD
JAMES M. BLACKHALL
ARNE OXAAL
WALTER J. BERGMAN
BY Brown, Jackson, Boettcher & Dienner
ATTYS.

AUTOMATIC TELEPHONE SYSTEM

Filed July 23, 1951 13 Sheets-Sheet 7

INVENTORS.
WILLIAM H. BLASHFIELD
JAMES M. BLACKHALL
ARNE OXAAL
WALTER J. BERGMAN
BY Brown, Jackson, Boettcher & Dienner
ATTYS.

INVENTORS.
WILLIAM H. BLASHFIELD
JAMES M. BLACKHALL
ARNE OXAAL
WALTER J. BERGMAN
BY Brown, Jackson, Boettcher & Dienner
ATTYS.

Feb. 19, 1957 W. H. BLASHFIELD ET AL 2,782,257
AUTOMATIC TELEPHONE SYSTEM
Filed July 23, 1951 13 Sheets-Sheet 9

INVENTORS.
WILLIAM H. BLASHFIELD
JAMES M. BLACKHALL
BY ARNE OXAAL
WALTER J. BERGMAN
Brown, Jackson, Boettcher & Dienner
ATTYS.

AUTOMATIC TELEPHONE SYSTEM

Filed July 23, 1951

INVENTORS.
WILLIAM H. BLASHFIELD
JAMES M. BLACKHALL
ARNE OXAAL
WALTER J. BERGMAN
BY Brown, Jackson, Boettcher & Dienner
ATTYS.

Feb. 19, 1957 W. H. BLASHFIELD ET AL 2,782,257

AUTOMATIC TELEPHONE SYSTEM

Filed July 23, 1951 13 Sheets-Sheet 11

TAPE ILLUSTRATION

INVENTORS.
WILLIAM H. BLASHFIELD
JAMES M. BLACKHALL
ARNE OXAAL
WALTER J. BERGMAN

BY

Mason, Jackson, Boettcher & Diener

ATTYS.

INVENTORS.
WILLIAM H. BLASHFIELD
JAMES M. BLACKHALL
ARNE OXAAL
WALTER J. BERGMAN
BY Brown, Jackson, Boettcher & Dienner
ATTYS.

Feb. 19, 1957 W. H. BLASHFIELD ET AL 2,782,257

AUTOMATIC TELEPHONE SYSTEM

Filed July 23, 1951 13 Sheets-Sheet 13

INVENTORS.
WILLIAM H. BLASHFIELD
JAMES M. BLACKHALL
ARNE OXAAL
WALTER J. BERGMAN
BY Brown, Jackson, Boettcher & Dienner
ATTYS.

2,782,257

AUTOMATIC TELEPHONE SYSTEM

William H. Blashfield and James M. Blackhall, Galion, Arne Oxaal, Kenton, and Walter J. Bergman, Galion, Ohio, assignors to North Electric Company, a corporation of Ohio Application July 23, 1951, Serial No. 238,092

48 Claims. (Cl. 179—7.1)

The present invention relates in general to automatic telephone systems, and in particular to automatic toll ticketing equipment for use in an automatic telephone exchange.

With the recent rapid increase in the number of dial telephone installations and the consequent replacement of operators with automatic switching equipment, the problem of handling the so-called "short-haul" toll calls, as for example, the calls made between the dial exchanges in two neighboring or adjacent towns, has become particularly difficult. This is especially true in the case of small manual exchanges in which only one or two operators are required to handle local and toll calls prior to conversion to an automatic system. That is, it is apparent that if after conversion it is necessary to retain an operator to handle only the short haul toll calls, the conversion of the manual exchange to an automatic exchange cannot be justified, for the same operator could also handle the local switching.

The problem involved in the conversion of manual exchanges to completely automatic installations has long been recognized in the field, and there have been various partial solutions to the problem involving special trunking arrangements and special circuits to permit operators at distant points to complete toll calls. With the increased cost of operating manual exchanges, and the increased cost of line construction, these special trunking arrangements and circuits have become both complex and expensive and it has become increasingly apparent that the problem has not been satisfactorily solved by these prior methods. It is an object of this invention, therefore, to provide a toll ticketing arrangement which is adapted for use in automatic telephone exchanges, and specifically, for use in the smaller type exchanges, whereby the conversion of small exchanges to dial equipment is rendered economically feasible.

Simplicity and economy of equipment are of utmost importance in the provision of a ticketing system for use in a low rate, low volume traffic installation such as encountered in the smaller size telephone exchanges. In most of the known arrangements now used in the establishment of toll calls between automatic exchanges, certain of these qualifications have been conspicuously absent.

In a first arrangement, conventionally known as the so-called "dial back" system, an operator is located at only one of two or more exchanges, and a toll call to a subscriber in a distant exchange by a subscriber in an automatic exchange which does not have an operator, is established by first dialling the operator's office, who then dials back over the trunk on which the call was received to complete the connection to the subscriber at the desired exchange. Such procedure, while eliminating the operator in at least one exchange in a group, requires additional expensive toll line equipment, as it restricts both the circuit to the operator office and the circuit between the dial exchanges from further use during the period of a call.

A modification of the dial back system which has been used to reduce the circuit usage, permits the operator to release the trunk to her office as the connection is established, whereby only the toll line between the subscribers in the two dial exchanges is held for the call duration. With the operator released, however, it is not possible to time the call, and certain subscribers recognizing this condition tend to engage in unnecessarily long conversations from which no corresponding revenue is derived. Automatic time disconnect can, of course, be provided in some instances to interrupt the call after a predetermined time, but experience has shown that such arrangement generally meets with unfavorable customer reaction.

Another modified arrangement comprises adaptation of the exchanges of two short haul exchanges for connection through a third office at which an operator is available. This method is also wasteful of toll line mileage, as a route through the manual office may be considerably longer than the direct route between the two dial exchanges. Furthermore the services of an operator on short haul calls may cost more than the revenue derived from the call.

A third practice is to abandon the toll charge between adjacent automatic exchanges, thereby permitting subscribers to dial nearby exchanges on what is known as a "free service" basis. It must be realized, however, that the term "free service" is misleading as the cost of providing this service must be spread among all the subscribers at both exchanges. Thus the subscribers who make little use of the so-called "free service" are helping to pay for the parties who have occasion to use such facility on a more extensive basis. Furthermore "free service" increases the amount of traffic so that an operating company may be faced with the necessity of constantly providing more circuits between the exchanges. "Free service" systems have therefore generally proven unsatisfactory as an answer to the problem of conversion.

During the recent period of wide spread conversion of small exchanges to dial operation these problems have become increasingly troublesome and the need for some form of automatic ticketing equipment which permits a toll call in a dial system to be completed in a manner similar to a local call therein has become particularly apparent. Inasmuch as revenue must be derived on an equitable basis from the parties who use the service, it follows that the ticketing equipment must include means for automatically recording given information concerning each call which is so made for subsequent billing purposes.

It is a specific object of this invention therefore to provide ticketing equipment which provides an equitable basis for billing subscribers, and specifically, to provide equipment of a simple design and economical construction which is especially adapted for use in the ticketing of calls in low rate, low volume traffic installations. It is another object of the invention to provide equipment which is readily transferable from one location to another, to thereby insure maximum usage of the investment of the operating companies. It is a further specific object of the invention to provide toll ticketing equipment of an economical type which is readily adapted for use with existing automatic exchanges.

Further objects and features of the invention will become apparent from the following specification and claims when taken with reference to the accompanying drawings in which:

Figure 14 is a block layout of the manner in which Figures 2–10 are arranged to illustrate the invention.

GENERAL DESCRIPTION

Figure 1:
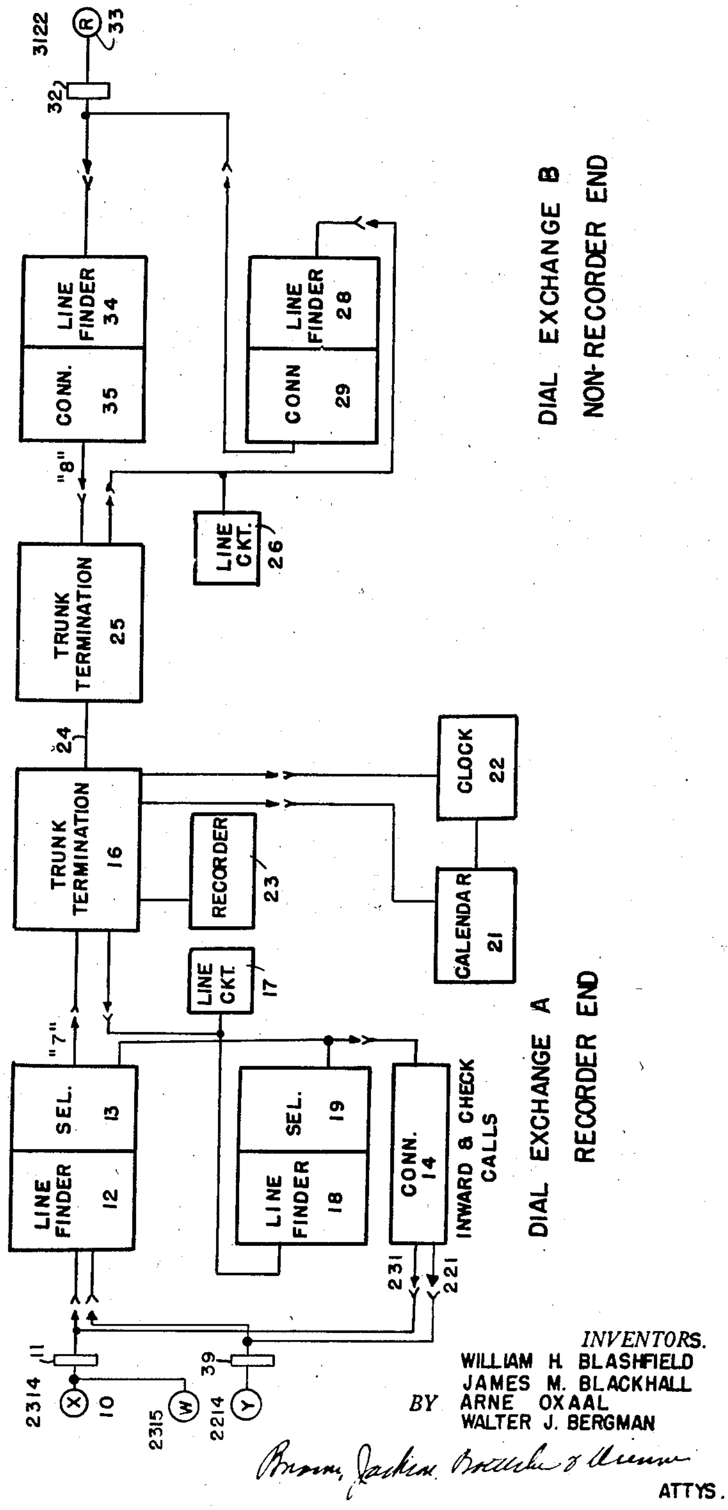
Figure 1 illustrates in schematic block form a pair of automatic telephone exchanges which is adapted to provide automatic ticketing of calls established therebetween.
Figure 2:
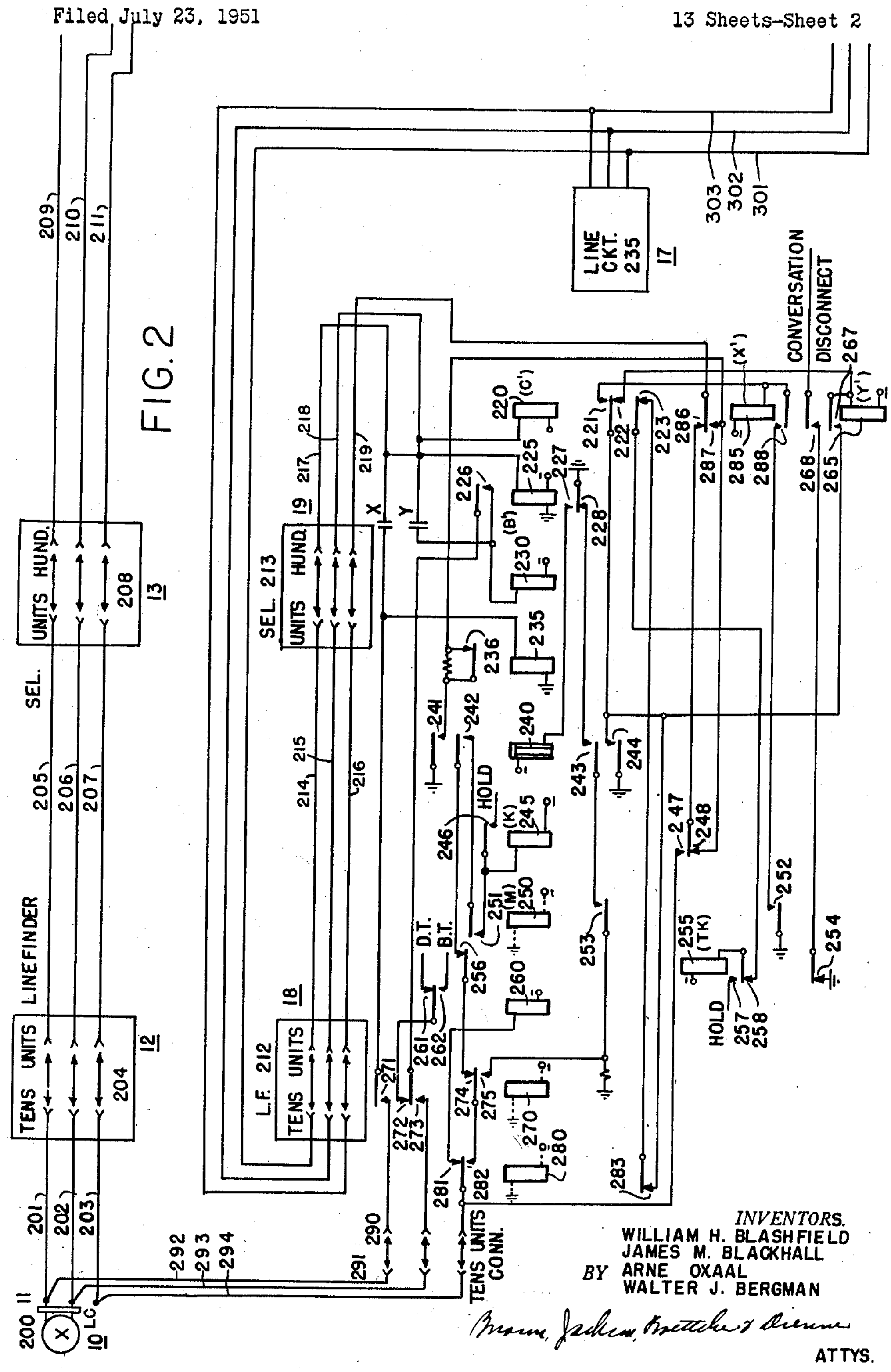
Figures 2–5 illustrate the equipment at the recorder and of the arrangement (exchange A) including the local switching units, trunk circuits and the register equipment individual thereto.
Figure 3:
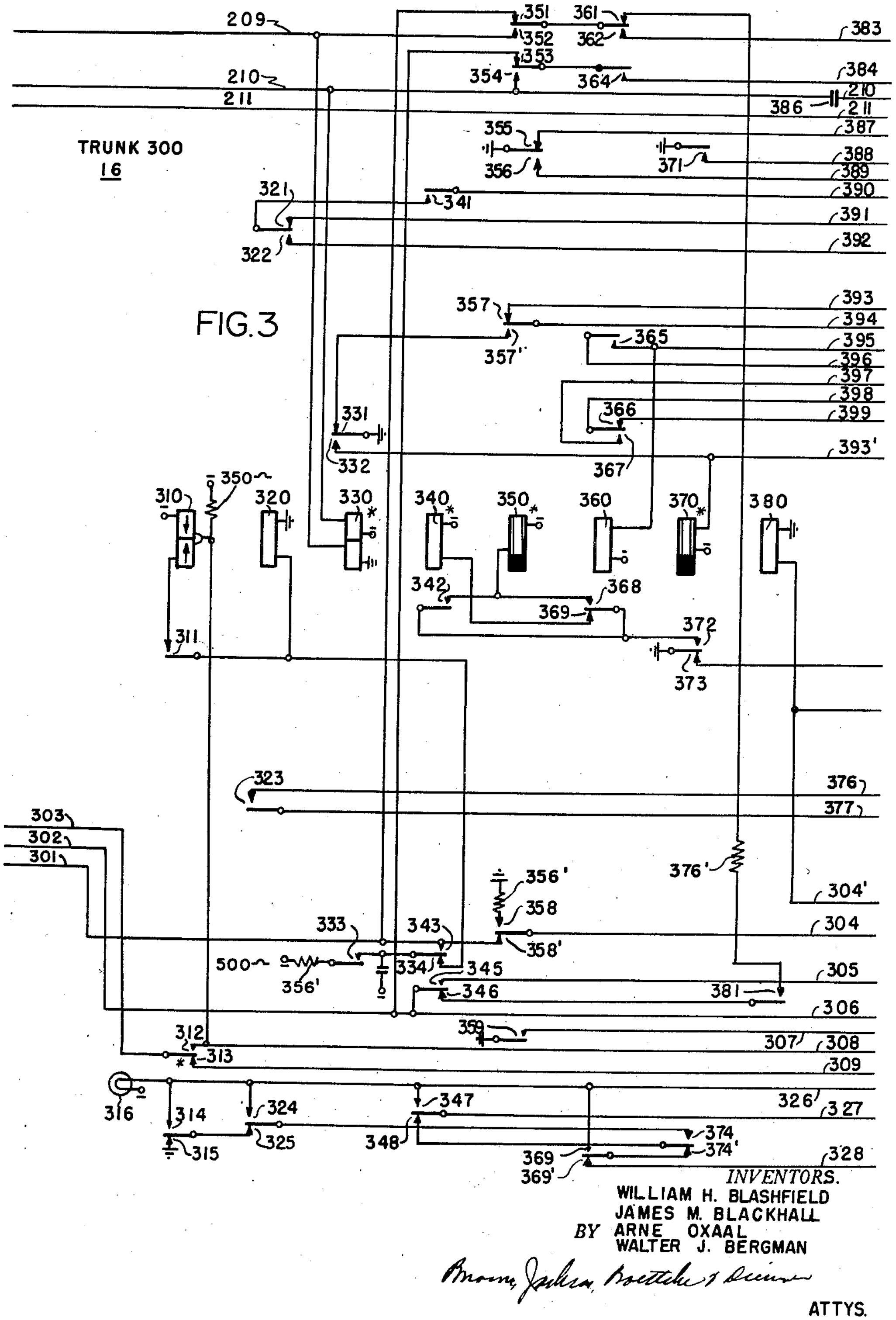
Figure 4:
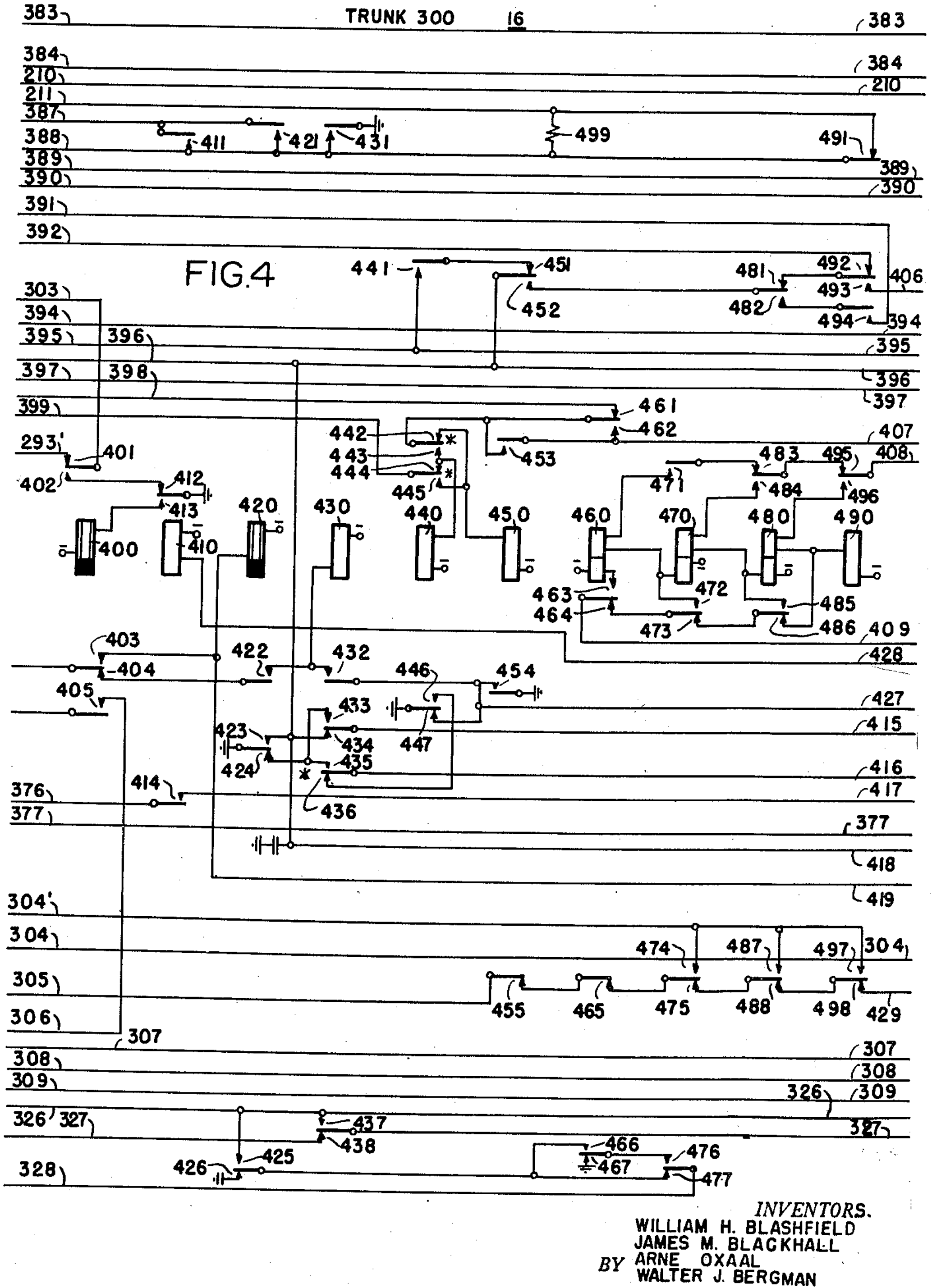

The automatic ticketing equipment of the invention is basically operative to effect the registration of the calling number, called number, talking time and the particular month, day and hour and tenth of hour of each call established between exchange A and exchange B. While the ticketing equipment in the present embodiment is illustrated as becoming effective with the establishment of a call from a subscriber of one exchange to a subscriber in a distant exchange, it is obvious, of course, that calls between local subscribers may be similarly ticketed if so desired.

One of the distinguishing features of the present arrangement is the manner in which the calling the subscriber is required to identify his line with the establishment of a call to be ticketed by dialling his own number prior to the dialling of the called subscriber number. Such manner of identification is essential to the elimination of a large amount of automatic identifying units and the provision of an economical and practical type arrangement. In the provision of identifying means of this type, it is of course essential to provide a checking system to prevent unscrupulous parties from dialling the line number of another subscriber to escape billing for the call. A further feature of the invention is the manner in which a regular switching link in the local exchange is seized in response to the dialling of the number of the calling party and is automatically operative to verify the fact that the dialling was received from the line indicated. The elimination of special links for checking purposes is a further advance in the provision of an economical type ticketing arrangement.

The method of recording the information concerning a call as established must also be of the simplest nature in order to keep the cost within reason. The equipment of the arrangement is adapted to meet this requirement, each of the trunk circuits being adapted to receive both the calling and called numbers directly from the dial and to effect the direct recording of these pulses with no intervening translating equipment. Each trunk has its own recorder which comprises two simple magnet members for punching and stepping an associate tape in accordance with the nature of the pulses received.

The recorder consists basically of a punch magnet adapted to perforate a tape and a step magnet to feed the tape through the recorder. The step magnet operates each time the punch magnet is energized and also can be operated independently to provide additional spaces between series of perforations. Specifically, each trunk comprises a pulsing unit which is operated directly by the pulses received over the established connection to operate the punch to perforate the tape member a number of times corresponding to the value of the digits received with a space between digits, wider spaces between groups of information, and a still wider space between calls. The duration of the conversation is registered by a common clock which via a trunk effects the punching of a hole once each minute, and the date and time of day are recorded digitally from a calendar as will be described hereinafter. Only one clock with fifteen second and six minute contacts and one calendar are used in the arrangement.

One end of the arrangement is designated as a recorder end and the other end as the non-recorder end, whereby only one exchange need be equipped with recorder equipment. The trunk equipment used in extending connections between the exchanges comprises the well known two-way trunk repeater type circuits, each trunk circuit at the recorder end including a register unit, whereby whenever a pair of trunk circuits are utilized in the establishment of a connection in either direction, the information is registered on the register at the recorder trunk.

In the establishment of a call over the system, the subscriber first dials a single digit trunk code to seize the desired trunk equipment, then dials his own number, followed by the desired number in the distant exchange. Ringing, answering, talking and release follow as on the local exchange call. Assuming the call originated from the recording end, the dialing of the trunk code completes a circuit for the subscriber's telephone through the regular exchange link to the trunk. The trunk immediately seizes a regular link for checking purposes and when the subscriber dials his own number immediately thereafter, the impulses are registered on the recorder and are also transmitted to the link which has been seized for checking purposes.

With the dialling of his line number a connection is extended through the link, which has been seized for checking purposes, back to the calling line. At this time the trunk circuit momentarily flashes (answers and unanswers) the regular link, and the calling line receives answer supervision in the normal manner, which supervision is picked up by the check link and carried back to the trunk. If the flash received by the trunk over the local loop circuit coincides with the one transmitted, the identity of the calling line is verified. If the subscriber dials a line number other than his own, the loop back through the check link is not completed, and the flash is not received, in which case the trunk returns busy signal and blocks further dialling. As soon as the check has been made, the link which has been seized for checking, automatically releases and is made available for other calls. The links can, of course, be a special set of links, but the use of regular exchange links modified to transmit supervision back to the links in the necessary manner is considered an essential feature of the invention.

When the subscriber dials the called number (assuming that his own number has been checked satisfactorily), the digits are registered on the recorder associated with the seized trunk and are simultaneously transmitted over the trunk to the distant office where the connection is completed in the normal manner. When the call is answered the trunk engages a timer and calendar equipment which is common to all the trunks. The timer consists of a clock which transmits an impulse once each fifteen seconds to any trunk that has been answered which trunk counts the impulses and translates them to minutes thereby recording as perforations the duration of conversations in minutes. Specifically, a hole is punched on answer and once each minute thereafter, so that the total number of holes represents the total chargeable minutes for the call. The calendar comprises relay counting circuits, or rotary switches, or mechanically geared contacts, which are driven from the clock at six minute intervals to register the time of day and date, and when the trunk is connected to the calendar, the calendar transmits digit impulses to the recorder representing the month, day and time of day. The information is recorded on a decimal basis with two digits for the month, two digits for the day, two digits for the hour of day, and one digit for the tenth of the hour.

When the calling party hangs up following completion of a call, the local exchange links are released so that the local lines are immediately available for further calls. The seized trunk is held however, even if release should follow close upon answer, until it receives the month, date and time of day from the calendar. If the calendar is busy transmitting information to some other trunk at that time the trunk is held until the calendar is free. If several trunks are waiting for the calendar while in use, the calendar is effective on its release and reseizure to transmit the information to all of the trunks simultaneously.

If the subscriber encounters a busy line, or all trunks or all lines busy condition, the usual busy signal is transmitted and the subscriber hangs up. In this case, or in case the called number does not answer, the call is registered as incomplete, and no elapsed time or calendar information is punched on the tape for that call.

A call originating at the distant non-recorder end of the trunk proceeds in the same manner as described above except that in such event the dialling of the subscriber's own number is transmitted over the trunk so that it may be received by the recorder and a preliminary punch is not made in the tape to indicate that the calling subscriber is at the non-recorder end (exchange B).

While no specific automatic means have been shown herewith to translate the information from the tape into subscriber bills, a number of methods can be used depending upon the volume of material to be handled. The volume of calls, of course, determines the amount of revenue which is available for mechanization of tape reading and billing.

SPECIFIC INSTALLATIONS FOR TOWNS A AND B

The equipment of the invention is shown in a specific telephone installation including a first telephone exchange A which is interconnected with at least one short haul toll exchange, such as the illustrated dial exchange B. The so-called short haul toll exchanges usually comprise telephone exchanges which are located at removed towns, but are sufficiently close to require interconnecting by a series of trunk circuits 16—25 and trunk lines 24. In the arrangement as disclosed in Figure 1, each of the subscribers in the exchange A may have access to the other subscribers in exchange A by dialling the directory number which is preassigned thereto and may have access to the subscribers in exchange B by dialling a given toll number, his own directory number and the directory number of desired subscriber in the remote exchange B. Information concerning the call is automatically registered on recorder equipment 23 which is associated with each trunk, such as 16, at the recorder end (exchange A), such information including the directory number of the called party and calling party and the month, date and time of hour of initiation of the call as well as the duration of the call.

Specifically, exchange A is illustrated as comprising conventional switching equipment of the line finder selector link and connector switch classifications. Subscribers of exchange A are arranged to have access to other subscribers in the exchange over associated line circuits, line finder selector links and connector switches by dialling the assigned directory numbers. In the illustrated arrangement, level "7" has been assigned to the toll trunk equipment and accordingly none of the local subscribers will have a first number of seven. The remaining levels 1–6 and 8–9 of the selector switch are assigned for local subscriber connections. Level 0 has been reserved for use by the subscribers in reaching the toll operator for long distance calls. By reason of their conventional nature the line circuits 11, line finder selector links 12, 13 and 18, 19 and connector switches 14 have been shown only generally in most instances.

The number of trunk circuits, such as trunk 16, which are accessible over level 7, for example, in the exchange, will vary with the number of subscribers in the exchange and the normal amount of traffic between the subscribers of exchanges A and B.

Figure 5:
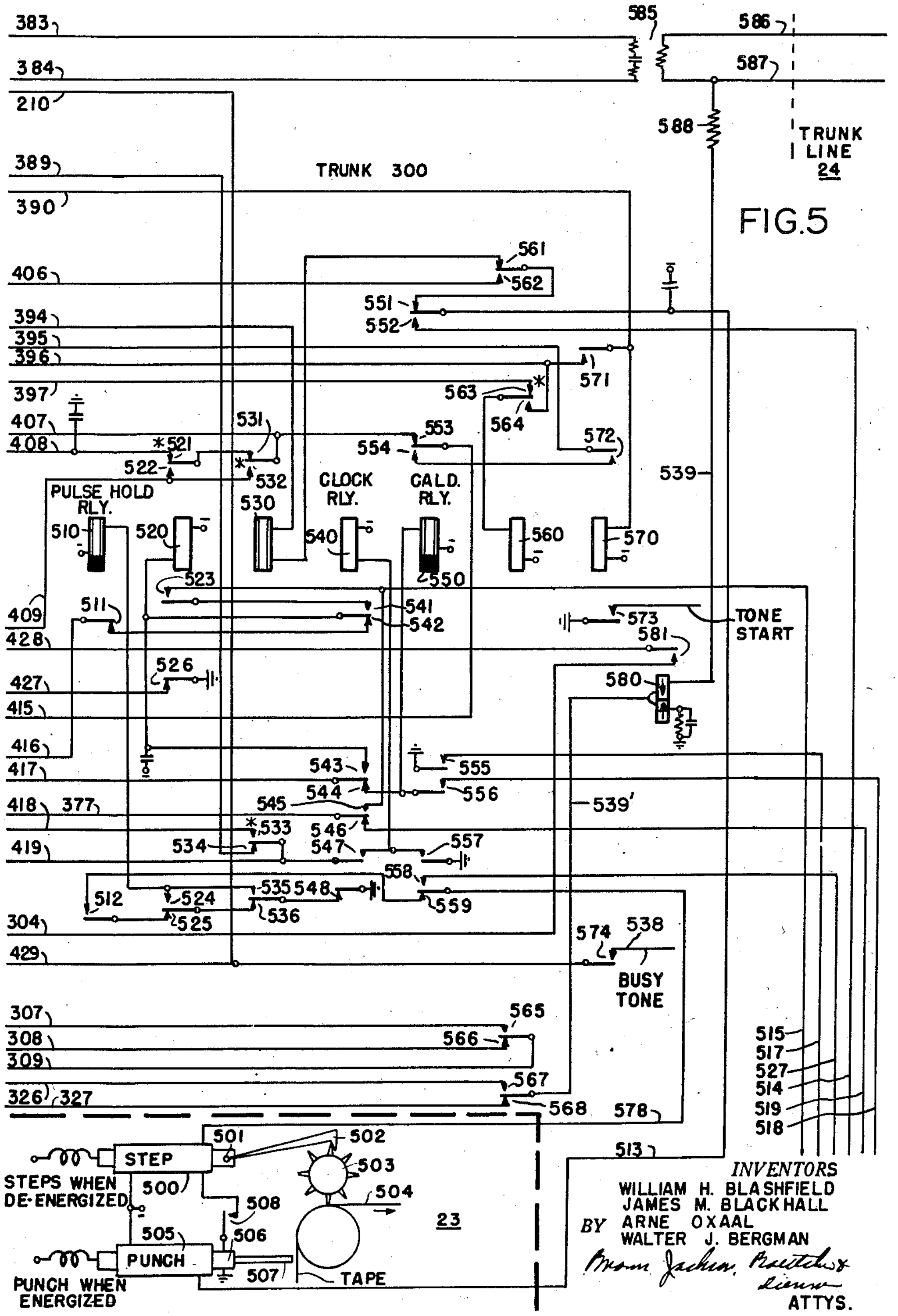

Each trunk circuit 16 has associated therewith an individual recorder unit, such as generally illustrated at 23, which is adapted to punch holes in an associated tape member 504 which are indicative of the information pertaining to each call established over the associated trunk circuit. The recorder 23 comprises a punch magnet 505 and a step magnet 500 (Figure 5) which are actuated by contacts 506 on the punch magnet so that the tape 504 is advanced after each registration of a punch. Step magnet 500 is also arranged to be operated independently by the trunk equipment 16 to produce spaces between the digits of each number and between the respective calls registered thereon.

The recorder end of the arrangement (exchange A) includes a calendar unit 21 and a clock unit 22 and each of the trunks, such as 16, at exchange A have access to this equipment. The calendar 22 transmits pulses to the trunk to register the month, day, hour, and hours in tenths; thus 2:30 p. m. on August 18th will be registered as 08 18 145 (8th month, 18th day, 14.5 hour). The calendar 21 is protected against seizure while operating, although if several trunks are waiting as the calendar restores, upon reseizure of the calendar, information is transmitted simultaneously to all trunks awaiting the information.

The clock unit 22 is common to all trunks 16 and punches the tape once each minute for the duration of each answered call. The clock, which transmits a pulse every fifteen seconds may be connected to any number of trunks simultaneously.

Each trunk circuit, such as illustrated trunk 16, has access to the regular exchange links, such as 18, 19 in exchange A over associated line circuit equipment, such as illustrated at 17. Both inward calls (i. e. calls from exchange B) and check calls established over the trunk circuit 16 are extended over the regular links, such as illustrated links 18, 19. Trunk circuit 16 further has access to a preassigned trunk line, such as generally illustrated at 24, which extends to associated trunk equipment in exchange B. The trunk line 24 is a composite trunk, that is, two way signalling and a talking connection are both effected thereover.

The equipment at exchange B (non-recorder end) is somewhat less extensive, and comprises a trunk circuit 25 paired with trunk 16 at exchange A and having access over line circuit equipment, such as 26, to regular link equipment 28, 29 for calls incoming to exchange B as well as for checking purposes. The trunk 25 is accessible to subscribers in exchange B for calls to subscribers in exchange A over somewhat conventional line circuits 32 and line finder selector links 34 and 35, the eighth level of the selector in this example being reserved for such traffic. Each subscriber of exchange B, such as illustrated subscriber 33, has access to the local subscribers in exchange B over certain other levels of the regular links 34, 35 etc. It is apparent therefrom that the equipment requirements of the arrangement at both stations are small and economical as compared to known ticketing systems.

There are other modifications of exchange layouts and interconnections which are illustrated hereinafter, the particular arrangement of Figure 1 being shown merely for exemplary purposes.

GENERAL OPERATION

A. *Local calls*

The operation of the equipment to extend a local call initiated at any one of the telephone substations in exchange A, as for example the subscriber X at substation 10 to another of the subscribers in exchange A, as for example, the subscriber Y at substation 40 is now set forth briefly hereat, the details of the circuit arrangements being omitted in view of their somewhat conventional nature.

The calling subscriber X at substation 10 lifts his receiver from its switch hook in the conventional manner to energize associated line circuit equipment, illustrated generally at 11, which effects the energization of a preassigned one of a group of associated line finder-selector links, such as the one illustrated generally at 12, 13.

Assuming that the illustrated link 12, 13 has been assigned by the equipment for use in the connection initiated by the calling subscriber, the line finder switch 12 of the link now operates to select the line of the calling subscriber X and to connect it through to the conductors of the associated selector switch 13 of the link 12, 13. When the line of calling subscriber X is seized and extended by way of finder switch 12 to the associated selector switch 13, it is marked as busy to the connector switches in the exchange to prevent seizure thereof by any of the other subscribers in the exchange during the extension of the call by the subscriber X. Control equipment in the seized link 12, 13 automatically responds to the impulses of the first digit as transmitted by the conventional impulsing device provided at substation 10 of subscriber X.

In conventional manner each of the subscriber substations is assigned a directory number comprising a hundreds digit, a tens digit, a units digit and a ringing digit and the dialling of these numbers in the order named by a calling subscriber will cause the automatic switches to respond thereto and to select the corresponding one of the subscribers in the exchange. Larger exchanges will, of course, have thousands digits and possibly ten thousands digits as well.

The operation of exchange switching may best be illustrated by assigning a directory number to the called party Y, as for example 2214. In extending the call to subscriber Y, subscriber X removes his handset to effect seizure of an associated link such as 12, 13 and with seizure thereof dial tone is transmitted over the connection to the calling party X to indicate that the directory number may now be dialled. As the subscriber X at station 10 now dials the directory number 2214, the selector switch 13 responds to the impulses of hundreds digit two to select an idle one of the second hundreds group of connector switches, such as illustrated generally at 14.

Assuming the illustrated connector switch 14 is idle and is selected from the second hundreds group by the selector 13, the connector switch 14 will respond to receipt of the tens digit two to select the second group of tens lines which includes the called line 2214. Thereafter and in response to dialling of the units digit 1, the called line having directory number 221 is selected by the connector from the selected group of tens lines. When the called line has been thus selected, the control apparatus included in the connector circuit functions to test this line for the purpose of determining the busy or idle condition of such line. In the event that the called party line is in use, busy tone is applied over the connection to the calling party to indicate to him that the desired connection with subscriber Y cannot be completed at this time.

Should the called line be idle at the time of selection, the code selection or ringing digit, digit 4, will cause a selected coded ringing current which is assigned to subscriber Y to be applied to the side of the line to which the ringer of the telephone substation of subscriber Y is connected. During the ringing operation, ring back tone current is applied to the loop to indicate to the calling party X at substation 10 that the substation having directory number 2214 is being signaled.

The connection between the calling and called telephone stations is completed on removal of the receiver at the called telephone substation 40.

The switching may be of the common control type in which certain of the operating equipment is utilized only in the establishment of the call and is cleared as the called party answers. The switching equipment may also be of the type in which the link utilized in setting up the desired connection is released only when the connection is cleared by the calling or called station.

REVERTING CALLS

Switching apparatus located in exchange A may also be utilized in setting up a connection between two telephone stations connected to the same subscriber line, as for example, between parties W and X on line 231. Subscriber W is shown as having directory number 2315. The sole purpose of operation of the apparatus in such application is to apply ringing current of the proper code to the mutual line of the subscribers whereby the party being called may respond to his particular signal. In setting up a connection of this nature, the call is initiated over the line equipment in the manner heretofore described.

Following the dialling of the digits of the directory number of subscriber W by subscriber X, the calling party X replaces his receiver upon its switch hook, whereupon the switching units of link 12, 13 are released and the seized connector switch, such as 14, is held. The ringing current of the selected code which is assigned to the substation of subscriber W is applied to their mutual line by the seized connector switch 14, and as the call is answered by the subscriber W, the seized connector switch, link such as 14, is released. The common line circuit 11 is maintained operated however to render the mutual line of the subscribers busy to other connectors, to thereby prevent seizure of the line by a connector switch in the event that another subscriber in the exchange is attempting to extend a call to one of the substations on the line 231 during the use thereof.

Line circuit 11 is released when the connection is released by both subscribers W and X respectively.

SHORT HAUL CONNECTIONS

Calls to subscribers in the interconnected short haul exchanges, such as illustrated exchange B, are made by subscribers in exchange A over the same link equipment, such as 12, 13, and the trunk equipment 16. As illustrated in Figure 1, the subscribers of exchange A, such as WXY, have access over a given level of the automatic switches to trunk circuits, such as 16, which are interconnected with cooperating trunk circuits, such as 25, in exchange B by means of trunk lines, such as 24. The trunk circuits are operative to extend the called number of the desired subscriber to the automatic switching equipment at exchange B to establish the desired connection thereat. Calls from the subscribers of exchange B to desired subscribers in exchange A can also be established over the trunk circuits 16—25 and the switching equipment at each of the exchanges A and B.

Briefly, a subscriber in exchange A, such as W, X, Y etc. may gain access to a short haul trunk circuit, such as 16, which extends to exchange B by removing his handset to effect operation of the line circuit 11 in the seizure of an idle link such as 12, 13 and the dialling of the preassigned digit seven responsive to the return of dial tone to the substation by the seized link.

The selector switch 13 of the seized link selects an idle trunk responsive to the dialling of digit 7 by the calling subscriber, and the trunk equipment immediately controls the recorder 23 to insert a preliminary punch on the recorder tape 504 to indicate that the call is being made from the recorder end of the equipment. The trunk 16 further effects the operation of an associated line circuit, such as illustrated at 17, to seize a local line-finder selector link, such as the link indicated at 18, 19, for checking purposes. It is to be understood that this link is a regular exchange link, but may be a special check link, if desired.

The trunk circuit 16 is also operative to seize the associated outgoing trunk line 24 which extends to the short haul exchange B, but maintains the talking circuit thereover open for the present.

The calling subscriber now dials his own number (2314) for checking and recording purposes, the incoming impulses being transmitted both to the recorder 23 and the check link 18, 19, but not over the outgoing trunk line 24. A connection is thus established over link 12, 13, trunk 16, the link 18, 19 and connector switch 14 to the calling line 231 in response to the impulses representing that digit.

As the number of the calling party has been received and recorded upon the recorder equipment 23 and the link equipment 18, 19 has been operative to extend the connection back to the calling line 231, the trunk 16 will flash the connector 14 which supervises the calling line 231. This supervision is carried back through the check link 18, 19 to the trunk 16 to verify the fact that the calling line 231 has correctly dialled his own digit. After receipt of the verification signal, dialling and talking circuits are extended to the distant office B over the trunk line. In the event that the subscriber has erroneously dialled a number other than his own assigned directory number, the trunk 16 will return busy tone to the subscriber and further dialling will be blocked by the equipment to prevent operation of the switches in the distant exchange.

In either event the check link 18, 19 is thereafter released, and is made available to the other subscribers in the exchange A for further calls.

The calling subscriber 2314 now dials the directory number of the desired party (3122), and the impulses as transmitted over the trunk equipment 16 are registered on the tape 504 associated with the recorder 23. The trunk equipment 16 is operative to advance the tape four steps between the periods of registration of the calling and called numbers to prevent confusion in reading the tape 504 at a later time.

Simultaneous with the registration of the called number 3122 on the recorder 23, the trunk 16 transmits the impulses over the interconnecting trunk line 24 to the associated trunk equipment 25 at the non-recorder end B. The seized link thereat, such as illustrated link 28, 29 operates in response to the first digit to absorb same, and in response to receipt of the second and third digit to effect selection of the desired subscriber line 312. A fourth or ringing digit is then repeated by the trunk circuit 25 to the connector to effect the application of the assigned ringing code to the seized one of the subscriber lines 312 to effect ringing of the bell equipment at the desired substation 3122.

As the party at the called substation answers, supervision is transferred, after a delay of about one second, to the trunk circuit 16, to effect further operation of the equipment thereat; a delay of one second being provided in the answer circuit to prevent the false registration of unanswered calls by possible line transients.

As the trunk circuit 16 now receives the answer supervision, it is operative to seize associated common trunk equipment including a calendar 21 and clock 22. Calendar 21 steps the tape 504 on the recorder 23 four spaces, and then proceeds to punch the date and time of day followed by four more spaces and a first minute mark. The calendar thereafter releases for use with other trunk equipment in the establishment of other calls in the exchange. The clock equipment 22 is held for the duration of the call and is operative to transmit further impulses to the trunk every 15 seconds. These pulses drive counting chain equipment in the trunk 16 which causes a punch to be recorded after each advancement of the counting chain over four steps, whereby one minute marks are registered on the recorder during the period of the call.

As either party disconnects following completion of the call, the clock equipment 22 is released by the trunk 16. The calling link equipment 12, 13 etc. is released. With the restoration by both parties, the tape 504 is automatically advanced eight steps followed by automatic release of the trunk 16 and the called connections.

In the event that the call has been unanswered, the equipment will be restored as the calling party restores his receiver, the calendar and clock not having been seized as a result of the failure to receive answer supervision from the distant exchange.

In the event the call was answered, and one or both parties hang up before the calendar information is completely registered, the calendar 21 automatically completes the transmission of the information to the recorder 23 and operates the punch to provide the one minute mark before allowing the trunk and the calling link to release.

CALLS AT NON-RECORDER END

The establishment of local calls and reverting calls at the non-recorder end is accomplished in the same manner as described relative to the establishment of calls from the recorder end to the non-recorder end.

The trunk circuits, such as 25, do not have recorder units, such as 23, nor does the exchange B have common trunk equipment such as the calendar 21 or clock 20, the equipment at the recorder end (exchange A) being used to record information concerning the calls established by the subscribers of either exchange in either direction. Otherwise the equipment at exchange B is somewhat similar to that of exchange A.

As illustrated in Figure 1, the subscribers at exchange B have access to the subscribers at exchange A over the eighth level of the line-finder links such as 34, 35. With the establishment of such calls by a subscriber in exchange B by dialling the digit eight, a trunk circuit, such as illustrated trunk 25, is seized and the trunk 25 immediately energizes its line circuit 26 to seize a link, such as 28, 29, for checking purposes, and also seizes the outgoing trunk line 24 without extending the talking circuit thereover. The calling subscriber then dials his assigned directory number to the trunk 25 which repeats same to the selected one of the links 28, 29 to seize the calling line 3122, and also repeats the impulses to actuate the recorder 23 in the associated trunk 16 at the distant office A to record the directory number of the calling party thereat.

After the equipment at the recorder end has counted the proper number of digits, it flashes the trunk circuit 25 causing disconnect and answer supervision to appear on the test conductor (P-wire) of the calling line 3122 from which supervision is transmitted back over the check link 28, 29 to the trunk 25 to verify the calling number as dialled. After this check, the check link 28, 29 is released. The calling subscriber now receives dial tone indicating that further dialling of the desired subscriber number should be effected.

As the directory number of the desired subscriber is now dialled, the impulses are transmitted by the trunk 25 over the trunk line 24 to the recorder 23 in trunk 16 at exchange A. The connection is registered in trunk 16 as an incoming call and an associated line circuit, such as 17, which has effected seizure of link equipment such as 18, 19 advances the call through the local equipment including the proper connector switch, such as 14. The incoming impulses which represent the number of the calling party are also transmitted by trunk 16 to the recorder 23 for registration thereon.

In the event that the subscriber does not answer, no answer punch is recorded on the tape, and the equipment is released as the calling party restores. As the called subscriber answers, answer supervision is provided as before to cause the trunk circuit 16 to seize the common trunk equipment 20, including calendar 21 and clock 22, and the operation thereof is effected as in the case of a call established from the recorder end.

As the parties have completed their call, the release of the trunk equipment is controlled by the calling party at the non-recorder end (rather than by both parties as heretofore described).

TRUNK DESCRIPTION

For purposes of simplicity of disclosure, a detailed description of the circuit of the automatic line finder and selector link equipment 18, 19; 12, 13; 28, 29; 34, 35; etc., have not been made herewith, reference being made to the copending application which was filed on May 12, 1950, by Arne Oxaal, Serial No. 161,677, assigned to the present assignee, and which is directed to an Automatic Telephone Exchange and assigned to the assignee of this invention. The manner in which other conventional line finder-selector units may be used with the equipment will be obvious to parties skilled in the art.

The following chart provides a brief description of the relays in the several trunk circuits and a disclosure of the functional operations thereof.

*Chart I*

TRUNK 300 (RECORDER END)

| Relays | Functional Operation |
|---|---|
| 310-320 | Test conductor supervision relays. |
| 330 | Battery and ground feed to selector (calling line). |
| 380, 410 | Battery and ground feed to line-finder line. |
| 400 | Slow relay operated by 410. |
| 530 | Hold from dial pulses during each digit; drives digit counting chain. |
| 510 | Auxiliary relay for relays 530 and 520. |
| 370 | Slow relay held by relay 330 controls release of selector. |
| 350 | Auxiliary relay for 370 provides additional contacts and timing functions which are not carried by 370. |
| 340 | Operates at beginning of outgoing call; releases after calling number has been dialled. Control landing and release of check link. |
| 570 | Non-check relay. Operates if improper calling number is dialled; gives busy signal and blocks further dialling. |
| 550 | Calendar pick-up relay. Connects calendar to trunk when call is answered. |
| 360 | Operates after calling number has been dialled; switches dialling circuits, completes talking circuit to distant end of trunk. |
| 560 | Operates after the called number has been dialled; blocks further dialling, prepares for answer. |
| 540 | Operates when calendar has been picked up; opens calendar pick-up, connects clock to trunk. |
| 420-430 | Release relays; relay 420 operates when any call enters trunk, prepares circuit for relay 430 which operates when subscriber hangs up; causes tape to run eight steps before trunk releases. |
| 520 | Spacer relay—pulses to provide spaces between calling and called numbers and spaces between calls. |
| 460, 470, 480, 490 | Digit counting chains. Counts digits dialled; counts spaces between numbers and between calls, counts 15 second pulses from clock to produce one minute punches on tape. |
| 440, 450 | Flip-flop pair controlled from last relay of counting chain. Causes chain to repeat after each round thereby running off four spaces after receiving the four digits of the calling number, and running eight spaces when the chain is started at the end of the call. |

The disclosed arrangement is designed for a four digit exchange; with a five digit office, the counting chain would have an extra or fifth relay. Relays 330, 370, 350, 340 and 570 operate only on outgoing calls; all other relays in trunk 16 operate on calls in either direction.

*Chart II*

TRUNK 25 (NON-RECORDER END)

| Relays | Functional Operation |
|---|---|
| 660, 670 | Test wire supervision relays. |
| 640, 650 | Battery and ground feed relays to line. |
| The foregoing relays are the only ones which operate on inward calls. The following relays operate only on outward calls. | |
| 690 | Directional relay; operates from connector test wire to indicate outward call. |
| 620, 630, 640 | Operate and release in various combinations under control of relay 640. Preform functions in connection with control of check link and checking of calling number. |
| 680 | Non-check relay. Operates when calling number is not dialled properly; gives busy signal and blocks further dialling. |

*Chart III*

CALENDAR

| Relays | Functional Operations |
|---|---|
| 850 | Delay relay (approximately eight seconds) releases calendar and trunk if calendar does not go through complete operation in eight seconds due to failure. Sounds alarm. Condenser discharge renders the relay 850 slow to release. Relay 850 is also slow to operate to prevent line transients which might produce a momentary answer from operating same and seizing the calendar. |
| 840 | Start relay. |
| 880, 890 | Pulsing or driving relays. Drive each other, the step and punch magnets and the counting chain relays 900, 910, 920, 930, 940, and 950. |
| 860, 870 | Stop driving relays 880 and 890. |
| 880, 890 | After each series of punch has taken place so as to prepare for the next series, and provide a step between various digits of the calendar information. |
| 950 | Starts chain over after five pulses and transfers to other contacts on the five counting chain relays so that they may be used a second time for digits 6 to 0. |
| 1050, 1060 | Both relays operate at the beginning of the first round of the day switch. Both release at the beginning of the second round of day switch, etc. These relay switches lead from the days tens bank to the proper chain link so that the first ten days of the month will read 0-1 to 0-9, the second ten days 21-29, etc. |
| 810-820 | Prevent calendar from stepping while giving information; also prevent giving information while calendar is stepping. |
| 830 | Pickup relay. Connects calendar to trunks or trunks provided no other trunk has seized calendar in advance. Prepares locking circuit for 820 in case of a 6 minute pulse during time calendar is sending information. Relay 830 is slowed to release to allow the condenser across the relay 850 to fully charge independent of the windings of relay 850. |
| 1080 | Steps monthly switch to succeeding month. |

*Chart IV*

SWITCHES

| Switch Identification | Switch Operation |
|---|---|
| SS Bank 1 | Used for holding the trunk and calendar relays. |
| SS Bank 2 | Homing bank. In case of failure of the calendar between points 1-11 or 13-22 the excess banks will restore to either positions of 12 or 1 so that each new call will have a common starting point. |
| SS Bank 3 | Controls spacing and punching of tape. |
| SS Bank 4 | Controls the following sequence of operations of the calendar: Point 1—3 spaces on tape. Point 2—controls punching of the months tens digit. Point 3—controls the punching of the months units digit. Point 4—one extra space on tape. Point 5—controls punching of the days tens digit. Point 6—controls punching of the days units digit. Point 7—one extra space on tape. Point 8—controls punching of hours tens digit. Point 9—controls punching of hours unit digit. Point 10—controls punching of hours tenths digit. Point 11—five spaces on tape and first minute punch of talking time. |
| TH Bank 1 | Homing bank. This bank steps the TH banks across positions 11 and 12 to position 13 where the hours tenths bank starts repeating itself. On arrival at position 23 restores self to position 1. |
| TH Bank 2 | Provides circuit to hour magnet at positions 11 and 23 so as to register one hour at each position. |
| TH Bank 4 | Controls tenth of an hour punches on the tape. |
| HR Bank 1 | Homes all the HR banks after the 24th hour (Position 25). |
| HR Bank 2 | Provides circuit to DA magnet at position 25 so as to register one day at this position. |
| HR Bank 3 | Controls hours tens digit punchings on tape. |
| HR Bank 4 | Controls hours units digit punching on tape. |
| DA Bank 1 | Homes all DA banks after 28, 29, 30 and 31 days. |
| DA Bank 2 | Controls the operation and release of relays 1050 and 1060. |
| DA Bank 3 | Controls days tens digit punching on tape. |
| DA Bank 4 | Controls days units digit punchings on tape. |
| MO Bank 5 | Controls months tens digits punchings on tape. |
| MO Bank 1 | Controls months units digit punching on tape (1st month). |
| MO Banks 4 and 3 | Control setting of days in each month. |
| MO Bank 2 | Controls months units digit punchings on tape (succeeding month). |
| MO Bank 6 | Controls relay 1080. |

The operation and function of other relays in the ticketing equipment illustrated in the automatic exchange set forth in Figures 2 to 10 inclusive will become apparent with reference to the following detailed explanation.

RECORDING OF CALL FROM SUBSCRIBER IN EXCHANGE A TO A SUBSCRIBER IN EXCHANGE B

A subscriber, such as X, in exchange A may establish connection with a desired subscriber, such as R, in exchange B by removing the receiver at his calling substation 10 from its associated hook in the conventional manner to complete an energizing circuit for associated line circuit equipment illustrated generally at 11.

Line circuit equipment 11 has access to a number of line finder selector links such as the illustrated link 12, 13 and operates in the conventional manner responsive to the removal of the receiver to locate an idle link which, on seizure, extends the connection from the calling line (2314) to the selector switch of the seized link. Assuming the illustrated link 12, 13 to be in the idle condition and the seized one of the links, conventional equipment in the link 12, 13 now serves to busy the calling line (2314) to the other automatic switches having access thereto, and timing means associated with the selector 13 provide a given predetermnied time interval after seizure of the link 12, 13 for permitting the party to initiate the dialling operation for extending the call to further exchange equipment.

The link 12, 13 conditions itself for receipt of impulses from the dial of the calling station, and thereafter informs the subscriber X of its prepared condition by the transmission of dial tone over the connection thus far established to the receiver of the calling subscriber X.

In the present embodiment, level 7 has been assigned as a service level for extending connections to the subscribers in exchange B. Therefore, in placing a call to exchange B the subscriber first dials the digit 7. The dial equipment operates in a conventional manner to alternately interrupt and complete the loop circuit to the selector switch to cause same to operatively select the seventh level.

The selector switch 13 is operative with selection of the seventh level thereof to select an idle one of the group of trunk circuits, such as the circuit illustrated at 16, whcih are associated with level 7 of the selector switch; to extend the calling line to the seized one of the trunk circuits; to complete an operating circuit for a conventional call register meter; and to render the trunk circuit 16 busy to the other links such as 12, 13 which have access thereto. In the event that common control equipment is used in the selectors, the restoration of the common control equipment is effected at this time.

Each trunk circuit 16 in the exchange is marked in accordance with its particular condition of operation; that is, when the trunk is busy, ground is connected to its test conductor 211 and if the trunk is idle, absence of ground exists on the test conductor 211. Thus as a selector 13 is operated to the seventh level, its trunk test equipment automatically determines which ones of the associated trunk circuits are idle by examining the test conductors and makes a corresponding selection of a trunk from the ones of the group which test idle. Assuming the illustrated trunk 16 is the first trunk in the group and is in the idle condition, absence of ground on its test conductor 211 controls the appropriate test relays in the selector equipment to seize same and switch-through the positive, negative and test conductors 209, 210 and 211 of the selector 13 to the trunk circuit. A detailed explanation of one of many conventional selectors having switching equipment of this type is set forth in the afore-identified copending application which was filed May 12, 1950 by Arne Oxaal, Serial No. 161,677, and which has been assigned to the present assignee.

TRUNK OPERATION (RECORDER END) OUTWARD CALL

As the trunk is seized, an operating circuit is extended to the trunk line relay 330, the circuit extending from negative battery over the upper winding of the line relay 330, conductor 210, the closed contacts of the operated units and hundreds relays in selector 13, conductor 206, the closed contacts of the operated tens and units relays in line finder 12, conductor 202 to the closed contacts in the subset of the calling subscriber X, conductor 201, the closed contacts of the units and hundreds relays in selector switch 13, conductor 209, and the lower winding of the trunk line relay 330 to positive battery.

Line relay 330 operates, and at its contacts 332 completes an operating circuit for the pulse hold relay 530 in series with the punch unit 505 of the recording equipment, the circuit extending from negative battery over the winding of the punch solenoid 505, conductor 513, contacts 551, 561, winding of pulse hold relay 530, conductor 394, contacts 357, conductor 393, contacts 401, conductor 293' and contacts 332 to positive battery. This circuit is operative hereinafter to repeat incoming impulses directly to the recorder 23 whereby intermediate translating equipment is eliminated.

Punch solenoid 505 operates its associated punch member 507 at this time to cause same to place a perforation in a tape member 504 as an indication that the call is an outgoing call from exchange A; that is, each time a call is extended from exchange A to exchange B a preliminary punch will appear on the tape. Calls extended from exchange B to exchange A will not have a preliminary punch of this type. Punch solenoid 505 at its contacts 508 completes an energizing circuit for step solenoid 500, which energizes to move its associated pawl 502 in position for subsequent movement of the ratchet wheel 503 and the corresponding advancement of the tape one step.

Pulse hold relay 530 operates, and at its contacts 535 completes an operating circuit for slave hold relay 510, which circuit extends from negative battery over the winding of relay 510, contacts 535, 548, to positive battery to ground.

Trunk line relay 330 at its contacts 332 also completes an obvious circuit for the switch hold relay 370.

Switch hold relay 370 operates, and at its contacts 372 completes an operating circuit for the outgoing call control relay 340, the circuit extending from battery over the winding of outgoing relay 340, contacts 368 and 372 to ground. Switch hold relay 370 operates, and at its contacts 371 applies ground to the test wire 211 extending to the selector 13, the ground being applied over contacts 371, 491, conductor 380 and conductor 211 to effect holding of the selector switch 13 for the duration of the call.

Outgoing call control relay 340 operates and at its contacts 347 lands the call in the distant office; at its contacts 343 seizes a regular line feeder selector link for checking purposes, and at its contacts 342 completes an operating circuit for the associated hold relay 350, the circuit extending from battery over the winding of relay 350 and contacts 342 and 372 to ground.

Associated outgoing hold relay 350 operates, and at its contacts 357 interrupts the energizing circuit for the pulse hold relay 530 and the punch solenoid 505, both of which now responsively restore; the pulse hold relay 530 being slow to release holds for a given period thereafter. The solenoid 505 in restoring effects the advancement of the tape member 504 one step.

As the pulse hold relay 530 now restores, it is effective at its contacts 535 to interrupt the holding circuit for associate hold relay 510, which is slow to release and thus maintains its contacts 512 closed for a brief time after the pulse hold relay 530 has restored. In this manner an operating circuit is momentarily completed for the solenoid stepping magnet 500 in the recorder 23, the circuit extending from negative battery over the winding of the step solenoid for conductor 528, contacts 559, 512, 525, 536 and 548 to ground. After the expiration of the given holding period, the associate hold relay 510 restores to interrupt the energizing circuit for the step solenoid 500 which likewise restores to cause its associated mechanism to advance the tape member 504 one step.

As a result of seizure of the trunk by a subscriber in exchange A in making an outgoing call to a subscriber in exchange B, a preliminary punch is placed on the tape member 504 of the recorder 23 associated with the seized trunk 16 to indicate the fact that the call is in the direction A—B. Also the step magnet 500 is energized to advance the tape one step to provide separation between the preliminary punch and the first digit of the calling number which is to be shortly recorded.

As the pulse hold relay 530 restores, it also is effective at its contacts 534 to complete an operating circuit for the first release relay 420, the circuit extending from negative battery over the winding of relay 420, conductor 419, contacts 534, conductor 389, contacts 356 to ground. The operation of the first release relay 420 is delayed until such time as the pulse hold relay 530 restores, to thereby prevent the possibility of effecting stepping of the chain equipment (relays 460—490) responsive to the preliminary operation of the pulse hold relay 530 and the extension thereby of the ground which is controlled by contacts 423 of the first release relay 420.

As previously mentioned, the outgoing control relay 340 in operating is effective at its contacts 347 to extend battery to the signalling conductor 539 to land the call in the distant office, the landing of the call at this time having no other effect than to prepare the equipment thereat for operation. Battery for the signalling conductor 539 is applied over the indicating lamp 316, contacts 347, conductor 327, contacts 438, conductor 327', contacts 568, the upper winding of relay 580, conductor 539, resistance 588, conductor 587, resistance 601, conductor 602, the upper winding of relay 603 and contacts 698 and 665 to ground.

The composite signalling circuit is conventional in its basic operations, the control thereof having been assigned to new and various trunk elements. Basically, the signal relay 580 and 603 are normally restored with their associate contacts open. To signal in the direction A—B, (that is, to operate the composite relay at trunk B), battery is applied to the signal conductor 539 at exchange A. To restore composite relay 603, ground is applied to signal conductor 539. The composite relay 580 at exchange A is operated in a similar fashion by the alternate application of battery and ground thereat to the conductor 602.

DIALLING OF CALLING PARTY NUMBER

As previously pointed out the arrangement of the present invention is particularly economical in its elimination of automatic equipment for effecting calling party number recordation. The equipment elimination is basically effected by having the calling party dial his assigned directory number prior to dialling that of the called party. The calling party number, as dialled, is transmitted directly to the recorder 23 by the trunk 16 to register same for future billing purposes, and simultaneously to the particular link which has been seized by the trunk for checking purposes.

As previously mentioned, the outgoing call control relay 340 in its operation closes its contacts 343 to connect battery through a 500 ohm resistor 356' to conductor 301, which is connected to a line circuit 17 having access to a group of regulating switching links such as illustrated link 18, 19. The line circuit 17 is responsive to seizure to land a call in an idle one of the links such as 18, 19 in the conventional manner.

Line finder switch 18 operates in the conventional manner to extend the connection to the associate link selector switch 19 over conductors 214, 215 and 216, which is in turn operative to connect dial tone to conductor 215 over the line finder 18, conductor 302, contacts 345, conductor 305, contacts 455, 465, 475, 488, 498, conductor 429, capacitor 386, conductor 210, selector 13, conductor 206, line finder 204, conductor 202 to the receiver of the calling subscriber X. Subscriber X is informed by receipt of the dial tone that the transmission of his assigned directory number may now be initiated.

In the event that all links are busy as a call is initiated, busy tone will be returned over the same channel to the calling subscriber, who thereupon restores his receiver to his handset and initiates the call at a later time.

Assuming the illustrated link 18, 19 is idle and has been seized by the illustrated trunk equipment 16, the subscriber X now dials his assigned directory number which in the present embodiment has been assumed to be 2314. With the receipt of the first two incoming impulses representing the first digit of the calling party number, the trunk line relay 330 is operated twice in a responsive manner to deliver the pulses to the pulse hold relay 530, the punch magnet 505 and the line relay (not shown) of the selector 19.

Specifically, trunk line relay 330 opens and closes its contacts 331 to repeat the incoming pulses to the pulse hold relay 530 and the punch magnet 505 over the described series circuit, and at its contacts 333 effects the transmission of the impulses to the line relay of the selector 19 of the seized link 18, 19. The selector 19 responds to these impulses in the conventional manner and advances to the second level to seize an idle one of the connector switches of the second hundred group, such as illustrated connector 14.

The pulse hold relay 530 is operated with the receipt of the first impulse of the first digit and, being slow to release, holds for the duration of the receipt of the impulses comprising the first digit. Pulse hold relay 530 at its contacts 535 completes the obvious operating circuit for associate pulse hold relay 510, and at its contacts 532 completes an operating circuit for the first counting chain relay 490, the circuit extending from battery over the winding of relay 490, contacts 486, 473, 464, conductor 409, contacts 532, conductor 407, contacts 553, conductor 415, contacts 434 and 423 to ground.

The first counting chain relay 490 operates, and at its contacts 497 completes an operating circuit for the check link holding relay 380, which extends from ground over the winding of relay 380, conductor 304', contacts 497, 488, 475, 465, 455, conductor 305, contacts 345 and battery on conductor 302 as supplied by the finder selector link 18, 19. The circuit thus prepared on conductor 302 is effective to operate the connector relay 220 as it is subsequently switched through.

Line relay 330 operates responsive to receipt of the second pulse, and at its contacts 331 transmits the pulse to the pulse hold relay 530 and the punch magnet 505 to effect the reoperation of the punch 505 and the perforation of the tape member 504. As the punch solenoid 505 restores following the termination of receipt of the first impulse, it is effective at its contacts 506 to interrupt the holding circuit for the step solenoid 500, which responsively restores and advances the tape one step.

As the two impulses representing the first digit of the calling party number have been received, the time interval between the first and second digit is sufficient to effect the restoration of the pulse hold relay 530, which at its contacts 531 complete a series energizing circuit for the first and second counting chain relays 490 and 480, and at its contacts 532 interrupts the original energizing circuit for the first counting chain relay 490. Pulse hold relay 530 at its contacts 535 interrupts the energizing circuit for the pulse hold relay 510, which holds for a brief time period sufficient to permit the completion of the operating circuit over contacts 536, 525, 512 and 554 and step conductor 528 to stepping solenoid 500 to energize same. As the pulse hold relay 510 restores, the operating circuit to the solenoid is interrupted and the solenoid 500 releases to advance the tape one step, whereby a space is provided between successive digits of the calling party number.

Selector switch 19 is operated in response to receipt of the two impulses representing the first digit of the calling party number to advance to the second level thereof, and is operative in the conventional manner to select an idle one of the group of connectors associated with the two hundreds group of the calling subscriber lines.

In the event of failure to locate an idle one of the conector members of the two hundred group, busy tone will be returned over the connection extending to the subscriber subset to indicate to subscriber X that the call cannot be completed at this time. The connector switches of the exchange are basically conventional in nature, and accordingly only the modifications have been shown hereat for purposes of simplicity of disclosure.

Automatic ticketing calls must be recognized in the links as different from other calls; in fact, four conditions must be recognized:

(1) Regular incoming call from ticketing trunk.
(2) Check call (incoming to the check link).
(3) Call to ticketing trunk.
(4) Call to ticketing trunk from toll.

An incoming ticketing call must remove conversation disconnect in the connector, but must not encounter other features assigned to toll trunks, such as busy verification and flashing busy.

On a ticketing check call, the check link must pass supervision from the connector P wire back to the finder P wire when the busy calling line is reached. Such supervision is not permissible on regular calls, however, for if it was, answer supervision would be received when any busy line was dialled.

A local call to a ticketing trunk must remove conversation disconnect, but should not incur trunk control (or joint control) of link release or busy verification, as would be the case on a call to a toll trunk. Avoidance of trunk control is not a fundamental necessity, but is highly desirable. The reason is that the trunk must perform certain operations—such as running off eight spaces and perhaps completing calendar information after the subscribers have hung up; and it is not desirable to artificially hold the calling party during this time.

Since dialling need take place only over the plus line wire, the minus line wire is used to recognize a variety of conditions; furthermore, the signals are automatically carried forward through selectors to the connector. Since ticketing trunks contain digit counters, it is easy for the trunk to change conditions on the minus wire any time during the call.

Accordingly, the following discriminatory arrangements are provided:

(1) Regular links must recognize a vertification call, and in response thereto establish a P wire to P wire path through the link. Such arrangement is accomplished by maintaining the TK relay 225 (recorder end); 775 (non-recorder end), and the X relay 285 (recorder end), 765 (non-recorder end), in the restored or non-operated condition. With TK relay deenergized, relay K can operate as a busy line is detected, and when a busy calling line is encountered with relay K operated and relay X′ non-operated, the P wire to P wire connection is possible. Relay C′ (220 recorder end; 780 non-recorder end) is held operated for two or more digits and then released as the ring digit is received to prevent relay TK from operating at the end of the first digit as it conventionally does. Relay X′ though operated incidentally, is released so that it cannot lock through a make contact of M which operates on the ring digit. Relay Y′ operates incidentally. The conversation disconnect circuit is established with relays TK non-operated and relay Y′ operated, but such arrangement is incidental at this time.

(2) Regular links must recognize an incoming ticketing call and must be operative to disable conversation timing as such calls are received. Relay TK should not be operated in that it affords an opportunity to set up busy verification privileges. Accordingly, an additional relay Y′ (265 recorder end, 770 non-recorder end) is employed to disable conversation timing. Thus, by holding relay C′ permanently operated, relay TK cannot operate at the end of the first digit as it conventionally does, and relay Y′ is maintained restored. Even though relay TK is non-operated, relay Y′ disables the conversation timing circuit. Relay X of course, operates and locks, maintaining the normal P wire connections.

(3) Regular links must recognize all of the calls not originating from a ticketing trunk. On such calls relay X′ is operated maintaining the normal P wire connections, and relay Y′ is operated preparing for conversation timing. The conventional functioning of link relay TK determines whether or not the conversation timing is effective.

On calls from local subscribers, relay C pulses on every digit, whereby the operating circuit for TK is interrupted, and conversation timing is established; however, the operating and locking circuits for relays X′ and Y′ are established. It is noted that relay TK can be operated by other means if the destination of the call so warrants.

On calls from toll operators, relay C is not operated until answer, which results in TK being operated at the end of the first digit (thus disabling conversation timing; and resulting in relays X′ and Y′ both being operated and locked).

The following chart is included for the purpose of simplifying the nature of the discrimination effected by the regular links.

| Effect of origination of Call | C′ 220 (Rec. End) 780 (Non Rec. End) | TK 255 (Rec. End) 755 (Non Rec. End) | X′ 285 (Rec. End) 765 (Non Rec. End) | Y′. 265 (Rec. End). 770 (Non Rec. End) |
|---|---|---|---|---|
| Local | Pulses | not operated TK | operated X′ | operated. Y′. |
| Toll | Not operated until answer | operated TK | operated X′ | operated. Y′. |
| Incoming call from ticketing trunk | Permanently operated | not operated TK | operated X′ | non operated. Y′. |
| Verification Call from Ticketing trunk | Held operated during 2 or more digits but released for ring digit. | not operated TK | operates incidentally but releases. X′ | operated incidentally. Y′. |

Resuming the description of the outgoing call from the recorder end, and assuming that the illustrated connector 14 is idle and that the line finder selector link 18, 19 has effected seizure thereof, an operating circuit will be extended to the line relay 225 over the positive conductor 215 to effect the operation thereof in the conventional manner. An operating circuit is also completed to the line relay 220 as controlled by the counting chain of the trunk 16; that is, from ground over relay 380, C304′, contacts 497, contacts 488, 475, 465, 455, C305, contacts 345, C302, LF18, C215, selector 19, C218 and the winding of line relay 220 to battery. Line relay 220 at its contacts 221 completes an obvious energizing circuit for the associate relay 285 thereat which operates and at its contacts 287 connects the test conductor 219 to ground.

The B line relay 225 at contacts 227 completes an operating circuit for the hold relay 240, which operates and at its contacts 241 connects direct ground over contacts 287 to the test conductor 219 to complete an operating circuit for supervisory relays 310 and 320 thereat, the ground being applied over conductors 216 and 303 to the trunk contact 313, C309, contacts 566, C308 and the relay 310 which operates over its upper winding and at its contacts 311 extends a circuit to relay 320; and at its make-before-break contacts 312, 313 locks to C303.

As noted above the arrangement is operative with establishment of a ticketing check call to energize connector line relays 225 and 220 as the connector is seized as just described. The manner of release of the line relay 220 before the transmission of the last digit will now be considered.

As the calling party dials the second digit of the assigned directory number (digit 3 in the present example), the trunk line relay 330 follows the incoming impulses and retransmits them to the punch unit 505 in the recorder 23 to effect the placement of three perforations in the tape member 504 to indicate the value of the second digit. The trunk line 330 also transmits the three incoming impulses to the connector equipment 14 over contacts 333 and the positive conductor 301 to effect the operation of line relay 225 and the selection of the third tens groups of the subscribers lines associated with the connector switch 14.

As the first impulse of the group of impulses representing the second digit is received, and the relay 530 again reoperates, it is effective at its contacts 531 to interrupt the series holding circuit for the first and second counting chain relays 490 and 480, and at its make before break contacts 532 to complete a holding circuit for the second counting chain relay 480, and thus releasing the first relay 490. During the interval following the receipt of the three impulses representing the second digit, the pulse hold relay 530 restores, and at its contacts 531 completes a series energizing circuit for the second and third counting chain relays 480 and 470 and completes an operating circuit for the step solenoid 500. A brief period thereafter the associate pulse hold relay 510 restores to effect the restoration of the step solenoid 500 to effect the advancement of the tape one step prior to receipt of the third digit.

As the subscriber now dials the third digit of his assigned directory number (in the illustrated example—digit 1), the trunk line relay 330 reoperates and at its contacts effects the retransmission of the single impulse to the pulse hold relays 510 and 530 to operate same and to the recorder 23 to effect the perforation of the tape member 504 once.

Trunk line relay 330 at its contacts 333 also effects the transmission of the impulses to the connector switch 14 to effect the operation of the line relay 225 thereat to control selection of the corresponding units group of subscriber lines associated with the selected one of the tens group.

As the pulse hold relay 530 operates, it is effective at its contacts 531 to interrupt the holding circuit for the second counting chain relay 480 and at its contacts 532 to hold the third counting chain relay 470.

With the occurrence of the pause introduced after the dialling of the third digit, the trunk line relay 330 restores to effect the restoration of the pulse hold relays 530, which in turn effects the energization of the step solenoid 500. As the pulse hold relay 510 restores shortly theerafter, the step solenoid 500 is released and the tape member 504 is advanced one step to provide an interdigital spacing on the tape member 504.

The pulse hold relay 530 also at its contacts 531 completes a series energizing circuit for the third counting chain relay 470 and the fourth counting chain relay 460. As the fourth counting chain relay 460 operates, it is effective at its contacts 462 to complete an operating circuit for the first flip-flop relay 450, and at its contacts 465 to interrupt the application of ground to the finder conductor 302 to effect the restoration of trunk relay 380 associated with the check link and the line relay 220 in the connector, as mentioned heretofore. The line relay 220 restores, and at its contacts 222 interrupts the operating circuit for associate relay 285 to restore same. Line relay 220 at its contacts 222 completes an operating circuit for conversation disconnect relay 265, which operates to effect incidental conversation disconnect at contacts 268. Associate relay 285 releases and at contacts 286 prepares a cut-through circuit for the supervisory test conductor 303 from the trunk circuit 16 through to the test conductor 294 for the subscriber line 231.

After the units digit, that is the third digit of the calling parties number has been dialled a short interval ensues between the operation of the connector units relay (contacts only shown) and the operation of associated relay 280 constituting a test period during which a test circuit is completed to the test wire 294 of the subscribers line circuit. The subscriber's line 231 will, of course, test busy, and the ground on the P wire will operate the busy tone relay 260 in the connector in the conventional manner. Relay 260 at its contacts 262 attempts to connect busy tone to the calling line which circuit is open at contacts 465. Release relay 280 at its contacts 282 presently transfers the test conductor 294 to prepare a circuit for control relay 245.

As the fourth and final digit of the calling subscriber number is now dialled (in this example, digit 4), the trunk line relay 330 responds to the incoming impulses to transmit the impulses to the pulse hold relays 510 and 530 and to the punch magnet 505 in the recorder equipment 23 to effect the perforation and advancement of the tape a number of times corresponding to the number of impulses in the digit received. Pulse hold relay 530 at its contacts 531 interrupts the series holding circuit for the third counting chain relay 470 to restore same and at its contacts 532 completes a holding circuit for the fourth counting chain relay 460 to hold same. Trunk line relay 330 at its contacts 333 retransmits the incoming impulses over conductor 301 to the line relay 225 of the connector 14.

As the fourth or ringing digit is dialled, relay 225 also controls completion of an operating circuit in the conventional manner for relay 250 which operates and at its contacts 251 completes an operating circuit for relay 245, the circuit extending from battery over the winding of relay 245, contacts 251, 242, 256, 274, 282 to ground on the test conductor 294. Relay 245 operates and at its contacts 246 locks to a holding ground, and at its contacts 247 connects the test conductor 303 from the trunk through to the subscriber test wire 294, for checking purposes; that is, for checking as to whether or not the calling subscriber has dialled his assigned directory line number. It is apparent, of course, that such protective means must be utilized to prevent unscrupulous parties from dialling the directory number of other lines to cause the equipment to charge parties other than themselves for the charges to be incurred in a toll call.

Following receipt of the fourth digit by the trunk circuit 16, line relay 330 restores to effect the restoration of the pulse hold relays 510 and 530 and the advancement of the tape one step as aforedescribed.

CHECKING THE NUMBER RECORDED

In checking the number dialled by the subscriber against his assigned directory number, a check relay 570 cooperates with the P-wire supervisory relay 320 in determining the accuracy of the number dialled, the continuity of the circuit to the check relay 570 during the dialling of the number being dependent upon the proper operation of the test conductor supervisory relay 320.

Specifically, as the complete calling line number has been dialled, the finder P-wire 303 will have been connected straight through to the calling line P-wire 294. Accordingly, relay 320 of the trunk which was operated with the seizure is connected to the line P-wire 294 and is controlled thereby. During the checking operation to be described immediately hereafter, the non-continuity of the circuit for the check relay 570 in this trunk (and consequently the further extension of the call) is dependent upon the supervisory relay 320 following the signals from the first counting chain relay 490. As will be seen, the proper response can only occur if the P-wire is connected through to the calling subscriber line (231) in this example, and this, of course, occurs only when the calling subscriber dials his own line number.

After the receipt of the fourth impulse, relays 530 and 510 restore, and relay 530 at its contacts 532 interrupts the holding circuit for the fourth counting chain relay 460 to restore same.

The fourth counting chain relay 460 restores and at its contacts 461 completes an operating circuit for the second flip-flop relay 440, the circuit extending from battery over relay 440, contacts 444, C399, contacts 366, C398, contacts 461, 453, C407, contacts 553, C415, contacts 434, and 423 to ground.

As the flip-flop relay 440 operates, it is effective at its contacts 446 to prepare an operating circuit for the spacer relay 520, the circuit extending from battery over the winding of spacer relay 520, contacts 542, 511, C416, contacts 436 and 446 to ground. This operating circuit is completed as the slow relay restores.

The counting chain is now operated a second or checking round in which it determines the accuracy of the dialled number, the second checking round being initiated with the operation of the spacer relay 520 and the resultant closing of its contacts 524 to complete an operating circuit for the associate pulse hold relay 510, the circuit extending from battery over the winding of relay 510, contacts 524, 536, 548 to ground.

The spacer relay 520 at its contacts 522 also completes an operating circuit for the first counting chain relay 490, which extends from battery over the winding of the first counting chain relay 490, contacts 486, 473, 464, C409, contacts 522, 532, C407, contacts 553, C415, 434, 423 to ground.

The first counting chain relay 490 operates, and at its contacts 491 effects the insertion of a 150 ohm resistance 499 in the selector test conductor circuit 211, which being connected back through the connector 14 and the line-finder-selector link 18, 19 to the finder test conductor 303, removes the direct ground connection which has been holding the test supervisory relay 320 inoperative and connects resistance ground thereto to permit the operation of relay 320 in series with the operated supervisory relay 310.

Pulse hold relay 510 operates and at its contacts 511 interrupts the operating circuit for the spacer relay 520 to effect the restoration thereof. As the spacer relay 520 restores, it is effective at its contacts 525 to complete an operating circuit for the step solenoid 500 in the recorder 23 to effect the energization thereof, the circuit extending from battery over the winding of the step solenoid 500, C528, contacts 559, contacts 512, 515, 536 and 548 to ground.

As the spacer relay 520 restores, it is also effective at its contacts 521 to complete a series operating circuit for the first and second counting chain relays 490 and 480, the circuit extending from battery over the winding of relays 490 and 480, contacts 496, conductor 408, contacts 521, 531, C407, contacts 553, C415, contacts 434 and 423 to ground. A brief period thereafter as the time delay period of the pulse hold relay 510 expires, relay 510 restores and at its contacts 512 interrupts the energizing circuit for the step solenoid 500 to effect the release thereof and the advance of the tape 504 one step. Pulse hold relay 510 releases and at its contacts 511 recompletes the operating circuit for the spacer relay 520 which energizes over the circuit heretofore described.

Spacer relay 520 operates, and at its contacts 524 completes the aforedescribed circuit to the pulse hold relay 510, and at its contacts 521 interrupts the series circuit for the first and second counting chain relays 490 and 480 and completes a holding circuit for the second counting chain relay 480, the circuit extending from battery over the lower winding of relay 480, contacts 485, 473, 464, C409, contacts 532, C407, contacts 553, C415, contacts 434 and 423 to ground.

The first counting chain relay 490 restores, and at its contacts 491 removes the 150 ohm resistance 499 from its connection in the test conductor 211 to effect the restoration of the trunk test relay 320. It is, of course, apparent that in the event that the subscriber has not dialled his own number the test conductor 211 will not be extended through to the supervisory relay 320 in the trunk and this particular timed and controlled relation of the supervisory relay 320 will not be effected. In such event, the operation of a non-check relay 570 occurs, as will be described, to prevent further extension of the call.

Pulse relay 510 operates for a second time in the present cycle to effect at its contacts 511, the interruption of the energizing circuit for the spacer relay 520 and the restoration thereof.

As the spacer relay 520 restores, it is effective at its contacts 524 to interrupt the energizing circuit for the pulse hold relay 510 which holds for a brief period thereafter, and at its contacts 525 completes the prepared operating circuit for the step solenoid 500 to effect the energization thereof. Spacer relay 520 at its contacts 521 completes an operating circuit for the third counting chain relay 470 in series with the lower winding of the second counting chain relay 480, the circuit extending from battery over the lower winding of relay 480, the upper winding of relay 470, contacts 484, 495, conductor 408, contacts 521, 531, 553, conductor 415, contacts 434, 423 to ground. The third counting chain relay 470 operates in series with the second relay 480 in response thereto.

As the predetermined holding delay period of the pulse hold relay 510 expires, the relay 510 releases and at its contacts 512 interrupts the energizing circuit for the step solenoid 500 to effect the restoration thereof and the advancement of the tape 504 one step in the manner heretofore described.

Pulse hold relay 510 in restoring is also effective at its contacts 511 to recomplete the operating circuit for the spacer relay 520, which operates in response thereto, and at its contacts 521 interrupts the series energizing circuit for the second and third counting chain relays 480 and 470 to effect the release of the second counting chain relay 480. The third counting chain relay 470 is held operated over the circuit extending from battery over the lower winding of relay 470, contacts 472, 464, C407, contacts 532, 553, C415, contacts 434 and 423 to ground.

Spacer relay 520 in operating for the third time is also effective at its contacts 524 to recomplete the operating circuit for the pulse hold relay 510.

Pulse hold relay 510 operates, and at its contacts 511 interrupts the energizing circuit for spacer relay 520 to effect the restoration thereof. Spacer relay 520 restores, and at its contacts 521 completes a series energizing circuit for the third and fourth counting chain relays 470 and 460 respectively, the circuit extending over the lower winding of relay 470, the upper winding of relay 460, contacts 471, 483, 495, 408, 521, 531, C407, contacts 553, C415, contacts 434 and 423 to ground. The fourth counting chain relay 460 operates in series with the third counting chain relay 470. Spacer relay 520 in restoring is effective at its contacts 525 to recomplete the energizing circuit for the step solenoid 500 in the manner heretofore described to effect the energization thereof. Spacer relay 520 opens the circuit of relay 510, and as the pulse hold relay restores following the expiration of the predetermined time delay, it is effective at its contacts 512 to interrupt the energizing circuit to the step solenoid 500 to effect the restoration thereof and the advancement of the tape member 504 a third step in the present cycle.

The fourth counting chain relay 460 in operating is effective at its contacts 462 to interrupt the holding circuit for the first flip-flop relay 450 to effect the release thereof. Flip-flop relay 450 restores, and at its contacts 451 completes an energizing circuit for the calling number termination relay 360, the circuit extending from battery over the winding of relay 360, C395, contacts 441, 451, C396 and contacts 423 to ground. Calling number termination relay 360 operates, and at its contacts 368 interrupts the energizing circuit for the outgoing control relay 340 to effect the restoration thereof. Calling number termination relay 360, at its contacts 362 and 364, extends the talking conductors of the calling lines 209 and 210 over conductors 383 and 384 to the interconnected trunk line 24 which extends to the trunk equipment 25 in the distant exchange; at its contacts 365 locks up to the release relay 420 independently of the control of the flip-flop relay 450, at its contacts 366 interrupts a point in one of the energizing circuits for the second flip-flop relay 440, and at its contacts 368 completes a holding circuit for the auxiliary switch hold relay 350.

The outgoing control relay 340 restores, and at its contacts 341 interrupts the prepared circuit for the non-check relay 570 to prevent any possible operation thereof during the ensuing connection; at its contacts 342 interrupts one of the energizing circuits for the associate switch hold relay 350, which now is held up over control of relay 360; at its contacts 343 interrupts the application of the 500 ohm source to the positive conductor 301 of the finder equipment, and at its contacts 344 connects the 500 ohm source to the lower winding of supervisory relay 310 to provide balancing current through the opposed windings thereof to effect the restoration thereof. Relay 320 is held operated by this 500 ohm battery and at its contacts 324 maintains battery for lamp 310 and relay 580. The check connector is released as relay 225 restores responsive to the removal of the 500 ohm source from the plus conductor 301 of the link which has been seized for checking purposes. The release of the connector effects release of line-finder-selector link 18, 19. Outgoing control relay 340 is effective at its contacts 348 to connect battery to the composite conductor 339 extending to the non-recorder trunk 25, the battery being applied over contacts 324, 374, 348, C327, contacts 438, C327, contacts 568, the upper winding of relay 580, C539 and trunk line 24 to trunk 25.

As the pulse hold relay 510 releases for the third time in the operation of the counting chain, it is effective at its contacts 511 to recomplete the operating circuit for the spacer relay 520 to effect the fourth operation thereof and to interrupt the energizing circuit for the step solenoid 500 to thus cause the associated equipment to advance the tape 504 a third step in the current series.

Spacer relay 520 operates for the fourth time, and at its contacts 521 interrupts the series operating circuit for the third and fourth counting chain relays 470 and 460 respectively, the fourth counting chain relay 460 being now held up over the lower winding, contacts 463, C409, contacts 532, 553 and C415, contacts 434 and 423 to ground. Spacer relay 520 in operating for the fourth time is also effective at its contacts 524 to recomplete an operating circuit for the associate pulse hold relay 510 to effect the fourth operation thereof.

Pulse hold relay 510 operates for the fourth time, and at its contacts 511 interrupts the energizing circuit for the spacer relay 520 to effect the restoration thereof.

The spacer relay 520 restores to complete at its contacts 525, the energizing circuit to the step solenoid 500 to energize same for the fourth time; at its contacts 522 interrupts the holding circuit for the fourth counting chain relay 460 to effect the restoration thereof, and at its contacts 524 interrupts the holding circuit for the pulse hold relay 510. As the pulse hold relay 510 restores, it is effective after the elapse of the predetermined time period to interrupt at its contacts 512, the holding circuit for the stepping solenoid 500 to effect the restoration thereof and the advancement of the tape 504 one step.

The fourth counting chain relay 460 in restoring is effective at its contacts 462 to interrupt the energizing circuit for the second flip-flop relay 440 to effect the restoration thereof.

It is observed at this time that the check of the calling line number dialled for identification purposes occurs with the operation of the first counting chain relay 490 immediately after the test conductor 211 of the selector 13 was extended through the check link to the test conductor supervisory relay 320 in the trunk. If the calling party has not dialled his own number, the extension of the test conductor will not be completed, and accordingly as the first counting chain relay 490 operates in the checking cycling to introduce the 150 ohm resistance 499 into the test conductor 211, the test supervisory relay 320 will remain inoperative. As the spacer relay 520 releases a brief period after operation of the first counting chain relay 490 and effects the operation of the second counting chain relay 480 in series with the first counting chain relay 490, an operating circuit will be completed for the non-check relay 570 to terminate the call by the subscriber. Specifically, the operating circuit for the non-check relay 570 will extend from battery over the winding of relay 570, C390, contacts 341, contacts 321 (on the test relay 320 which remains restored by reason of the failure of the subscriber to dial his own number and the consequent failure to complete the extension of the test conductor 211 relay 320), C391, contacts 494, 482, 452 and 423 to ground.

The non-check relay 570 operates, and at its contacts 571 completes a locking circuit under control of the release relay 420; at its contacts 573 connects ground to the tone start lead 516 to prepare for the application of busytone to the subscriber line; at its contacts 574 connects busytone output lead 538 to conductor 210 and the calling subscriber, the circuit extending from busytone conductor 538 over contacts 574 to the subscriber negative conductor 210.

It is apparent from the foregoing description that in the event that the party has incorrectly dialled his own number, the checking equipment will automatically be operative to apply a busy signal to the line and to block dialling by the subscriber. That is, the checking relay 570 locks up over contacts 571 and is held thus as the cycling of the chain equipment proceeds. As the operating circuit is extended to the calling number terminating relay 360 following the cycle, the energizing circuit for the called number terminating relay 560 is also prepared.

Called party termination relay 560 operates, and at its contacts 567 applies battery to the composite conductor extending to the non-recorder trunk 25 at the distant exchange B to block further dialling thereover, and at its contacts 561 interrupts the circuit controlled by the dialling equipment of the subscriber which extends to the punch equipment in the recorder 23, whereby further operation of any of the seized equipment by the subscriber is prevented. The equipment restores as the subscriber returns his instrument to the handset, the method of release being described in greater detail hereinafter.

Assuming the check was completed satisfactorily, the equipment will have at this time effected the recording of the calling party number, the advancement of the recording tape 504 four steps, and an automatic check for the accuracy of the line number dialled by the calling subscriber. As a result of the four spaces which have been made on the tape by the stepping magnet as the counting chain was operated in the checking cycle, a suitable space separation has been inserted between the registered calling number and the called number which is to be now placed thereon.

It will be remembered that after the fourth digit of the calling party's number has been registered, the step magnet 500 was operated to produce one additional step. As a result there will be five spaces between the calling number and the called party number as registered on the tape 504. With the release of the outgoing control relay 340 following a satisfactory identification check, the described switch-through is effected, and further pulses transmitted by the dial of the subscriber are delivered to the recorder 23 and to the non-recording trunk 25 at the distant exchange B to set up a connection with the desired party thereat.

Actually, two other conditions must be satisfied to prevent the blocking relay 570 from operating and terminating extension of the call. That is:

(1). Relay 320 must be restored before relay 490 is operated. Briefly, equipment checks to see if relay 320 might have been pulled as a result of the calling party dialling a wrong calling number and hitting an answered busy line. The equipment makes such check by searching for the extension of an operating circuit of relay 570 through make contacts 322. If such condition exists, an operating circuit for the blocking relay 570 is established as follows:

−570, 341, 322, 492, 481, 452, 423+

(2). Relay 320 should be operated after relay 490 operates. Thus, the equipment checks for an operating circuit for relay 570 through break contacts of 321. Inasmuch as it takes a little time for relay 320 to operate, this checking circuit is run through contacts 482 of the second counting chain relay to guard against an unwarranted pulling of relay 570. With counting relays 480 and 490 operated, this checking circuit is as follows:

−570, 321, 494, 482, 452, 423+

(3). Relay 320 should restore after relay 490 restores. The equipment thus checks for an operating circuit of 570 through make contacts 322. This circuit is run through the break contacts of the first and second counting chain relays to provide a time period for relay 320 to drop before testing, and is effective on the step counting chain when 470 is held and 480 is released. The circuit is as follows:

−570, 322, 492, 481, 452, 423+

TRANSMISSION OF CALLED PARTY NUMBER

As the calling subscriber now dials the directory number of the desired party in the distant exchange B, the loop which has been completed to the trunk 16 is repeatedly interrupted to effect the pulsing of the line relay 330 in accordance with the value of the digits transmitted by the dial of the subscriber. Trunk relay 330 is effective at its contacts 331 to intermittently apply ground to the pulse hold relay 530 and the punch magnet 505 in the recorder 23, and at its contacts 332 is operative to apply intermittent ground to the switch hold relay 370. The pulse hold relay 530 is energized with the receipt of the first impulse of each digit, and being a slow to release relay, is maintained energized for the duration of the pulses which constitute each digit. The relays restore with the complete receipt of each digit and effect the advance of the tape one step between digits as in the registration of the calling number. Trunk line relay 330 at its contacts 333 repeats the incoming impulses to the test conductor supervisory relay 320 to effect the operation thereof a number of times corresponding to the number of impulses received, the circuit extending from ground over the winding of the relay 320, contacts 334 and 333, and the 500 ohm resistance to battery. The test conductor relay 320 in its operation is effective at its contacts 324 to apply intermittent battery to the composite conductor 539 and over the trunk line 24 to the composite relay 603 in the non-recording trunk 25, the circuit specifically extending from battery over the lamp 316, contacts 324, 374, 348, conductor 327, contacts 438, conductor 327, contacts 568, the upper winding of the local composite relay 580, conductor 539, resistance 588, conductor 587 of the trunk line 24, resistance 601, conductor 602, the upper winding of the composite relay 603 at the non-recorder end, contacts 698 and 665 to ground.

It will be recalled that with the energization of the outgoing control relay 340 responsive to the initial seizure of the trunk 16, relay 340 operated and at its contacts 347 connected battery to the composite conductor 539 to effect the operation of the composite relay 603 at trunk 25 to prepare the equipment thereat. The talking circuit, of course, was not switched through.

Responsive to this seizure of the distant trunk 25 and the composite relay 603, contacts 604 were closed to connect battery over the incoming call relay 640 to the positive conductor of the line circuit 26 thereat to effect energization of the line relay and the line circuit 26. As previously pointed out, the line circuit 26 has access to a number of regular links in exchange B, such as illustrated link 28, 29, and in its energization, it is now operated to effect the selection of an idle one of these links in the conventional manner.

Assuming the illustrated links, including linefinder 28 and selector 29, are seized, the series operating circuit for the connector link seizing relay 715 and the incoming call relay 640 is completed, the circuit extending from ground over the connector line relay 715, contacts of relays in, linefinder 28, conductor 655, contacts 695, conductor 606 contacts 604, and the winding of incoming call relay 640 to battery. Relay 715 at contacts 717 completes an obvious energizing circuit for associate relay 730 which operates and at its contacts 731 places ground on the test conductor to complete an operating circuit for supervisory relay 670. Relay 670 operates, and at its contacts 674 completes an operating circuit for relay 710 in series with relay 650. Relay 710 operates, and at its contacts 711 completes an energizing circuit for relay 765, which operates and at its contacts 768 prepares an obvious holding circuit extending over contacts 743 to ground. Relay 765 at its contacts 767 transfers the test circuit to link ground independent of relay 735. The trunk 25 is now prepared for receipt of impulses from the calling subscriber in exchange A.

As the calling subscriber dials the digit 3, which is the first digit of the directory number of the desired party (3122), three impulses will be extended over the connection to the trunk equipment 16 and the line relay 330 thereat will operate in response thereto to control the recorder 23 to record three punches, and controls the supervisory test conductor relay 320 to repeat three battery impulses over the trunk line 24 to the composite signal relay 603 in the trunk equipment 25 at the non-recorder end. Composite signal relay 603 operates in response to receipt of the three impulses, and is effective at its contacts 604 to pulse the incoming control relay 640 thereat in series with line relay 715 in the connector 29 of the seized link 28, 29, the series operating circuit for these relays extending from battery over the winding of relay 640, contacts 604 and 695, conductor 655 to the connector line relay 715 of the seized link 28, 29 and ground. The pulse hold relay 530 in the trunk 16 operates in the same manner as it did with receipt of the calling number to record the called party number, it being effective at its contacts 531 and 532 to control the advancement of the counting chain relays 460 to 490 inclusive, the counting chain advancing one step with the receipt of each digit, and being effective with the pulse hold relay 510 to effect the operation of the punch 505 and step solenoid 500 in the perforation and advancement of the tape 504 with each impulse of a digit as received. Following the receipt of each digit, the pulse hold relay 530 restores to advance the counting chain one step, and the step solenoid 500 is operated to produce a space between the digit recorded and the subsequent digit to be received, as heretofore described.

As the pulse hold relay 530 restores following receipt of the third digit to effect the operation of the fourth counting chain relay 460, an operating circuit is completed for the first flip-flop relay 450, and as the fourth counting chain relay 460 restores following receipt of the fourth digit of the called party number, the second flip-flop relay 440 is not energized in that the calling number termination relay 360 remained operated after the checking cycle of the counting chain, and has interrupted the energizing circuit for the relay 440 at the now open contacts 366.

As the fourth counting chain relay 460 restores, it is effective at its contacts 461 to complete an operating circuit for the called number termination relay 560, the circuit extending from battery over the winding of relay 560, contacts 563, conductor 397, contacts 367, conductor 398, contacts 461, 453, conductor 407, contacts 553, conductor 415, contacts 434 and 423 to ground.

The called party termination relay 560 operates, and at its contacts 561 interrupts the energizing circuit for the pulse hold relay 530 and the punch magnet 505 in the recorder 23, which has been controlled thus far by the dial equipment of the calling subscriber X. Further dialling by the subscriber at this time will be accordingly blocked from the recorder 23. The called number termination relay 560 at its contacts 562 also connects the trunk counting chain in a control circuit for the recorder equipment 23, at its make-before-break contacts 563 interrupts its original energizing circuit and transfers its energizing circuit to control of the release relay 420 independent of the control of other relays in the trunk 16; at its contacts 565 applies ground to the linefinder test wire 303 in preparation for lockout of the equipment thereat, and at its contacts 568 transfers the signalling circuit, which extends over the trunk line 24 to the equipment in the non-recorder trunk 25 to battery through lamp 16 independent of other contacts to guard against transmission of further dialling impulses over the trunk line 24 thereto.

It will be remembered that the composite relay 603, incoming call relay 640, the line relay 715 of the connector 29 in the link 28, 29, as well as hold relay 730 are operated with seizure of the link.

It will also be recalled that the links are arranged to distinguish between calls, whereby certain desired conditions of operation may be provided in accordance with the observed nature of the call. In the case of an incoming ticketing call for example, it is desirable to remove conversation disconnect in the connector, and such operation is controlled by the second line relay 710 in the connector as controlled by ground connected to the negative conductor 656 over relay 650 with the seizure of the link to operate same. Thus, as conductors 655, 656 and 657 are connected to the connector switch 29, an operating circuit is completed for both line relays 710 and 715, the operating circuit for the first line relay 715 extending from battery over the winding of the incoming call relay 640, contacts 604, conductor 606, contacts 695, conductor 655, the closed contacts of the operated tens and units relays in line finder 28, conductor 707, and the winding of the line relay 715 to ground. The circuit for the second line relay 710 extends from battery over the winding of the relay 710, conductor 708, the closed contacts in the operated tens and units relays in line finder 28, conductor 656, contacts 696, contacts 674, (relay 670 operated following operation of relays 715 and 730), and the winding of relay 650 to ground. On incoming ticketing calls, the energizing circuit for the second line relay 710 is maintained completed for the duration of the call to effect removal of conversation disconnect.

Line relay 710 operates to accomplish such disconnect, it being effective at its contacts 712 to interrupt the circuit for the disconnect relay 770, and at its contacts 711 to complete an operating circuit for the associate relay 765, the circuit extending from battery over the winding of associate relay 765, contacts 711 and 734 to ground. Relay 765 prepares a locking circuit, effective as relay 740 operates, and at its contacts 767 transfers connection of direct ground to the test conductor 704 extending back to the trunk 25 so that it is independent of contacts 738 on relay 735.

The line relay 715 operates to complete an operating circuit for associate hold relay 730, and at its contacts 716 connects the relay 720 to the negative side of the line, and otherwise prepares the connector switch elements in conventional manner for the receipt of the remaining digits of the called party directory number as they are to be dialled by the calling subscriber X.

As the impulses of the first digit to be dialled by the subscriber X are repeated by relay 320 in trunk 16 over the signal conductor 539 and trunk 24 to the composite relay 603 in the trunk 25, the incoming call relay 640 is pulsed in series with the line relay 715 of the connector switch 31 by the pulsing of composite relay contacts 604. The connector switch operates in conventional manner to absorb the first prefix digit. As the second digit is received, the connector operates to select the tens-line group in accordance with the value of the tens digit received.

As the third digit is dialled by the calling subscriber X, the connector switch 29 is controlled in a similar manner by the impulses received from the composite relay contacts 604 to select the desired units line in the chosen tens line group. After the units digit has been dialled and received by the connector 29 in the interval between the operation of the connector units relay (the contacts only of which are shown) and the operation of relay 760, a circuit is closed from the busy test relay 745 to the test conductor of the called line. If the called line is busy, ground on the test conductor of the called line 723 will effect the operation of the busy test relay 745. In such event the busy test relay 745 operates in the conventional manner to place busy tone on the negative conductor 656 and over contacts 696 to the negative conductor which reaches the calling subscriber set through the repeater coils and condensers. The release of the link with the return of a normal busy tone is controlled by the calling party in the conventional manner, the restoration of his receiver to the handset effecting release of the equipment seized thus far. The nature of the release in the trunks 16 and 25 will be described in more detail hereinafter.

Assuming that the called party line 3122 is not busy, relay 750 operates. When the fourth digit of the called party is dialled, the circuit operates in the conventional manner to place ringing current on the selected line 3122 in accordance with the value of the fourth incoming digit as dialled by the subscriber.

In the event that the called subscriber does not answer, the calling subscriber X restores his receiver to his handset and the equipment is released in a manner to be hereinafter more fully described.

CALLED PARTY ANSWERS

As the called subscriber R lifts his receiver to answer the call which has been extended to his substation, the loop extended by conductor 721 and 727 to the handset of the called subscriber is completed in the conventional manner, and an operating circuit for the relays 720 and 725 (as in the connector switch 29) is completed, the circuit extending from battery over the winding of relay 720, contacts 716, contacts 753, conductor 722, the substation of the called subscriber R, conductor 721, contacts 751, and the winding of relay 725 to ground. It is noted that the preparatory relay 750 is operated in the conventional manner immediately after the dialling of the units digits by the calling subscriber X.

As the relay 725 operates, it is effective at its contacts 726 to place 150 ohm ground on the P-wire extending to the trunk equipment 25. With the insertion of the 150 ohm ground in the test conductor circuit, the supervisory relay 660 in the trunk equipment 25 is rendered operative, the circuit extending from battery over contact 731, 150 ohm resistance, contacts 767, conductor 709, the contacts on the operated tens and units relays in the line finder switch 28, test conductor 657, contacts 675, the upper winding of test relay 670, contacts 672, the winding of relay 660 to ground.

With the operation of the supervisory relay 660, it is effective at its contacts 664 to connect battery to the signalling conductor 602, extending to the composite relay 580 in the trunk 16 at the recorder end of the equipment, the circuit specifically extending from battery over the illuminating lamp 647, contacts 664, contacts 698, the upper winding of the composite relay 603, conductor 602, resistor 601, conductor 587, resistor 588, conductor 539, the upper winding of the composite relay 580, contacts 567 to battery through lamp 316.

Composite relay 580 operates and at its contacts 581, completes an operating circuit for the answer control relay 410, the circuit extending from battery over the winding of relay 410, conductor 428, contacts 581, conductor 304, contacts 358 and a 500 ohm resistance to ground. Answer control relay 410 operates, and at its contacts 413 completes an obvious operating circuit for associate relay 400, and at its contacts 414 connects calendar pickup relay 550 to the calendar pickup conductor 519. Associate relay 400 operates, and at its contacts 401 interrupts a further point in the circuit to the recorder equipment 23 (as controlled by the dial equipment of the calling subscriber); at its contacts 402 prepares an energizing circuit for the recorder equipment 23 (as controlled by the answer control relay 410) and at its contacts 403 prepares a secondary holding circuit for the release relay 420.

CALENDAR OPERATION

The talking connection between the calling and called subscriber is completed and the conversation between the parties may be carried on in the conventional manner. The trunk 16 is connected at this time to the calendar 21 over pick-up lead 519 and is awaiting the receipt of the initiating signal therefrom. The calling and called numbers of the party have been registered on the tape 504, and a preliminary punch has been provided thereon to indicate that the call has been made by a subscriber in exchange A to a subscriber in exchange B. Also, the registered information has been suitably spaced on the tape to prevent any overlapping of punches and possible confusion in decoding at a later time.

The purpose of the calendar equipment 21 is to record the date in terms of month and day, as well as time of day, and to send out this information to the tape recorder 23 by way of trunk 16. The equipment is also operated to effect registration of the initial timing perforation on the tape.

The calendar equipment 21 is allowed approximately eight to ten seconds to send the aforementioned information, and in the event that the sending is not accomplished in this time, appropriate time delay means are operative to release the calendar and to sound suitable alarm equipment in the exchange office. Trunk relay 550 is effective at its contacts 557 to maintain the release relay 420 for the trunk operated until such time as the calendar has recorded the desired information on the tape. In this manner a complete recording of the information will be provided even though the subscribers hang up before the elapse of the time required to record the information.

The calendar basically comprises five multiple bank information bearing switches, the several wipers on each switch being connected with a single shaft. The shafts on switches 813, 948, 949 and 1068 are controlled by a single magnet per switch. The shaft on switch 1069 is operated manually. For example, with reference to the sequence switch 813, a single magnet 993 controls movement of a single shaft on which are mounted the wiper arms 970 for the first bank 969, wiper arm 967 for the second bank 966, wiper arm 964 for the third bank 963, and wiper arm 961 for the fourth bank 960. The banks of switches 813, 948, 949 and 1068 comprise a series of twenty-five contacts mounted in a semicircular arrangement relative to the drive shaft which is mounted centrally of the four switch banks. Thus, with operation and release of the associated magnet, such as 993 of switch 813, each of the four wiper arms is moved from the first contact to the second contact of its associated bank, and with the second operation of the magnet 903, each of the wiper arms are moved from the second contact to the third contact of its associated bank, etc. The other switch 1069 comprises six banks, each bank containing twelve contacts. The wiper arms of all six banks are connected to a common shaft, operated manually.

Switch 948 comprising banks 972, 975 and 978 controls the tenths of hour punchings on the tape 504. Switch 949, having banks 981, 984, 987 and 990, controls hours, tens, and units punchings on the tape 504. Switch 1068 having banks 1000, 1003, 1006 and 1009 controls the days, tens, and units punchings on the tape 504. Switch 1069 comprising banks 1013, 1019, 1016, 1021, 1024 and 1027 controls the months, tens, and units digit punchings on the tape equipment.

Switches 813, 948, 949 and 1068 are controlled by a six minute contact 802 in the clock equipment 22 to record information. This information is sent to the tape 504 in recorder 23 in conjunction with relays 880 and 890, and the calendar counting chain including relays 900 to 940, such information being transmitted over the conductors 514 and 527 which extend to the recorder 23 in the trunk equipment 16.

Each time the six minute contact 802 of the clock closes and opens, the magnet 995 associated with the second switch 948 is operated and released to effect the advance of the associated wiper arms 973, 976, 979 one step. Thus, when one hour has elapsed the wiper arms 973, 976, 979 will step to the eleventh contact of their banks. The stepping of wiper arm 976 in turn effects the operation of the stepping magnet 956 associated with the hour, tens, and units digit control switch 948. Contacts 11 and 12 on bank 978 in conjunction with contacts 884 of relay 800 step wipers 973, 976, 979 to contact 13 on this respective bank to start the second hour.

When twenty-four hours have elapsed, the magnet 956 associated with the hour switch will have advanced the wiper arms to the twenty-fifth contact in their associated banks. Wiper 988 effects the closure of the circuit for the magnet 1040 associated with the day switch 1068.

Inasmuch as the days of the month vary from 28 to 31, the day switch has a homing bank (bank 1009) which is arranged in conjunction with switch 1069 and relays 1050 and 1060 to reset or home to its first position after 20 days (position 21) after 28 days, 29 days, 30 days, and 31 days. Relays 1050 and 1060 associated with the transfer bank 1006 of the day switch also transfer the leads associated with the days tens bank 1003.

The wiper arms associated with the month banks are all ganged together and are set manually each month to control the punchings of the tens and units digit of the twelve months and to control the homing of switch 1068.

The positions on bank 1016 on the monthly switch are advanced one month with respect to the positions on the month bank 1013. At the end of each month, the day switch operates to effect completion of a circuit to a month control relay 1030, this circuit always passing through contacts 1066 and bank 1027, and at times through banks 1019, 1021 of the month switch and leap year contacts 1067. Relay 1030 locks to ground over make before break contacts 1037. Banks 1019 and 1021 being manually set along with the other banks of the month switch determine the number of days per month. Thus, when the day switch steps after the last day of the month has occurred, a circuit is completed to the control relay 1030. Relay 1030 transfers month tens digit to the succeeding month when necessary (0 to 1), and transfers the units digit to the month bank 1016 which is wired one month in advance of the first bank 1013. Before the end of this month, the manually operated month switch 1069 must be advanced to the next position. As the wiper 1028 passes from one position to another, sufficient opening of the circuit of relay 1030 allows same to release. Bank 1013 takes over the position of bank 1016 before the release of relay 1030. To more clearly illustrate the manner of operation of the month switch, the following illustration of operation is set forth, it being observed that the month switch may be advanced manually any time during the month. Assuming that sometime during January the months switch was advanced one position manually to the position shown, the wiper arms 1014, 1017, 1025, 1020, 1022, 1028 for all of the banks of the month switch should be on position one with the control relay 1030 released; at the end of the day on January 31st as the day switch has counted off the 31 days, an operating circuit is completed to the control relay 1030, extending from battery over the winding of relay 1030, bank 1027, wiper arm 1028, contacts 1038, contacts 1066, bank 1011, wiper arm 1010, lead 999, wiper arm 991, wiper 979, lead 818 to ground at contacts 884. The ground of the conductor 999 is supplied to switch magnet 1040 to home switch 1068.

The operation of the control relay 1030 transfers the units digits from bank 1013 to bank 1016. Position one, bank 1016, is set for February. The tens digit is not changed because January and February have the same tens digit (0). Before the end of February, the month switch is changed manually to position two on all banks.

The control relay 1030 releases as the wiper 1028 of month bank 1027 goes from position one to position two and transfers the units digit back to bank 1013 which is now on position two (February). Banks 1019 and 1021 are set to home the day switch at the end of the 28th day, (for leap year, 29 days, the leap year switch 1067 will be in open position). At the end of February, the control relay 1030 again pulls and transfers to March. Before the end of March, the month switch must be turned manually to position three and remains on March as the control relay 1030 releases.

The months tens digit is only switched by relay 1030 from the ninth to the tenth, and from the twelfth to the first month (0–1) (1–0).

TRANSMISSION OF INFORMATION TO TRUNK EQUIPMENT UPON SEIZURE

The operation of the calendar to transmit impulses indicative of the registered month, day, time of day, as registered on the banks and switches will be apparent from the following description. For purposes of simplicity of disclosure, it is assumed that the wiper arms on the sequence switch are at position one.

With the operation of the answer control relay 410, responsive to answer of the call by the called subscriber and the closure of the contacts 414, the calendar pick-up reay 550 in the trunk is connected in series with a pick-up relay 830 in the calendar equipment to effect the operation of the pick-up relay 830 only if the calendar is free, the operating circuit extending from battery over the winding of relay 550, contacts 544, C417, contacts 414, C376, contacts 323, C377, contacts 546, C519, contacts 847, 853, 849 and the winding of pick-up relay 830, contacts 823 to ground. The pick-up relay 830, has a winding which is in the order of 2000 ohms and prevents the operation of the series connected calendar pick-up relay 550. Pick-up relay 830 operates and at its contacts 833 completes an operating circuit for the time delay timer relay 850 in the calendar equipment, the circuit extending from battery over the lower winding of the delay relay 850, contacts 833 and 884 to ground. The time delay relay 850 operates, and at its contacts 851 completes a charging circuit for associate condenser 828 which extends from battery over the capacitor, contacts 845, contacts 883, 60 ohm resistance, contacts 851 and 833 and 884 to ground. It is noted that relay, 850 is a slow-to-operate relay whereby line transients which might give a momentary answer signal are prevented from operating the relay and effecting seizure of the calendar. The slow-to-release characteristics are provided by the charged condenser as will be explained shortly hereinafter.

Time delay relay 850 in operating is also effective at its contacts 852 to complete an operating circuit for the calendar pick-up relay 550 in the trunk equipment, and at its contacts 853 interrupts the series circuit to the pick-up relay 830, and 830 responsively restores. The operating circuit for relay 550 is as follows: battery through relay 550, contacts 544, conductor 417, contacts 414, conductor 376, contacts 323, conductor 377, contacts 546, conductor 519, contacts 847, contacts 852, conductor 816, contacts of bank 969, wiper 970 to ground.

As the calendar pick-up relay 550 operates, it is effective at its contacts 553 to interrupt holding ground for flip-flop relay 450, at its contacts 555 to connect ground to conductor 517 which extends the ground to the calendar to effect the operation of the start relay 840 thereat, at its contacts 556 locks to calendar ground over conductor 518 independent of further equipment in the trunk circuit, at its contacts 557 completes an operating circuit for the clock control relay 540 in the trunk, and at its contacts 552 and 558 connects the calendar to the recording equipment 23 in the trunk.

Clock control relay 540 operates, and at its contacts 541 transfers the spacer relay 520 to the control of the clock equipment by connecting same to clock conductor 515; and at its contacts 542 disconnects spacer relay 520 from control of the trunk equipment 16; at its contacts 543, 545 prepares further points in the clock control circuit; at its contacts 544 interrupts a point in the original energizing circuit for the calendar pick-up relay 550; at its contacts 546 interrupts another point in the connection of the pick-up relay 550 to the pick-up conductor 519 of the calendar equipment; at its contacts 547 locks in series with relay 420 completing a secondary holding circuit for release relay 420; and at its contacts 548 interrupts the trunk operating ground for the step magnet 500 in the recording equipment 23.

The start relay 840 operates, and at its contacts 845 interrupts a point in the original energizing circuit for the capacitor associated with time delay relay 850; at its contacts 847 interrupts the ground from bank 969 of switch 813 which was extended over conductor 519 to the calendar pick-up relay 550 in the trunk. Calendar pick-up relay 550 is now held over conductor 518. As a result of the opening of a circuit to the pick-up conductor 519, the absence of ground prevents other trunks from seizing the calendar for the period that the calendar is in use. The start relay 840, at its contacts 842 completes an operating circuit for the pumping relays 880 and 890, with the circuit for the first relay 890 extending from battery over the winding of relay 890, contacts 881, 861 and 842 to ground.

The pumping relays 880 and 890 are arranged to drive the step or punch magnet of the recorder 23 dependent upon the position of switch 813 of bank 963, and the counting chain comprising relays 900 to 940 inclusive in the calendar equipment, until such time as the original energizing circuit therefor has been interrupted. Specifically, relay 890 operates with the completion of the energizing circuit thereto by the start relay 840 and at its contacts 894 completes an operating circuit for the second pumping relay 880; at its contacts 892 extends its operating ground over conductor 805 to the first relay 900 of the counting chain; and at its contacts 895 completes a stepping circuit for the step or punch solenoid 500 in the trunk recorder 23, the circuit extending from ground over the contacts 895, conductor 807, wiper 964, the first contact on bank 963 of switch 813, C527, contacts 558, C578, and the winding of the step solenoid to battery.

The first counting chain relay 900 operates over a circuit extending from battery, the winding of relay 900, contacts 914, 924, 934, 943 and C805, contacts 892, 861 and 842 to ground, and at its contacts 902 prepares a series energizing circuit for the second counting chain relay 910.

The second pumping relay 880 operates, and at its contacts 881 interrupts the initial energizing circuit for the first pumping relay 890, which is slow-to-release and accordingly remains in the operated condition for a brief period of time thereafter. After the elapse of a predetermined period of time, the first pumping relay 890 restores and at its contacts 891 completes a series operating circuit for the first and second counting chain relays 900 and 910; at its contacts 892 interrupts the original energizing circuit for the first counting chain relay; at its contacts 894 interrupts the energizing circuit for the second pumping relay 880, at its contacts 895 removes ground from the stepping conductor 527 which extends to the step solenoid 500 in the trunk recorder 23. Step solenoid 500 is released to effect the consequent advancement of the tape in the recorder one step.

The second counting chain relay 910 operates in series with the first counting chain relay 900 over a circuit extending from negative battery over the winding of relay 900, the upper winding of relay 910, contacts 902, C804, contacts 891 and 861, 842 to ground. Upon operation, the second counting chain relay 910 at its contacts 912 prepares a series operating circuit for the third counting chain relay, and at its contacts 913 prepares a self holding circuit, which is completed as the pumping relay 890 reoperates.

The second pumping relay 880 being slow-to-release remains operated for a brief period of time and, after the expiration of said period, restores to effect at its contacts 881 the recompletion of the operating circuit for the first pumping relay 890.

As the relay 890 again operates, it is effective at its contacts 895 to connect operating ground to the step conductor 527 to effect the energization of the step solenoid 500 in the trunk recorder 23; and at its contacts 894 recompletes the energizing circuit for the second pumping relay 880 to effect the energization thereof and at its contacts 891 releases relay 900. The second pumping relay 880 operates, and at its contacts 881 interrupts the energizing circuit for the first pumping relay 890. After the elapse of a predetermined period of time, the first pumping relay 890 restores, and at its contacts 891 completes the series operating circuit for the second and third counting chain relays 910 and 920 respectively, the circuit extending from battery over the lower winding of relay 910, the upper winding of relay 920, contacts 912, 901, C804, contacts 891, 861 and 842 to ground. Relay 890 at its contacts 892 also interrupts the holding circuit for the second counting chain relay 910; at its contacts 895 removes ground from the step conductor 527 to effect the release of the step solenoid 500 in the trunk register 23 and the advance- 894 interrupts the energizing circuit for the second ment of the tape 504 thereat one step, and at its contacts pumping relay 880.

Third counting chain relay 920 operates, and at its contacts 922 prepares a series energizing circuit with the fourth counting chain relay 930; at its contacts 923 prepares a self-holding circuit; and at its contacts 927 prepares an energizing circuit for the stop driving relay 860. The release of relay 880 effects re-establishment of the circuit for relay 890, which reoperates. Relay 890 in its reoperation effects energization of relay 880; energizes solenoid 500; and releases counting chain relay 910. The release of relay 910 completes the following circuit which was prepared with operation of counting chain relay 920, negative battery over the winding of relay 860, C806, contacts 955, 906, 918, 927, first contacts on bank 960 of sequence switch 813, wiper arm 961, C808, contacts 842 to ground. The stop drive relay 860 operates; and at its contacts 861 interrupts the energizing circuit which has been extended to the pumping relays 880 and 890 to open the energizing circuit thereof to prevent further pumping thereby. Thus, as the second pumping relay 880 operates it is effective to open a further point for the first pumping relay 890. As the first pumping relay 890 restores after the elapse of a predetermined period of time, it is effective at its contacts 894 to effect the restoration of the second pumping relay 880, and at its contacts 895 effects release of the step solenoid 501 to advance the tape. The removal of ground by the opening of contacts 861 also interrupts the further energizing and holding circuit for the operated counting chain relay 920 to effect the restoration thereof.

The stop drive relay 860 at its contacts 863 is also effective to complete an energizing circuit for the step magnet 993 associated with the first sequence switch 813 to effect the operation thereof. Step magnet 993 at its contacts 994 is also effective to complete an operating circuit for the associate stop drive relay 870, the circuit extending from battery over the winding of relay 870, C824, contacts 994, C818, contacts 884 to ground. Associated stop drive relay 870 operates, and at its contacts 871 interrupts the energizing circuit for the first stop drive relay 860 which, being slow to release, remains in the operated position for a brief period thereafter; at its contacts 873 connects ground to the step conductor 527, which extends to the step solenoid 500 and the trunk recorder 23 to effect the energization thereof, the circuit being extended over the contact 863 of the stop drive relay 860 which remains in the operated position for a brief period of time after interruption of the energizing circuit, and at its contacts 876 reoperates relay 880. As the relay 860 subsequently restores, it also interrupts the energizing circuit to the step solenoid to effect the release thereof and the advancement of the tape 504 one step. Relay 860 in restoring is also effective at its contacts 863 to interrupt the energizing circuit for the stepping magnet 993 to effect the release thereof which, in its restoration, is effective at its contacts 994 to interrupt the holding circuit for the stop drive relay 870 which responsively restores, releasing 880. Wiper arms 961, 964, 967, and 970 are advanced one step to the second contacts in their associated bank responsive to the release of magnet 993. Relay 860 is also effective at its contacts 861 in its restoration to recomplete the energizing circuit for the pumping relays 880 and 890.

It will be recalled that the tape member upon which the called number has been recorded has now been advanced six step, that is, the tape was advanced two steps responsive to the action of the punch magnet and the trunk relays 510 and 530 following the recording of the last digit of the called number, and the counting chain and pumping relays in the calendar have transmitted three impulses to the step magnet 500 of the recorder 23 to effect the operation thereof three times and in the advancement of the tape 504 three more steps. One additional step is provided by the operation of drive stop relays 860 and 870. However, the first punch of the months tens digits occurs in the sixth space, and accordingly only five spaces separation will exist between the called number and the months tens digit as recorded on the tape member. Specifically, assuming that the described call is made on the first month, 26th day, 13th hour (1:00) 4/10 of an hour (24 minutes), and that the month switch was manually operated during January to the position shown, thus releasing relay 1030, it is apparent from the foregoing description of the calendar herein that the switches will be in the following positions, the switches in the month switch 1069 will be on the first contact of the banks thereof, the wiper arms of the day switch 1068 will be on the sixth contacts of the respective banks, the wiper arms of the hour switch 949 will be on the 14th contact of their respective banks, and the wiper arms on the hours tenth switch 948 will be on the fifth contact of their respective banks.

As the counting chain is now operated following the described advancement of the tape in the recorder to provide the necessary spaces between the recorded called number and the information concerning the call, the calendar is effective to transmit the digits which are informative of the particular month of the year in which the call is being made. In the present example, the month being assumed to be January, the digits transmitted will be 01.

The first pumping relay 890 operates to initiate the pumping operation of the relays 880 and 890, and the advancement of the counting chain in the calendar is effected in the manner just described. As a result of the advancement of the wipers in the sequence switch 813 to the second contact of the banks thereof, and specifically as a result of the advancement of the wiper arm 964 to its second contact, a circuit is prepared for the punch solenoid 505 with each energization of the pump relay 890, the energizing circuit of solenoid 505 being as follows: battery, solenoid 505, conductor 513, contacts 552, conductor 514, the multiple contacts of bank 963 extending to contact 2 thereof, the wiper arm 964, conductor 807 and contacts 895 to ground.

The punch magnet in operating effects the punching of the tape as before, and at its contacts 506 completes an energizing circuit for the step solenoid 500. As punch solenoid releases responsive to release of the first pumping relay 890, it is effective at its contacts 508 to interrupt the energizing circuit for the step solenoid 500 to effect the restoration thereof and the advancement of the tape 504 one step. Also, with each operation of the first pumping relay 890, the opening and closing of the contacts 891 and 892 advance the counting chain comprising relays 900 to 940 until such time as the counting chain reaches a point where it completes a prepared circuit which corresponds to the digit which is presently registered on the first monthly digit bank 1013 of the monthly switch 1069.

At such time an operating circuit is completed for the stop drive relay 860 to prevent further operation of the pumping relays 880 and 890, and the counting chain responsively operates to the tenth position. As the counting chain advances in the manner heretofore described, the pumping of the relays 880 and and 890 transmits ground over the punch conductor 514 to the punch solenoid in the trunk recorder 23. As the chain advances to the fifth step, relay 940 of the counting chain is effective at its contacts 941 to complete an energizing circuit for the recycle relay 950, which operates. Relay 950 at its contacts 952 completes a self-holding circuit and at its contacts 951 and 952 completes an energizing circuit extending over contacts 861 and 842 to ground, whereby it is held operated for the second cycle of the counting chain. It will be recalled that, with the operation of the pumping relay 890 for the fifth time, it is effective at its contacts 891 to interrupt the series holding circuit for the fourth and fifth counting chain relays, and is effective at its contacts 892 to complete a holding circuit for the fifth counting chain relay. Upon release of first pumping relay 890, the previously described circuit for counting chain relay 940 and counting chain recycle relay 950 is established, and upon operation of relay 950, relay 940 is released. The reoperation of relay 890 once more provides an energizing circuit for the first counting chain relay 900.

As ten impulses have been transmitted, and the counting chain has advanced to the fifth counting chain relay 940 for the second time, the operating circuit prepared to the stopping relay 860 by the month bank is now completed, the circuit extending from battery over the winding of relay 860, C806, contacts 954, contacts 904, 916, 926, 936, 944, C907, the first contact of multiple contacts 1026 in bank 1024, the wiper 1025, C1043, the second contact in bank 969 of sequence switch 813, arm 961, C808 and contacts 842 to ground.

The drive stop relay 860 operates, and at its contacts 861 interrupts the energizing circuit for the pumping relays 880 and 890 to terminate the pumping thereby and the corresponding advancement of the counting chain. At this time, the contact 895 on the first pumping relay 890 will have transmitted ten impulses over the punching conductor 514 to the punch equipment 505 in the trunk recorder 23, and ten perforations will have been placed on the tape member 504.

As drive stop relay 860 operates, it is also effective at its contacts 863 to complete an operating circuit for the step magnet 993 associated with the sequence switch 813, which magnet operates to prepare the advancement of each of the wiper arms 960, 963, 966, 969 to the third contact of their associated banks. The wiper arms are operative in such position to prepare control circuits to the counting chain to cause same to locate the next digit (a month units digit) of information which is set up on the months switch 1069.

The sequence switch magnet 993 operates, and at its contacts 994 completes an operating circuit for the associate drive stop relay 870 which extends from battery over the winding of relay 870, contacts 994, and at its contacts 876 reoperates relay 880, and 884 to ground. The associate relay 870 operates and at its contacts 871 interrupts the holding circuit for the drive stop relay 860 to effect the release thereof, which restores, and in turn at its contacts 863 interrupts the holding circuit for the stepping magnet 993 to effect the release thereof and thereby advance the wiper arms to the third contact position in the banks. The stepping magnet 993 in restoring is also effective at its contacts 994 to interrupt the holding circuit for the associated relay 870 to effect the restoration thereof. The release of relay 870 effects restoration of relay 880. Inasmuch as the drive stop relay 860 is slow-to-release, an additional driving step for the tape member in the trunk recorder 23 will be provided, the contacts 863 on the drive stop relay being held closed for a time period sufficient to effect the connection of ground over contacts 873 of the associate relay 870 to the stepping conductor 527.

Thus, an operation of the step solenoid 500 in the trunk register 23 effects the advancement of the tape 504, as heretofore described, and the imposition of a blank space on the tape following the registration thereon of the first month's digit (0). As the stop pulsing relay 860 restores, it is effective at its contacts 861 to re-complete the energizing circuit for the pumping relays 880 and 890 which now pump the counting chain, as heretofore described, until such time as it reaches the circuit which has been prepared on the month's switch to indicate the month unit identifying digit for the months to be transmitted to the recorder 23. Since it has been assumed that the call is being made in the month of January, the representative digit will be 1. Inasmuch as only one impulse is to be transmitted, the chain will encounter the prepared circuit as it advances to the first relay 900 thereof, and at such time the drive stop relay 860 will again be energized to terminate further transmission of impulses for this digit. Specifically, as the first counting chain relay 900 energizes responsive to the first operation of the first pumping relay 890, it is effective at its contacts 903 to complete an operating circuit for the drive stop relay 860 which extends from battery over the winding of relay 860, C806, contacts 955, contacts 905, C949, the first contact bank 1013, wiper arm 1014, contacts 1035, C1042, the third contact of bank 960, wiper 961, C808, and contacts 842 to ground.

The pumping relay 890 has been operated only once as the drive stop relay 860 is energized to become effective at its contacts 861 to interrupt a circuit for the pumping relays, and accordingly only one impulse will have been transmitted by contacts 895 over the bank 963 of the first sequence switch 813 and the punch conductor 514. Therefore, only one punch will appear on the tape 504 in the recorder 23 for this digit.

The drive stop relay at its contacts 863 again completes an operating circuit for the step magnet 993, which prepares to advance the wiper arms on the sequence switch 813 one step to the fourth contacts of their respective banks; and at its contacts 994 recompletes the energizing circuit for the associate drive stop relay 870 to effect the energization thereof.

Associate relay 870 operates and at its contacts 871 interrupts the holding circuit for the drive stop relay 860 to effect the restoration thereof. The drive stop relay 860, being slow to release, remains held over a period of time sufficient to effect the connection of ground over contacts 863 and 873 to the step conductor 527 to thereby effect the advancement of the tape in the trunk register 23 one step.

As the drive stop relay 860 restores after the elapse of the predetermined time period as determined by its slow-to-release characteristics, it is effective at its contacts 863 to interrupt the holding circuit for the step magnet 993 to effect the release thereof. Step magnet 993 in restoring is effective at its contacts 994 to interrupt the holding circuit for the associate relay 870 to effect the restoration thereof, and to advance the wiper arms on the sequence switch 813 one step to the fourth contacts of their respective banks. The drive stop relay 860 at its contacts 861 also prepares an energizing circuit for the first pumping relay 890, which circuit is rendered ineffective at this time by contacts 881 of relay 880. The associate relay 870 restores and at its contacts 871 recompletes an energizing circuit for the drive stop relay 860, which operates and at its contacts 861 again interrupts the energizing circuit for the pumping relay to prevent the operation thereof in the advancement of the counting chain. The operating circuit for the drive stop relay 860 now extends from battery over the winding of the relay 860, contacts 871, conductor 827, the fourth contact on bank 960, wiper arm 961, conductor 808 and contacts 842 to ground.

As the drive stop relay 860 now operates, it is again effective at its contacts 863 to reoperate the step magnet 993 for the sequence switch 813 to effect the operation thereof, and prepares for the advancement thereby of the associate wiper arms 961, 964, 966 and 969 to the fifth contact of their associated banks. The step magnet 993 at its contacts 994 recompletes the energizing circuit for the associate relay 870, which operates and at its contacts 871 interrupts the holding circuit for the drive stop relay 860. Drive stop relay 860 remains operated for a period of time sufficient to effect the application of ground over contacts 873 and conductor 527 to the step relay magnet in the trunk recorded equipment 23, to effect thet advancement of the tape 504 one more step. One additional spacing is thus provided between the month and days identification impulses to be recorded thereon. Relay 870 also upon releasing interrupts the holding circuit of relay 880 over contact 876. Relay 860 and subsequently relay 880 restore to recomplete the circuit to relay 890. As relay 860 restores it is effective at its contacts 863 to interrupt the holding circuit for stepping magnet 993 to effect the release thereof and thereby advance the wiper arms 961, 964, 966 and 969 to the fifth contact of their associated banks.

The calendar is now operative to transmit the registered days tens digit. Having assumed the described call is taking place on January 26, the days ten digit to be recorded at this time is digit 2, and as the drive stop relay 860 restores to recomplete the energizing circuit to the pumping relays 880 and 890, the pumping relays cause the counting chain to hunt for the recorded digit 2 on the days tens bank 1003 and to transmit a corresponding number of impulses over the punch conductor 514 to the trunk recorder 23.

As the pumping relays 880 and 890 operate to effect the advancement of the counting chain in the manner heretofore described, and as the counting chain advances to the second relay 910 thereof, its associated contacts 917 are closed to complete the prepared stop circuit. Specifically, the days tens arm 1004 of any month will be positioned on contact 6 of its associate bank 1003. As the counting chain advances to its second relay 910 in hunting for the registered days tens digit, the circuit will be completed for the drive stop relay to energize same. Such circuit extends from battery over the winding of relay 860, conductor 806, contacts 955, contacts 906, 917, conductor 948, contacts 1053, contact 6 of bank 1003 on the days switch 1068, wiper arm 1004, conductor 949', the fifth contact of bank 960 in the sequence switch 813, wiper arm 961, conductor 808, contacts 842 to ground. A drive stop relay 860 operates in the manner heretofore described to effect at its contacts 861, the interruption of the driving circuit for the pumping relays 880 and 890 whereby the advancement of the counting chain is terminated. At this time the first pumping chain relay 890 at its contacts 895 will have transmitted two pulses to the punch magnet 505 in the trunk recorder 23, and two perforations representing the days tens digit will have been imposed upon the tape member 504 thereby. Drive stop relay 860 at its contacts 863 completes an operating circuit for the stepping magnet 993 of the sequence switch 813 to prepare for the advancement of the wiper arms on the switch to the sixth contacts of the associated banks, and at its contacts 994 completes an energizing circuit for the associate stop relay 870 to energize same. The associate drive stop relay 870 operates, and at its contacts 871 interrupts the holding circuit for the drive stop relay 860, which remains energized for a period of time sufficient to effect the application of ground over contacts 863 and 873 to the step conductor 527 and the trunk recorder 23, to thereby effect the energization of the step solenoid 500 and the advancement of the tape member 504 thereat one step. In this manner one space is provided between the days tens and units digits as recorded on the tape member. As drive stop relay 860 restores, and at its contacts 863 interrupts the energizing circuit for stepping magnet 993 to restore same, the magnet effects the advancement of the wiper arms on the switch to the sixth contacts of the associated banks.

The advancement of wiper arm 960 in the sequence switch 813 to the sixth position now prepares the calendar for the transmission of the units digit (in the illustrated example of January 26, digit 6) and accordingly the drive stop relay 860 restores to prepare at its contacts 861 an energizing circuit for the pumping relays 880 and 890 which becomes effective upon the release of relays 870 and 880. The chain is advanced thereby to the fifth relay thereof and recycled to advance to the first relay 900, wereby six impulses will be transmitted by the pumping of relay 890 over bank 963 of the sequence switch 813 to the punch conductor 514 for trunk recorder 23. Accordingly, the punch solenoid 505 and the step solenoid 500 will be operated six times to effect the registration of the units digit 6 by perforating the tape thereat six times. The drive stop relay 860 will be energized to terminate the pumping by relays 880 and 890 and the advancement of the counting chain after the transmission of six impulses by a circuit extending from battery over the winding of relay 860, conductor 806, contacts 954, contacts 903, conductor 929, the sixth contact on the bank 1000 on the day switch 1068, wiper arm 1001, conductor 948', the sixth contact on the bank 960 on the sequence switch 813, wiper 961, conductor 808, contacts 842 and ground.

As the drive stop relay 860 operates, it is operative at its contacts 863 to again control the stepping magnet 993 in the advancement of the wiper arm thereof to the seventh contact of their associated banks, and to prepare the calendar for the transmission of an additional space impulse to effect placement of an additional space between the days and hours recording information on the tape at the recorder 23. The stepping magnet 993 operates and at its contacts 994 recompletes an energizing circuit for the associate drive stop relay 870, which operates and at its contacts 871 interrupts the holding circuit for the drive stop relay 860. The drive stop relay 860 remains energized for a period sufficient to effect the application of ground over contacts 863 and 873 and conductor 527 to effect the stepping of the step solenoid 500 in the trunk recorder 23 and the advancement of the tape 504 thereat one step.

Drive stop relay 860 releases, and at its contacts 863 restores step magnet 993 and the wipers are advanced to the seventh contact position. Step magnet 993 is also effective at its contacts 994 to effect the release of the associate drive stop relay 870 which restores to recomplete an energizing circuit for the drive stop relay 860. Relay 880 being slow to release, holds for a brief period thereafter, which is sufficient to permit relay 860 to operate, which in turn, at its contacts 861 opens a further point in the operating circuit for relay 890 prior to the closing of the circuit at contacts 881 by the restoring relay 880. Advancement of the counting chain at this time is thus prevented.

The energizing circuit for the drive stop relay 860 extends from battery over the winding of relay 860, contacts 871, conductor 827, the seventh contact of band 960, wiper arm 961, conductor 808 and contacts 842 to ground. The drive stop relay 860 at its contacts 863 reoperates the stepping magnet 993, which prepares to advance the wiper arms of the associated sequence switch one step to the eighth contact in their associated banks, and at its contacts 994 effects reenergization of the associate drive stop relay 870. Relay 870 operates and at its contacts 871 interrupts the holding circuit for the drive stop relay 860 to effect the release thereof, and at its contacts 876 holds relay 880 energized to prevent immediate energization of relay 890 upon release of relay 860. Drive stop relay 860 is slow-to-release and accordingly is operative wth its associate relay 870 to effect transmission of a stepping impulse over conductor 527 with its associate relay 870 in the manner heretofore described. Thus two steps will have been provided between the registration of the days units digit and the succeeding hours tens digit which is to be the next digit to be recorded. Stop relay 860 in its restoration is effective at its contacts 863 to restore step magnet 993, which is in turn effective to advance the wiper arms of the associated sequence switch one step to the eighth contact in their associated banks. Magnet 993 releases relay 870 which restores to prepare a circuit to relay 860. Relay 870 releases relay 880.

The sequence switch 813 in its advancement to its eighth step prepares the hours tens digit switch bank 984 for connection to the counting chain, whereby the counting chain in its advancement will now determine the hour of the day and cause such hour to be transmitted to the trunk recorder 23.

Specifically, as drive stop relay 860 restores after the elapse of its predetermined period of time, it is effective at its contacts 861 to complete the energizing circuit for the pumping relays 880 and 890, which with release of relays 870 and 880 pump the counting chain to advance same to the first counting chain relay 900. Inasmuch as it has been assumed that the call is being made at 1 o'clock in the day (13th hour), the hours tens digit will be 1 and the pumping relays will be stopped after advancement to the first counting chain relay. The stopping circuit for energizing the drive stop relay 860 at this time extends from battery over the winding of relay 860, conductor 806, contacts 955, contacts 985, conductor 949, the fourteenth contact of the hours tens bank 984 in the switch 949, wiper arm 985, the eighth contact of bank 960 and the sequence switch 813, wiper arm 961, contacts 808 and contacts 842 to ground.

The drive stop relay 860 operates, and at its contacts 863 completes an energizing circuit for the step magnet 993 of the sequence switch 813 to prepare same for advancement of the wipers thereon to the ninth contact of their associated banks and energization of the associate drive relay 870 in the manner heretofore described. Associate relay 870 operates and at its contacts 876 completes an operating circuit for relay 880 and at its contacts 871 interrupts the holding circuit for the drive stop relay 860. The drive stop relays 860 and 870 cooperate at their contacts 863 and 873 to connect ground to the step conductor 527 for a period of time sufficient to effect the energization of step solenoid 500 and the advancement of the tape 504 thereat one step. As drive stop relay 860 restores, it is effective at its contacts 863 to interrupt the energizing circuit for step magnet 993, which in turn restores to advance the wiper arms to the ninth contact of the associated banks. Magnet 993 also effects the restoration of relay 870 which prepares an operating circuit for relay 860. Relay 870 restores relay 880.

The sequence switch 813 in its advancement of its wiper arms to the ninth contact of the associated banks is effective at its bank 960 to prepare connection of the hour units bank 981 to the counting chain for determination thereby of the hours units digit (3 in the given example) and for transmission of such information to the recorder equipment of the trunk recorder 23.

Accordingly, the drive stop relay 860 restores after the elapse of its predetermined period of time completing at its contacts 861 the energizing circuit for the pumping relays 880 and 890; the pumping relays are operative then to advance the counting chain to its third relay 920 and to simultaneously transmit three impulses over contacts 895, wiper arm 964, the ninth contact of bank 963 and punch conductor 514 to the trunk recorder 23. The transmitted impulses effect the perforation of the tape 504 thereat three times as an indication of the hour units digit.

As the counting chain advances to the third relay 920, an operating circuit is completed to the drive stop relay 860 which extends from battery over the winding of relay 860, conductor 806, contacts 955, contacts 906, 918, 927, conductor 947, the fourteenth contact of the hours units bank 981, wiper arm 982, the ninth contact of bank 960 of sequence switch 813 and wiper arm 961, conductor 808 and contacts 842 to ground.

As the drive stop relay 860 operates, it is effective at its contacts 863 to complete an operating circuit for the step magnet 993 associated with the sequence switch 813 to prepare for the advancement thereby of the wiper arms 961 etc., to the tenth contact of the associated banks, and at its contacts 861 to terminate the pumping by the relays 880 and 890 and the advancement of the counting chain. The stepping magnet 993 completes the energizing circuit for the associate drive stop relay 870 which operates, and at its contacts 876 completes an operating circuit for relay 880, and at its contacts 871 interrupts the holding circuit for the drive stop relay 860 to effect the release thereof and the transmission by the drive stop relays 860 and 870 of a stepping impulse over the conductor 527 to the trunk recorder 23 as heretofore described. As relay 60 restores, it is effective at its contacts 863 to restore step magnet 993 which is in turn effective to effect the advancement of the wiper arms to the tenth contact of the associated banks. Magnet 993 also effects the restoration of relay 870 which prepares an operating circuit for relay 860. Relay 870 restores relay 880.

With the advancement of the wiper arms of the sequence switch 813 to the tenth contact of the associated banks, the bank 960 is effective to prepare the hours tenth bank 972 for connection to the counting chain, whereby the counting chain may determine the hours tenths digit for transmission to the trunk recorder 23. Since it has been assumed that the call is being made at 24 minutes past the hour, wiper arm of the hours tenths bank at this time will be on the fifth contact of the hours tenths bank 972. Accordingly, as the drive stop relay 860 restores, and at its contacts 861 completes the energizing circuit for the pumping relays 880 and 890 which are effective with the release of relays 870 and 880 to advance the counting chain to the fourth counting chain relay 930, and to simultaneously transmit four impulses over contacts 895, conductor 807, wiper arm 964, the tenth contacts of bank 963, the punch conductor 514 and the trunk recorder 23. The four impulses effect the operation of the punch magnet and step magnet thereat four times and the corresponding perforation of the tape to indicate that the call is being made between 24 and 30 minutes past the hour.

As the counting chain is advanced to relay 930 thereof, and relay 920 is released, an operating circuit for the drive stop relay 860 is completed to terminate transmission of the impulses to the trunk recorder 23. The stop circuit extends from battery over the winding of relay 860, conductor 806, contacts 955, contacts 906, 918, 928, 937, conductor 946, the fifth contact of bank 972, wiper arm 973, the tenth contact of bank 960, wiper arm 961, conductor 808 and contacts 842 to ground. As the drive stop relay 860 is operated, it is effective at its contacts 861 to interrupt the energizing circuit for the pumping relays 880 and 890, whereby the advancement of the counting chain is terminated and the restoration thereof and the pumping relays 880 and 890, which deenergizes the punch solenoid 505 and in turn the step solenoid 500 advancing the tape. Relay 860 at its contacts 863 is also effective to complete an energizing circuit for stepping magnet 993 associated with sequence switch 813 to prepare the advancement of the wipers associated therewith to the eleventh contacts of their associated banks.

Step magnet 993 at its contacts 994 also completes an energizing circuit for the associate drive stop relay 870 which operates, and at its contacts 876 completes an operating circuit for relay 880, and at its contacts 871 interrupts the holding circuit for the drive stop relay 860 to effect the restoration thereof. Drive stop relay 860 holds for a time period sufficient to cooperate with its associate relay 870 to effect the transmission of the ground impulse over contacts 863, 873 and step conductor 527 to the trunk recorder 23 to effect the advancement of the tape 504 one step thereat. As the drive stop relay restores, it is effective at its contacts 863 to release the step magnet 993 which in turn restores associated relay 870, which releases relay 880. Stepping magnet 993 in restoring is effective to advance the wiper arms to the eleventh contacts of the associated banks. Relay 860 at its contacts 861 recompletes the energizing circuit for the pumping relays 880 and 890, which is effective with release of relays 870 and 880 to control pumping relays 880 and 890 to advance the counting chain to the fifth relay 940 thereof in the manner heretofore described. The pumping relay 890 is effective at its contacts 895 to transmit five ground impulses over conductor 807, wiper arm 964, and, the eleventh contacts of the bank 963 in sequence switch 813 to the stepping conductor 527 extending to the trunk recorder 23 to effect the operation of the step solenoid five additional times.

As the pumping relay 890 operates, and releases for the fourth time to effect operation of the fifth counting chain relay 940, and then reoperates for the fifth time releasing the fourth counting chain relay 930, an operating circuit is completed for the drive stop relay 860 which extends from battery over the winding of relay 860, contacts 806, contacts 955, 906, 918, 928, 938, 945, the eleventh contact of bank 960 of sequence switch 813, wiper arm 961, conductor 808 and contacts 842 to ground. Drive stop relay 860 operates, and at its contacts 861 interrupts the energizing circuit for the pumping relays 880 and 890 to terminate operation thereof, and the transmission of stepping pulses to the stepping solenoid 500 and trunk recorder 23. The advancement of the calendar counting chain is also terminated. The punch magnet is operated by ground received over bank 969, position 11 through contacts 864 and 846 to thereby register the first minute punch on the tape.

The punch magnet 505 holds the step magnet 500 which had been energized for the fifth time by contact ground received over stepping conductor 527 as related previously. Inasmuch as the tape 504 is arranged to be advanced only upon release of step solenoid 500, the fifth advancement of the tape as mentioned previously is prevented from occurring. The punch solenoid 505 upon operating is arranged to energize the step solenoid as follows: ground, contact 508, step solenoid, battery. Accordingly, the operation of the punch solenoid to effect registration of the first minute punch places a hole in the tape in the space determined by the fifth advance of the tape after the hours tenths digit, which results, of course in a six space separation between the last hours tenths punch and the first minute punch. One punch is placed on the tape every minute thereafter until the conversation is completed, the following minute punches being transmitted to the recorder 23 by the trunk unit. Only the first minute punch is transmitted directly by the calendar equipment.

As the drive stop relay 860 operates, it is effective at its contacts 863 to connect ground to the step magnet 993 associated with the first sequence switch 813 to prepare for advancement of the wiper arms on the switch one step to the twelfth contact thereof. Step magnet 993 operates, and at its contacts 994 connects operating ground to associate relay 870 to effect the operation thereof. When the wiper arm 970 of bank 969 in sequence switch 813 was moved from contact 10 to contact 11, a holding ground for the trunk code pickup relay 550 was transferred to control of contacts 865 on the drive stop relay 860. Thus, as drive stop relay 860 operates, it is effective at its contacts 865 to interrupt the holding circuit of relay 550. It is noted that prior to operation of switching magnet 993 and advancement of the wipers, the relay 550 in the trunk restores and at its contacts 555 interrupts the holding circuit for the start relay 840 in the calendar to effect the release thereof.

With the restoration of start relay 840, contacts 845 are closed to reconnect the capacitor through the shunt of the winding of the time delay relay 850 to complete a restoring circuit therefor. Start relay 840 at its contacts 842 also interrupts the energizing circuit for the drive stop relay 860, the pumping relays 880 and 890 and the counting chain equipment. With the restoration of time delay relay 850, all of the other calendar relays are released leaving the calendar ready for another call. Contacts 12 to 22 of sequence switch 813 correspond to contacts 1 to 11, by which arrangement switch 813 completes one revolution for every two calls.

Assuming that several trunks have been waiting for the calendar during its previous operation (these trunks having been locked out from the calendar by the absence of ground on the pickup lead 519 as a result of the operated condition of the start relay 840), as the start relay 840 restores, all of the waiting trunks will be seized and information will be transmitted simultaneously to all of these trunks during the next calendar cycle.

Contacts on the 995, 996 and 1040 magnets are for homing purposes, that is, as the wiper arms arrive at the last functional point on the switch, as for example, the day, units, and tens switch 1068 advances to contact 12, the circuit is completed to the pumping relay 880 to effect the operation thereof and the opening of its contacts 884 to remove the ground that originally energized the magnet and thus effecting its release. When the magnet releases, the pulsing relay 880 is restored and pumping repeats until the switch is driven home.

Inasmuch as there are only twenty-five contacts on the various switches, and some months contain a greater number of days (30, 31 etc.), the day switch is arranged to count to twenty days in one revolution and from twenty-one to whatever day of the month is present in its second revolution. Relays 1050 and 1060 are operative to effect switching of the various leads of bank 1003 to the correct counting chain relay at the proper time. Accordingly, on the first revolution of switch 1068, contacts 1—9 of bank 1003 are connected by contacts 1054 to lead 907, whereby the days tens digit will be 0. The contacts 10—19 are similarly connected by contacts 1052 to lead 949, as relays 1050 and 1060 are operated during the first revolution of switch 1068. The second revolution of switch 1068 releases relays 1050 and 1060, and leads 1—9 of bank 1003 are now connected by contacts 1053 for the digit 2 (21—29th day), and contacts 10—19 are connected by contacts 1051 to 3 for the 30th and 31st day.

The operation and release of relays 1050 and 1060 is controlled by bank 1006. With wipers switch 1068 on the first contact for the first day, an energizing circuit is completed for relay 1050 which extends from ground over contact 1 of bank 1006, wiper 1007, contacts 1063, over the coil of relay 1050 to battery. Relay 1050 operates, and at its contacts 1055 completes a self holding circuit, and prepares an operating circuit for relay 1060. As wiper 1007 of bank 1006 moves to the second contact, an energizing circuit for relay 1060 is completed over a circuit extending from ground over contacts 1055 and 1063 to relay 1050 and through multiple contacts 1008, contacts 1061, the coil of relay 1060 to battery. Relay 1060 is operative at its contacts 1062 and 1064 to complete a holding circuit for relays 1050 and 1060 which extends to ground over contacts 1055. On the second revolution of switch 1068, the previous described path through multiple contacts 1008 is interrupted to effect restoration of relay 1050. When the wiper 1007 reaches the second contact on the second revolution of switch 1068, the ground on contact one is interrupted to effect restoration of relay 1060. Relays 1060 and 1050 remain restored until the wiper of bank 1006 begins its third revolution.

TIMING OF ESTABLISHED CONNECTION

It will be recalled that as the calendar pickup relay 550 is operated to initiate connection of the calendar to the trunk recorder 23, it was also effective at its contacts 557 to complete an operating circuit for the clock control relay 540 which operated, and at its contacts 543 and 545 connected the clock conductor 515 to the spacer relay 520, the circuit extending from conductor 515 over contacts 545, conductor 377, contacts 323, conductor 376, contacts 414, conductor 417, contacts 543 and the winding of spacer relay 520 to battery. As heretofore mentioned, the contact 801 in the clock equipment 22 is operative every 15 seconds to connect a ground impulse to the conductor 515. Accordingly, the spacer relay 520 is operated and restored once every 15 seconds.

Clock control relay 540 in its operation is effective at contacts 548 to interrupt the circuit for the pulse hold relay 510, which is normally completed by spacer relay 520 and contacts 524, and accordingly pulse hold relay 510 is not operated by the spacer relay at this time. Spacer relay 520 is effective at its contacts 521 and 522 to effect the advancement of the trunk chain comprising relays 460, 470, 480 and 490 in the manner heretofore described, the spacer relay 520 in its first energization completing the operating circuit for the first counting chain relay 490 and the spacer relay in its first deenergization completing the series circuit for the first and second counting chain relays 490 and 480. With the subsequent operation of the spacer relay 520, the first counting chain relay 490 is released and with the deenergization of the spacer relay 520, the circuit for the second and third counting chain relays 480 and 470 is completed. Responsive to receipt of the third clock impulse, the second counting chain relay 480 is restored, and with termination thereof the third and fourth counting chain relays 460 and 470 are energized in series. With the operation of the fourth counting chain relay 460 and the closure of contacts 462, an operating circuit is completed for the first flip-flop relay 450, the circuit extending from battery over the winding of relay 450, contacts 442, 462, conductor 407, contacts 553, conductor 415, contacts 434 and 423 to ground.

On the fourth quarter-minute clock pulse, relay 520 in its operation releases 470 and holds 460. With the termination of this pulse, relay 520 releases and the fourth counting chain relay 460 is restored however, the flip-flop relay 450 is locked over contacts 453 to the ground on the conductor 407 which initially energizes same.

Figure 12:
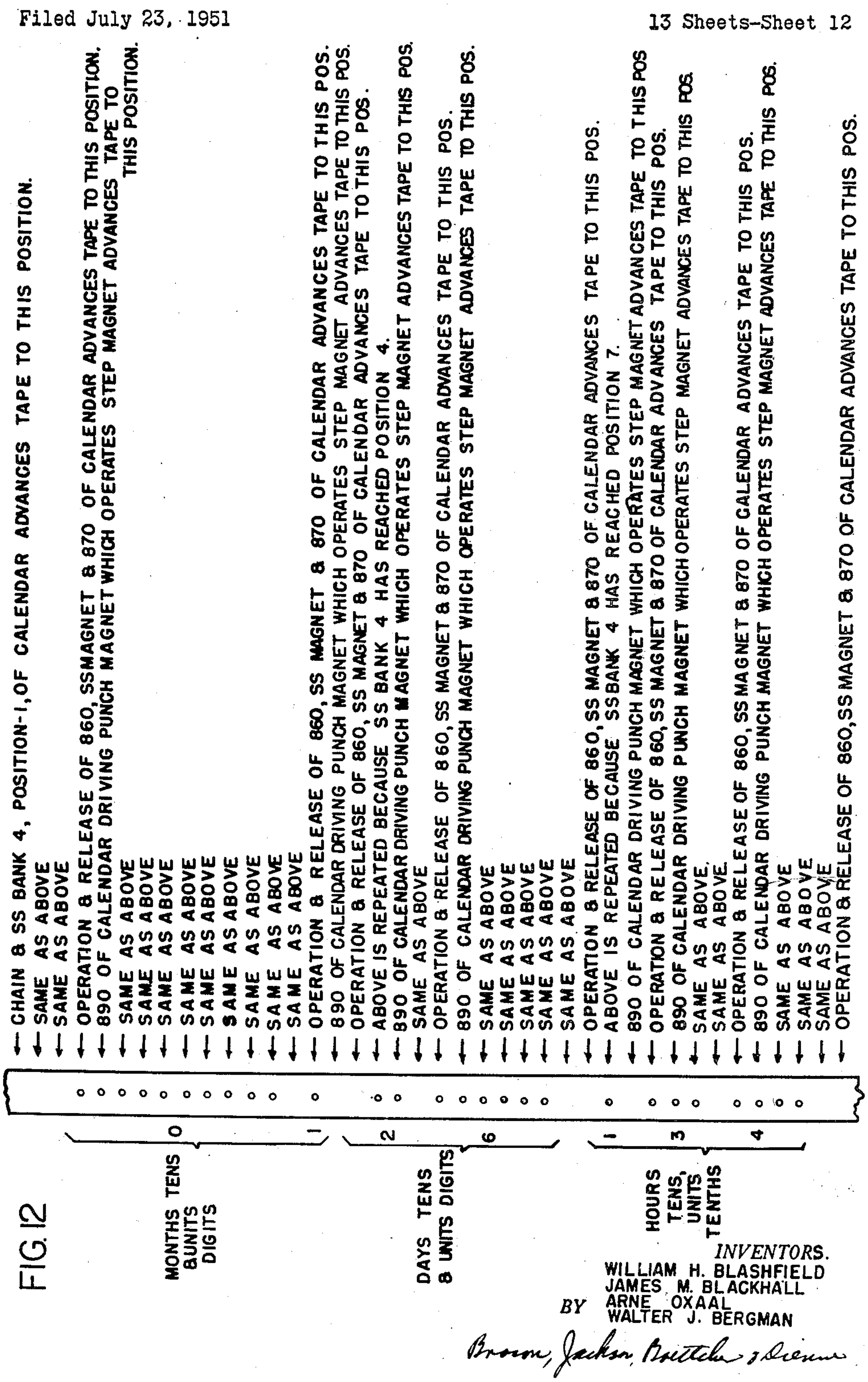
Figure 13:
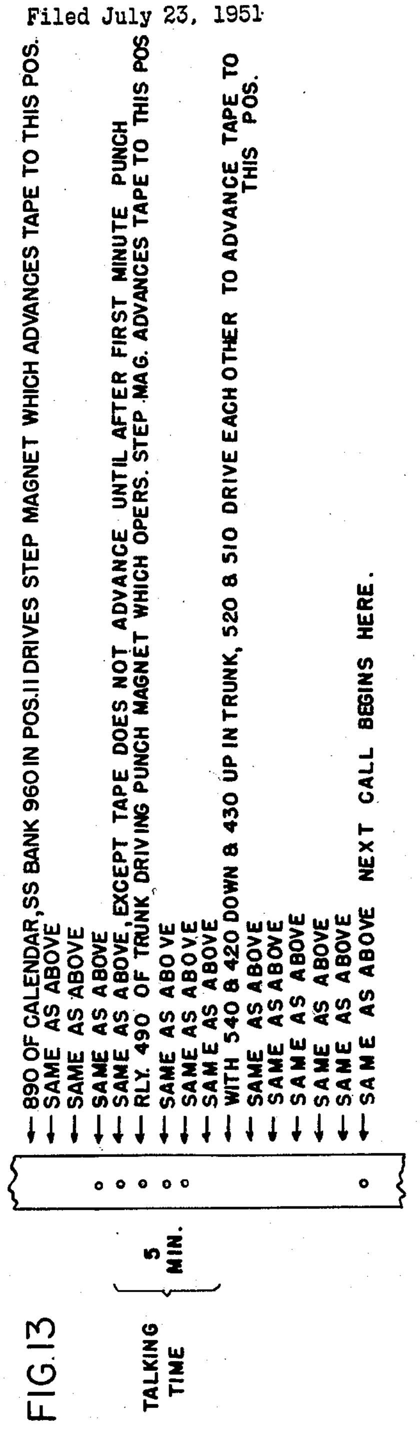
Figure 14:
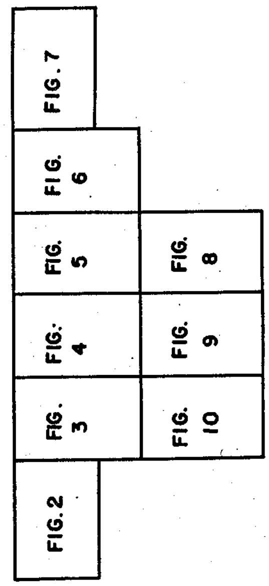

With the reoperation of the spacer relay 520 responsive to receipt of the fifth impulse from the clock, an operating circuit is completed for the punch solenoid 505 in the trunk recorder 23 by the first counting chain relay 490, the circuit extending from battery over the winding of punch solenoid 505, conductor 513, contacts 551, 562, conductor 406, contacts 493, 481, 452, conductor 396, contacts 423 to ground. Punch solenoid 505 operates to energize punch member 507 and thereby effect registration of a single perforation on the tape member 504, and at its contacts 508 completes an operating circuit for the step solenoid 500. As the first counting chain relay 490 is subsequently restored responsive to receipt of the following impulse, the energizing circuit for the punch solenoid 505 is interrupted to effect the subsequent release thereof and the release of the stepping solenoid 500. As stepping solenoid 500 restores, it effects the advancement of the tape 504 one step. Thus an impulse is received once every 15 seconds of a call and after the receipt of four such impulses the spacer relay 520 will have advanced the counting chain and will have operated relay 450 to prepare for the recording of the four impulses on the tape. With recycling of the chain responsive to receipt of the fifth pulse, operation of the equipment in the trunk recorder 23 is effected to accomplish recording of a punch on the tape member 504. Thus, the calendar places the first conversation time punch on the tape, and thereafter each punch is indicative of the elapse of one minute of talking time during the connection. As shown in Figures 12, 13 and 14, for example, in a call which has elapsed for a period of five minutes (or slightly more) a total of five perforations will be placed on the tape member.

The registration of a punch is delayed until after the first round of the trunk chain in that the calendar punches the first minute marked. It is apparent therefrom that the recording of the second minute mark should not occur until four clock impulses of 15 seconds each have been received.

RELEASE

As the parties have completed their call and the connection is to be restored, the equipment releases in alternative manners as determined by the particular party who first restores his receiver to his handset. For example, with restoration by the called party answer control relays 720 and 725 release; and the 150 ohm resistor in the P-wire 657 ground is removed and the supervisory relay 660 is restored. Relay 660 restores, and at its contacts 664 interrupts the application of battery to the conductor 602 through relay 603 and instead connects ground thereto, thereby interrupting the energizing circuit for the composite relay 580 in the trunk 16 at the recorder end and thus effects the restoration of the composite relay 580.

Composite relay 580 restores, and at its contacts 581 interrupts the holding circuit for the answer relay 410 to effect the restoration thereof. Control relay 410 restores, and at its contacts 413 interrupts the holding circuit for the associate answer relay 400, which responsively restores, and at its contacts 414 interrupts the connection between the transfer relay 520 and the clock conductor lead 515 to interrupt the transmission of pulses to the trunk equipment by the clock 22 and to thereby terminate the registration of minute punches on the tape. No further release of the equipment is effected until the calling party restores.

As the calling party subsequently restores his receiver to his handset to interrupt the loop extending to the seized link equipment, such as the seized link 12, 13 and trunk 16, the holding circuit for the line relay 330 in the trunk is interrupted and the release thereof is effected. Trunk line relay 330 at its contacts 333 interrupts the holding circuit for the relay 320, and at its contacts 332 interrupts the holding circuit for the switch hold relay 370, which is of the slow-to-release type. After the expiration of the predetermined period of time as determined by its slow to release characteristics, the switch hold relay 370 restores, and at its contacts 371 removes ground from the selector P-wire 211 to effect the release thereof; at its contacts 372 interrupts the holding circuit for the associate slow hold relay 350 to effect the restoration thereof; and at its contacts 373 completes an operating circuit for the release relay 430, the circuit extending from battery over the winding of relay 430, contacts 422, contacts 404 and 373 to ground. Relay 430 locks through contacts 432 and 447 to ground.

Associate hold relay 350 restores, and at its contacts 356 interrupts the holding circuit for the first slow release relay 420 to effect the restoration thereof, and the interruption of the holding circuit for the clock control relay 540, which responsively restores. The associate relay 350 at its contacts 355 effects the reapplication of ground over contacts 421 and 491 to the selector P-wire 211 to maintain the trunk busy pending release of the equipment in the trunk circuit. The operation of relay 430 also closes a circuit from ground through contacts 431 and 491 to conductor 211.

With the restoration of the clock control relay 540 and the restoration of the release relay 420, an operating circuit is completed for the spacer relay 520, the circuit extending from battery over the winding of relay 520, contacts 542, 511, conductor 416, contacts 435 and 424 to ground. The spacer relay 520 is now operated to advance the tape eight steps, whereby an intercall space separation is provided upon the tape member 504 in the recorder 23. The spacer relay 520 operates, and at its contacts 524 completes an energizing circuit for the pulse hold relay 510, whereby a pumping arrangement including relays 510 and 520 is completed in the manner heretofore described to effect advancement of the counting chain comprising relays 460, 470, 480 and 490. Simultaneously the chain effects the application of ground to conductor 578 in the manner heretofore described to effect the operation of the step solenoid 500 and the advancement of the tape member 504 one step for each impulse received.

Briefly, with operation of spacer relay 520, and the closing of contacts 524, an energizing circuit is completed for pulse hold relay 510 which operates, and at its contacts 511 interrupts the energizing circuit for the spacer relay 520. Spacer relay 520 in its operation at its contacts 522 completes a circuit for the first counting chain relay 490, as well as for the pulse hold relay 510.

As the spacer relay 520 restores, it is effective at its contacts 525 to complete the energizing circuit for the step solenoid 500 to energize same, and at its contacts 521 is effective to complete a series operating circuit for the counting chain relays 480 and 490.

Spacer relay 520 at its contacts 524 interrupts the holding circuit for pulse hold relay 510, which after a brief period restores, and at its contacts 512 interrupts the energizing circuit for the step solenoid 500, which restores and advances the tape 504 one step. With the restoration of the pulse hold relay 510, the energizing circuit is recompleted to spacer relay 520, which operates to effect the release of the first counting chain relay and the reenergization of the pulse hold relay 510. Relay 510 effects restoration of the spacer relay which in its responsive restoration completes the series operating circuit for the second and third counting chain relays 480 and 470; completes an energizing circuit for the step magnet 500; and interrupts the energizing circuit for pulse hold relay 510.

Pulse hold relay 510 restores to effect release of the step solenoid 500 and the advancement thereby of the tape one step, and also recompletes the energizing circuit for spacer relay 520, which operates and at its contacts interrupts the holding circuit for the second counting chain relay 480 to effect the restoration thereof. Spacer relay 520 also recompletes an energizing circuit for pulse hold relay 510, which operates, and in turn interrupts the energizing circuit for spacer relay 520 to effect the restoration thereof. Spacer relay 520 in its restoration completes an operating circuit for the step magnet 500, and also completes a series operating circuit for the third and fourth counting chain relays 470 and 460, and effects the interruption of the holding circuit for the pulse hold relay 510. As the fourth counting chain relay 460 operates, it is effective at its contacts 462 to complete an energizing circuit for the first flip-flop relay 450 which extends from battery over the winding of relay 450, contacts 442, 462, conductor 407, contacts 553, conductor 415, 433 and 424 to ground. Relay 450 operates and at its contacts 453 locks up to the ground on conductor 407.

As the pulse hold relay 510 restores, it effects the interruption of the energizing circuit for the step solenoid 500 which effects the advancement of the tape member 504 one step. Pulse hold relay 510 also recompletes the energizing circuit for spacer relay 520, which operates to interrupt the holding circuit for the third counting chain relay 470 and to recomplete the energizing circuit for pulse hold relay 510. Relay 510 operates releasing relay 520 to interrupt the energizing circuit for the fourth counting chain relay 460; to complete an operating circuit for the step solenoid 500; and to interrupt the holding circuit for the pulse hold relay 510.

As the fourth counting chain relay restores, it is effective at its contacts 461 to extend the operating ground on conductor 407 over contacts 453, contacts 461, conductor 398, contacts 366, conductor 399, contacts 444 and the winding of second flip-flop relay 440 to battery to effect the operation thereof. The fourth counting chain relay 460 at its contacts 464 also prepares an operating circuit for the first counting chain relay 490 to prepare the equipment for a second recycling operation. As the spacer relay 520 and pulse hold relay 510 continue to pump in the manner described, the four counting chain relays are run through a second cycle; whereby eight impulses are transmitted to the step solenoid 500 to effect the repeated operation thereof and the advancement of the tape eight steps.

As the counting chain advances to the fourth relay 460 with the transmission of the eighth impulse, both flip-flop relays 440 and 450 will be in the energized condition. Accordingly, as the fourth counting chain relay 460 operates to open contacts 461, the holding circuit for these relays is interrupted to effect the restoration thereof. However, the restoration will be in sequence with the relay 450 restoring the fourth relay 460. That is, relay 450 is held up over contacts 445, conductor 399, contacts 366, conductor 398, contacts 461 and 453 to conductor 407 and ground. Accordingly, as the fourth counting chain relay 460 is restored, the holding circuit for the first flip-flop relay 450 is interrupted and the relay 450 releases. However, the second flip-flop relay 440 is held energized over the circuit extending from battery, the winding of relay 440, and contacts 443 and 453 to the ground on conductor 407. As the flip-flop relay 450 now restores to open its contacts 453, the holding circuit for the flip-flop relay 440 is interrupted and the restoration thereof is effected.

During the brief period that the relay 450 is in the restored condition and the relay 440 is energized, the energizing circuit for the release relay 430 is interrupted at contacts 454 and 447, and accordingly the restoration of the second release relay 430 is effected. All relays of the trunk are now back to normal.

The step magnet 500 does not operate for an eighth time in that the fourth counting chain relay 460 in operating upon the seventh release of the spacer relay 520, effects immediate release of the flip-flop relay 450, second release relay 430 and the flip-flop relay 440. As flip-flop relay 440 restores, it is effective at its contacts 446 to interrupt the energizing circuit for the spacer relay 520 to prevent further energization thereof and the further driving of the pulse hold relay 510 in the pumping arrangement. As a result, no further energization of the stepping magnet 500 if effected after the seventh energization, and the tape 504 will accordingly be advanced seven steps following registration of the last minute punch.

In the event that the calling party releases first, it is apparent that the answer control relays 400 and 410 will be held operated from the non-recording end of the equipment. As the calling subscriber restores the handset of his substation, the trunk line relay 330 restores as before to effect the release of the supervisory relay 320 and the switch hold relay 370. Switch hold relay 370 at its contacts 371 removes the ground from the P-wire 211 to effect the restoration thereof and also at its contacts 372 interrupts the holding circuit for associate hold relay 350.

The release relay 420, however, is held operated by the associate answer control relay 400, the circuit extending from battery over the winding of relay 420, contacts 403 and 373 to ground, whereby the release of the trunk equipment 16 is prevented, and the first wire 211 is kept grounded to make the trunk busy to the selector multiples. As the associate hold relay 350 restores, the answer control relay 410 is connected to the line finder plus wire 301 over a circuit extending from battery over the winding of relay 410, conductor 428, contacts 581 on the composite relay 580, conductor 304, contacts 358' and conductor 301, whereby the line circuit equipment 17 is thrown into the lock-out condition (the finder test wire 303 was previously grounded through contacts 359, conductor 307, contacts 565, conductor 309, and contacts 313).

When the called party now releases, the release of the answer control relays 400 and 410 interrupts the holding circuit for the release relay 420, and a circuit is now completed through its contacts 424 and 435 to the conductor 416, contacts 511, and contacts 542 to the spacer relay 520 to energize same, and to effect the cycle of operation described heretofore which advances the tape member seven steps prior to effecting release of the equipment in the trunk.

ESTABLISHMENT OF AN OUTGOING CALL FROM THE NON-RECORDER END TO A SUBSCRIBER AT THE RECORDER END

Figure 7:
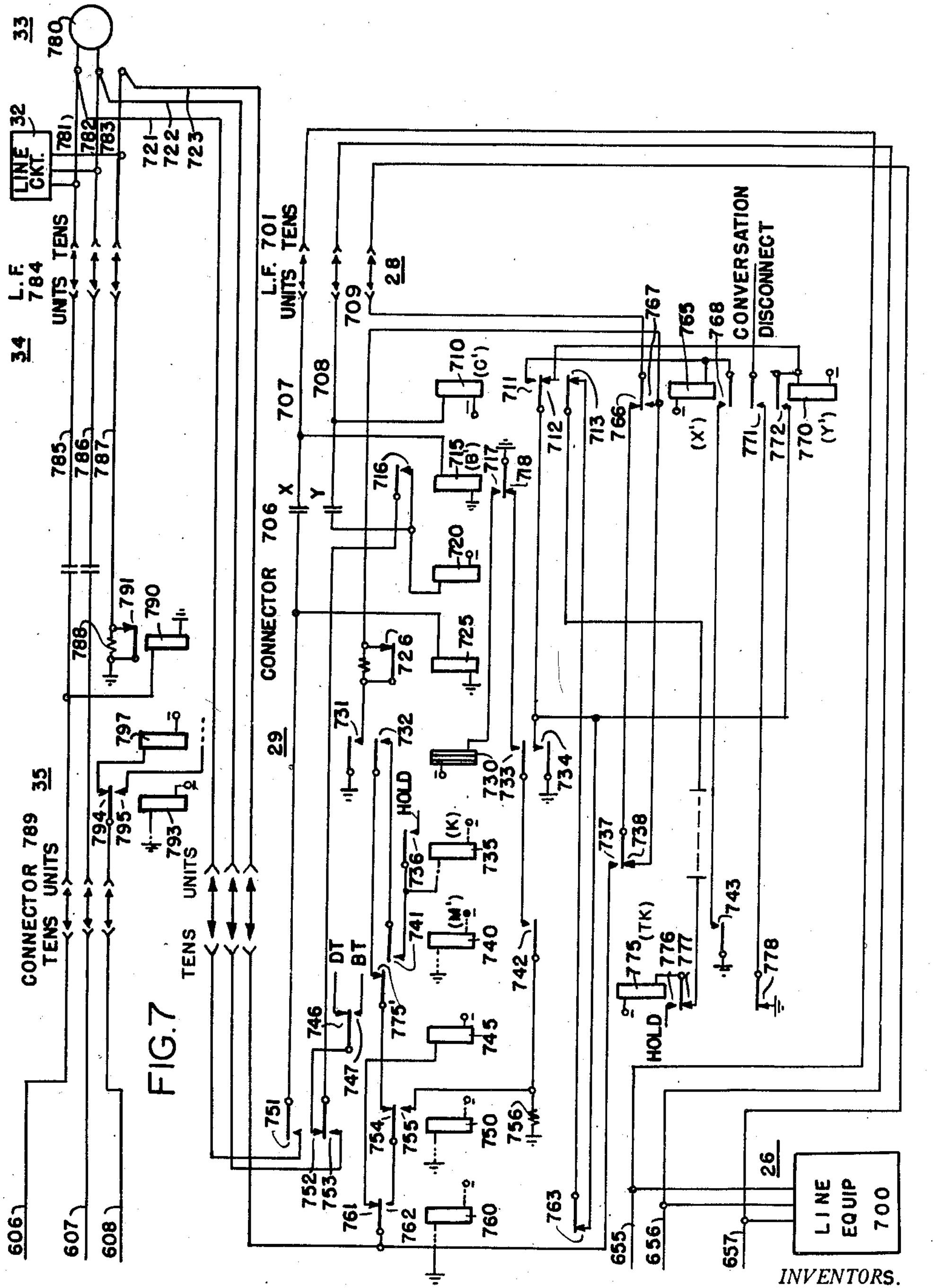
Figure 8:
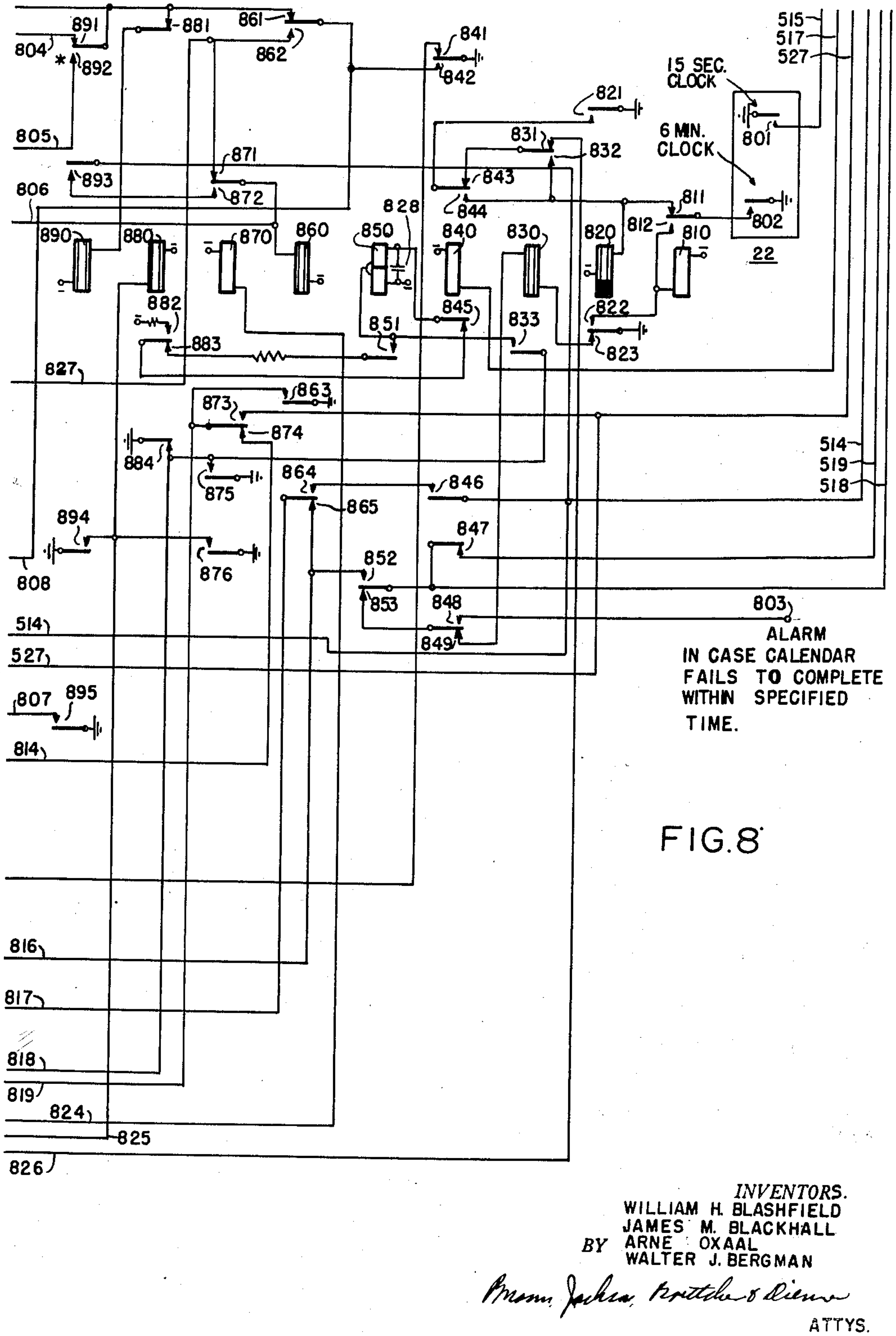
Figures 8–10 illustrate in schematic form the calendar and clock equipment at the recorder end of the arrangement (exchange A)
Figure 9:
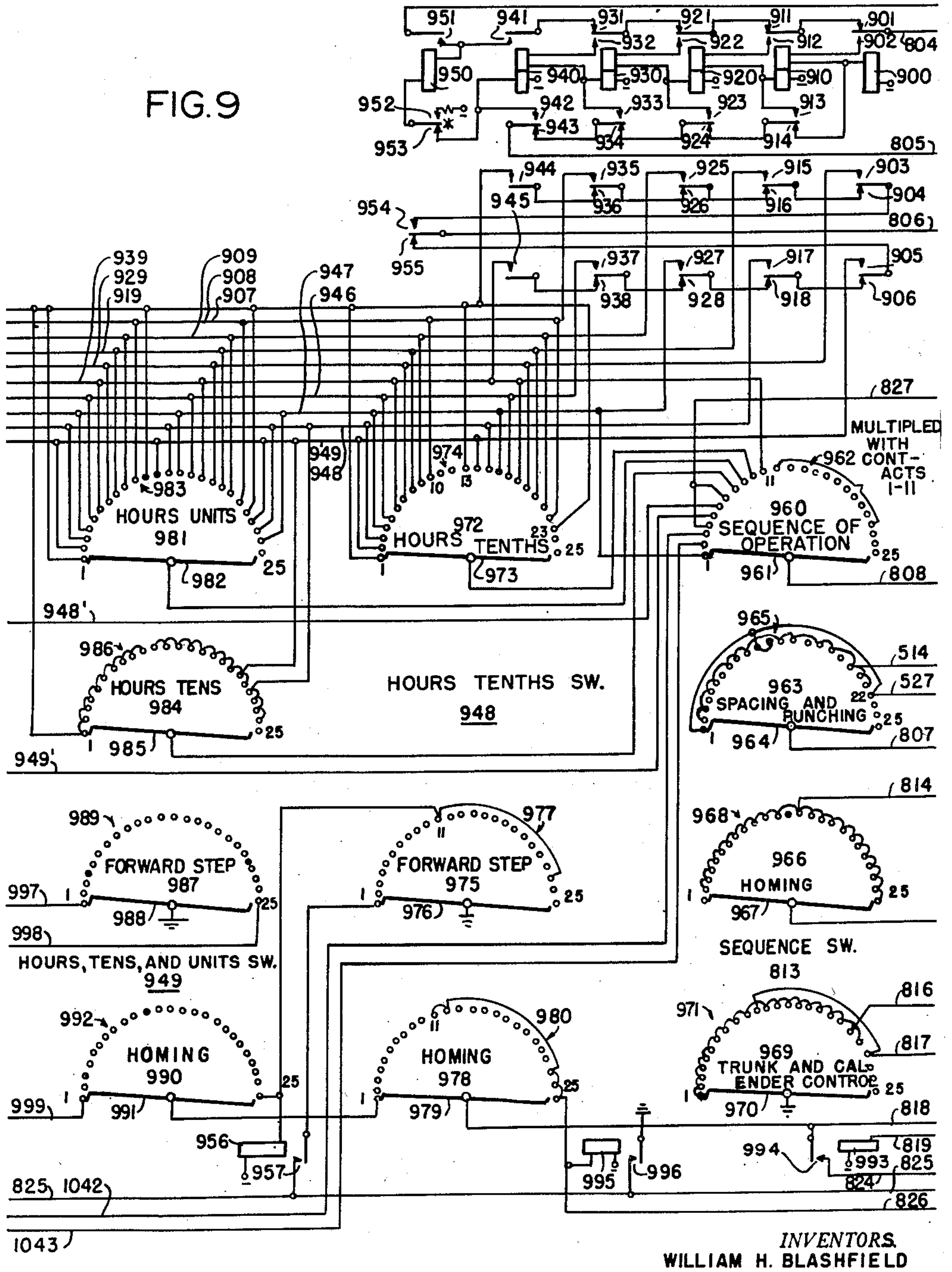
Figure 10:
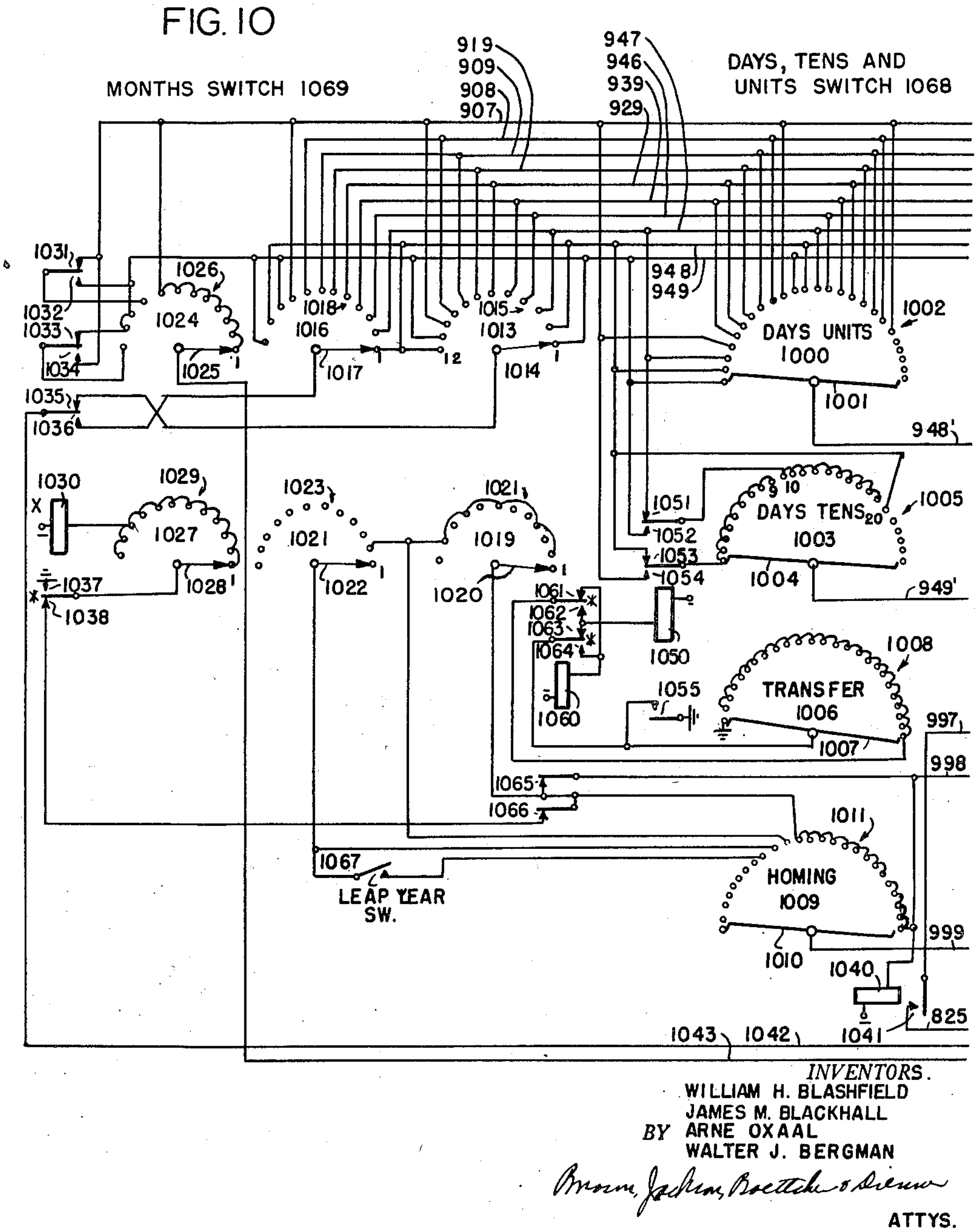
Figure 11:
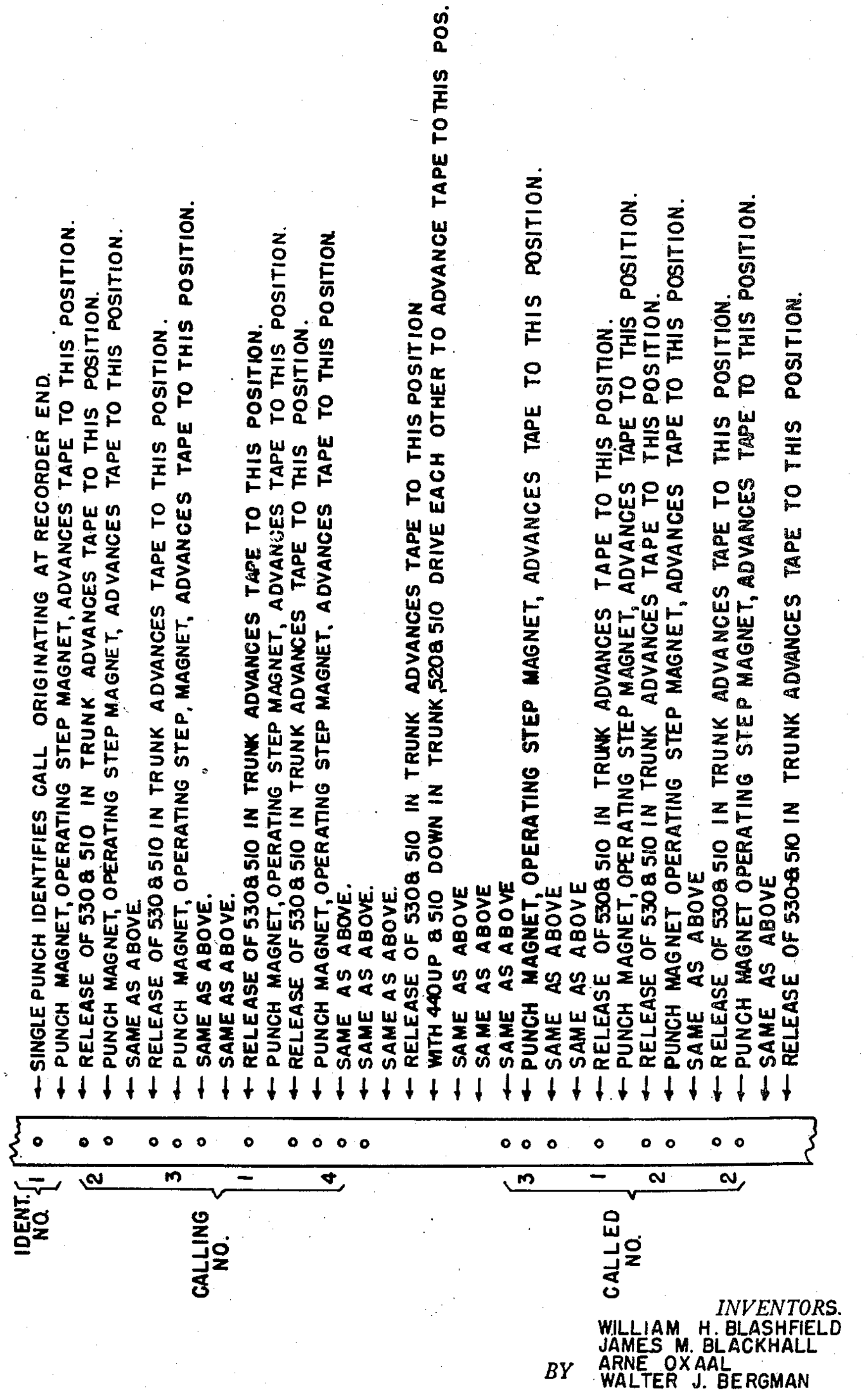
Figures 11, 12 and 13 illustrate a tape member having registered thereon the information pertaining to a call established by a subscriber in exchange A to a subscriber in exchange B.

A subscriber in exchange B may establish a connection with a desired subscriber in exchange A by removing the receiver at its calling station from its associated hook in the conventional manner to complete an energizing circuit for associated line circuit equipment illustrated generally in Figures 1 and 7 as rectangle 32, which in turn operates in the conventional manner to select an idle link comprising a line finder switch and a connector switch, such as illustrated switches 34 and 35. Conventional equipment in the line finder connector link arrangement serves to busy the calling line to the other automatic switches having access thereto, and to busy the seized one of the links to other subscriber substations having access thereto. Timing means associated with the connector 35 provide a given predetermined time interval for seizure of the link for permitting the party to initiate the dialling operation in the extension of the call through the further equipment. The link switches 34, 35 condition themselves for receipt of impulses from the dial of the calling subscriber responsive to seizure thereof in a conventional manner, and upon conditioning informs the subscriber of such fact by the transmission of dial tone over the link to the receiver of the calling subscriber.

Figure 6:
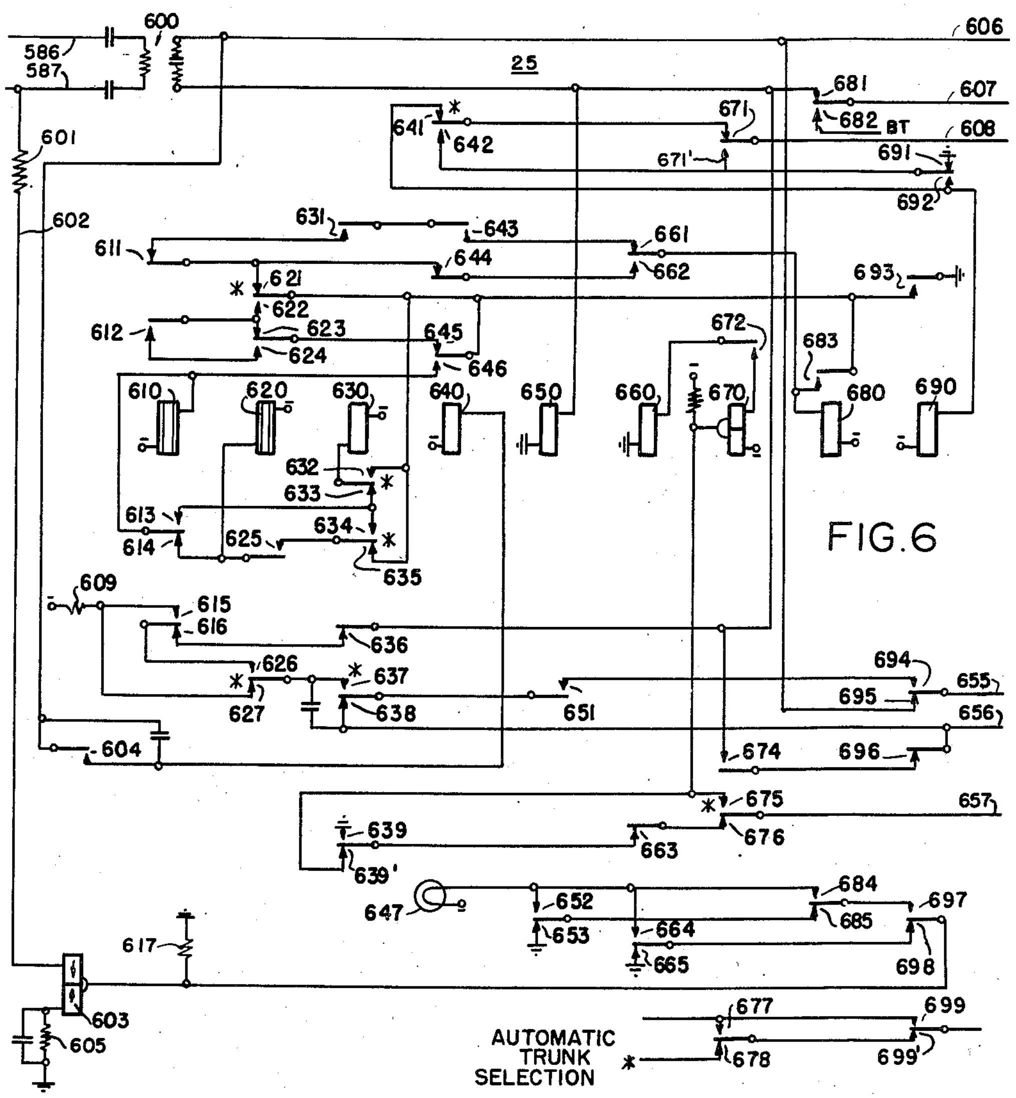
Figures 6 and 7 illustrate the switching and trunk equipment at the non-recorder end of the arrangement (exchange B)

In the disclosure of the equipment illustrated at exchange B, as shown in Figures 1, 6 and 7, the subscribers are shown as having access over level eight, for example, to outgoing trunk equipment such as 25, which extends to exchange A and accordingly, subscribers in exchange B desiring to extend calls to the subscribers in exchange A will prefix the assigned directory number of the desired subscriber in exchange A with the digit eight.

The subscriber upon receipt of the dial tone now dials digit 8, whereupon the dialing mechanism operates to alternately interrupt and complete the pulsing circuit to the connector switch 35 to effect the advancement thereof to the eighth level. As the connector switch 35 responds to the eight incoming pulses to advance to the eighth level, it is automatically effective to select an idle one of the trunk circuit equipment, such as the one illustrated at 25, which are associated with the eighth level thereof; to extend the calling line to the trunk circuit equipment 25; to complete an operating circuit for a conventional type registering meter, which registers the number of calls established over such equipment; and to render the trunk circuit 25 busy to other links in the group associated therewith.

Each of the trunk circuits is marked in accordance with its particular condition of operation; that is, when the trunk is busy, ground is connected to the conductor and if the trunk is idle, low resistance battery is connected to the test conductor. Thus, as the connector 35 is operated to the eighth level, associated trunk test equipment in the connector automatically determines which one of the associated trunk circuits, such as illustrated circuit 25, is available.

Assuming the illustrated trunk 25 is the first trunk in the group and is in the idle condition, low resistance battery will appear on its test conductor 608 (Figure 6) which extends from battery over the winding of relay 690, contacts 641, contacts 671 and conductor 608. As the test equipment of the connector 35 detects the idle condition of the first trunk 25, the equipment therein will be operative to effect switch-through of the positive, negative and test conductors 785, 786 and 787 to the conductors 606, 607 and 608 of the trunk equipment. The trunk 25 is held operated by the ground placed on conductor 608 by the connector 35 in the conventional manner.

TRUNK OPERATION (NON-RECORDER) OUTWARD CALL

With the seizure of the trunk 25, an operating circuit is completed to the directional relay 690 in the trunk, the circuit extending from battery over the winding of the relay 690, contacts 641, 671, test conductor 608, and the ground which is imparted thereto by the connector switch 35 to the test conductor 608. The battery supply relay 650 in trunk 25 is also operated over the negative conductor 607, the circuit extending from ground over the winding of the relay 650, contacts 681, and the negative conductor 607 to the negative battery which appears thereon.

Battery supply relay 650 operates, and at its contacts 652 connects battery to the outgoing conductor 602 which extends over the trunk line to the composite equipment in the trunk 16 at the recorder end of the arrangement to effect the operation of the composite relay 580 thereat.

Relays 650 and 690 operate, and together complete a seizing circuit for selecting one of the regular exchange links for checking purposes, the loop extending from the positive wire to the line equipment 26 over conductor 655, contacts 694, contacts 651, 638 and conductor 656 to the negative wire extending to the line equipment 26. The line equipment 26 operates in conventional manner to seize one of the associated links, such as illustrated link 28, 29 for use in checking purposes, it being noted that the links accessible to the line equipment for checking purposes are the same links that are used in the establishment of an incoming call to subscribers in exchange B, or those used on outgoing calls; that is, regular links. A loop operating circuit is completed for the line relays 715 and 710 upon seizure thereof, the loop circuit extending from battery over relay 710, line-finder tens and units contacts, C656, contacts 638, 651, 694, C655, line finder tens and units contacts, and relay 715 to ground. Line relay 715 at its contacts 717 completes an operating circuit for hold relay 730. Hold relay 730 operates and at its contacts 731 connects ground to test conductor 657 in the trunk.

Line relay 710 operates, and at its contacts 711 completes an operating circuit for associate relay 765 from ground through contacts 735 which operates, and at its contacts transfers the applied ground to the test conductor over a more direct path. As the connector 29 places ground over the line finder conductor 657 to the trunk, an operating circuit is completed for the test conductor supervision relay 670, the circuit extending from battery over the lower winding of relay 670, contacts 639′, 663, 676, conductor 657 and conductor 704 to the ground imposed on the test conductor by the connector switch 29.

With reference now to the seizure of the trunk 16 at the recording end it is noted that with the operation of the relay 650 in trunk 25, an operating circuit was completed for the composite relay 580 thereat, the circuit extending from battery over the lamp 647, contacts 652, 685, 697, the upper winding of the composite relay 603, conductor 602, resistance 601, one leg of the trunk line 24, resistance 588, conductor 539, the upper winding of composite relay 580 in the trunk 16 at the recorder end of the equipment, contacts 568, conductor 327′, contacts 438, conductor 327, contacts 348, 374′, 369, conductor 328, contacts 477, and 426 to ground.

As the composite relay 580 operates, it is effective at its contacts 581 to extend battery through the winding of relay 410, contacts 358′ on positive conductor 301 to line circuit 17, which causes the line circuit to seize a line finder selector link, such as 18, 19. Relay 410 then operates in series with ground on the positive wire of the selector. As a finder selector link, such as illustrated link 18, 19, is seized, the selector 19 is operative to connect ground to the test conductor, which extends back over the line finder to the trunk circuit test conductor 303, whereby operating ground is connected to the supervisory relay 310, the circuit extending from battery over the upper winding of relay 310, conductor 308, contacts 566, C309, and contacts 313 to the test conductor 303.

The answer relay 410 in operating is effective at its contacts 412 to complete an energizing circuit for associate answer relay 400, which is in turn effective at its contacts 403 to complete an energizing circuit for the first release relay 420, at its contacts 405 to complete an operating circuit for the check holding relay 380, which is a series energizing circuit for the check holding relay 380 and the line relay connected to the negative conductor in the selector equipment, which relay has battery connected to the other side of its winding.

Release relay 420 operates, and at its contacts 421 connects ground to the incoming test conductor 211 to prevent seizure of the trunk by switching links in exchange A pending completion of the present call. The release relay 420 at its contacts 425 connects battery over lamp 316, conductor 326, contacts 425, 477, 369′, 375, 348, conductor 327, contacts 438, conductor 327′, contacts 568 and the upper winding of composite relay 580 to the composite signalling conductor 539 extending over the trunk line 587 and conductor 602 to the upper winding of signal relay 603 and contacts 588 and 665 to ground.

Composite relay 603 operates, and at its contacts 604 completes an operating circuit for the incoming call relay 640, the circuit extending from battery over the winding of relay 640, contacts 604, and ground on the positive conductor 606 extending to the connector switch 35.

Incoming call relay 640 operates, and at its contacts 646 completes an operating circuit for the associate hold relay 620, the circuit extending from battery over the winding of hold relay 620, contacts 614, 646 and 693 to ground. Associate relay 620 operates, and at its contacts 626 connects dial tone from connector 29 to the negative conductor 607 of the connector switch 35.

Thus, as soon as the non-recorder end seizes the trunk 16 in a call in the direction of the non-recorder end to the recorder end, the recorder end provides answer supervision and maintains that answer supervision throughout the call and until the eight steps have been run off after release. Answer supervision is meaningless to the called subscriber, and if the calling link does not have trunk control, it will not effect the release of the link. This is the principle that is actually used in the present ticketing system, the artificial answer being interrupted only to produce the flash necessary for checking the calling number. (In the establishment of a call in the opposite direction, the called (non-recorder) link is not released until after the recorder has run its eight stops.)

As the check holding relay 380 operates, it is effective at its contacts 381 to connect an 800 ohm resistance 376′ across the line finder conductors 301 and 302, the shunt extending from conductor 301 over contacts 351, 361, the 800 ohm resistor 376′, contacts 381, 346 to conductor 302. As a result of the placement of the resistor across the finder line, the link will not respond as incoming impulses are repeated by the answer control relay 410 to the incoming spacer relay 520 in the trunk equipment. Imposition of a shunt across the lead extending to the link is required to prevent the check number 3122, which is initially transmitted by the calling party R, from being recorded in the recorder end of the connection.

The calling subscriber R now dials his assigned directory number 3122 to identify himself for the recording equipment, such identification number effecting the operation of the seized one of the regular links as a check link to extend a checking connection through to his own calling line. In the trunk 25, the battery relay 650 indirectly responds to the repeated interruption of the subscriber loop with receipt of the impulses; and at its contacts 652 effects the repeated completion and interruption of the energizing circuit for the composite relay 580 in the trunk equipment at the recorder end of the office; and at its contacts 651 effects the transmission of pulses over conductors 655 and 656 to the line relay in the connector switch in the seized one of the links, such as links 28, 29.

Composite relay 580 at the trunk 16 operates and releases in response to the incoming impulses, and at its contacts 581 repeats these impulses to the answer control relay 410 to effect the repeated energization and deenergization thereof. Relay 410 at its contacts 412 effects the repeated interruption and application of ground to a circuit for the series relay 530 and the punch magnet 505, the circuit specifically extending from battery over the winding of the punch magnet 505, conductor 513, contacts 551, 561, the winding of relay 530, conductor 394, contacts 357, conductor 363, contacts 402 and 412 to ground.

With each energization over this circuit, the series relay 530 and the punch magnet 505 effect the imposition of a single perforation on the tape, the punch magnet 505 at its contacts 506 completing an auxiliary circuit for the step magnet 500. As the punch magnet 505 restores, it is effective at its contacts 506 to interrupt the energizing circuit for the step solenoid 500, which responsively restores to advance the tape 504 one step. Thus, the impulses transmitted by the dial of the calling subscriber R are transmitted to the trunk equipment 25 at the non-recorder end, which in turn transmits the impulses both to the switching links 28, 29 in the local exchange, which has been seized for checking purposes, and to the recorder equipment 23 in the trunk equipment 16 at the recorder end of the arrangement.

Relays 710, 715, 730, 765 and 670 are operated on seizure.

With receipt of the first incoming digit, the connector switch 29 responds to the first prefix digit to absorb same, and responds to the second digit to select the tens group of lines as determined by the value of the received digit.

At the recorder end of the equipment, series relay 530 is also effective in its energization with the punch magnet 505 responsive to the incoming impulses of the first digit of the calling party's number (3), to control the advancement of the counting chain to count off the number of digits received. That is, in its first energization responsive to receipt of the first impulse of a digit the series relay 530 completes an operating circuit for the first counting chain relay 490, the circuit extending from battery over the winding of relay 490, contacts 486, 473, 464, conductor 409, contacts 532, 553, conductor 415, contacts 434 and 423 to ground. Relay 530 at its contacts 535 also completes an energizing circuit for pulse hold relay 510, the circuit extending from battery over the winding of relay 510, 535, 548 to ground. Pulse hold relay 510 being slow to release is maintained energized during the period of receipt of the impulses comprising the digit. However, with the termination of receipt of the digit and the restoration of the series relay 530, an operating circuit is closed at contacts 531 for the first and second counting chain relays 490 and 480, and the circuit for pulse hold relay 510 is interrupted. Pulse hold relay 510 holds briefly to complete an operating circuit for the step solenoid 505, the ground being applied to the step conductor 528 by a circuit extending over the contacts 548, 536, 525, 512 and 559 to the conductor 528 and the step solenoid 500 to effect energization thereof.

As the pulse hold relay 510 subsequently restores, the operating circuit for the step magnet 500 is interrupted and the tape 504 is advanced one step between digits.

Series relay 530 is operated with the receipt of the first impulse of each digit of the called number, and is released following receipt of the last impulse of each digit, to advance the counting chain one step for each digit. The pulse hold relay 510 is likewise energized with receipt of the first impulse of each digit and is restored following receipt of the last impulse of each digit to cooperate with the series relay 530 to effect energization of the step magnet 500 and effect the stepping of the tape one step. Thus an interdigit space is provided following recording of each digit.

Following the receipt of the entire second digit and the restoration of the series relay 530 at that time, it is effective at its contacts 531 to complete a series operating circuit for the third counting chain relay 470 in series with the second counting chain relay 480, and at its contacts 535 cooperates with the pulse hold relay 510 to effect the advancement of the tape 504 one step.

The third counting chain relay 470 in operating is effective at its contacts 476 to interrupt the energizing circuit for the composite relay 603 to effect the restoration thereof, which at its contacts 604 effects the interruption of the holding circuit for the incoming call relay 640 at the non-recorder end of the system. Incoming call relay 640 restores, and at its contacts 645 completes an energizing circuit for the associate relay 610, the circuit extending from battery over the winding of relay 610, contacts 624, 645 and 693 to ground. As heretofore pointed out, the purpose of the associate relays 610, 620 and 630 is to operate and release in various combinations under control of the incoming call relay to perform functions in effecting various indications to the check link.

In the present instance, the operation of the associate relay 610 is accomplished for the purpose of indicating to the check link that the call is a check call, rather than an incoming call from the distant trunk 16. Associate relay 610 at its contacts 612 locks to ground over contacts 622 and 693, and at its contacts 613 prepares associate relay 630 for operation; and at its contacts 615 opens the tone lead through capacitor X, so that the calling party will not hear busy tone when the link reaches the busy calling line.

With receipt of the first impulse of the third digit, the series relay 530 reoperates in series with punch magnet 505, and at its contacts 531 interrupts the series holding circuit for counting relays 470 and 480 to effect release of relay 480, at its contacts 532 maintains an energizing circuit for the third counting chain relay 470, and at its contacts 535 completes an energizing circuit for pulse hold relay 510. Relays 530 and 510 remain operated for the duration of the receipt of the incoming impulses which are transmitted over the punch conductor to the recorder to effect registering of the third digit of the calling number on the tape member thereat.

As the impulses constituting the entire third digit have been received and the number recorded, prolonged interruption of the energizing circuit effects the release of the series relay 530, which restores and at its contacts 531 completes a series energizing circuit for the third and fourth counting chain relays 470 and 460. Pulse hold relay 530 restores as before described to complete a stepping circuit for the step magnet 500 which effects the advancement of the tape 504 one step between registering of the impulses representing the third and fourth digit.

As the fourth counting chain relay 460 operates, it is effective at its contacts 462 to complete an operating circuit for the first flip-flop relay 450; at its contacts 467 disconnects the composite signalling lead 539 from ground, and at its contacts 466 reconnects it to battery, the circuit extending from battery over the lamp 316, contacts 425, 466, 476, conductor 328, contacts 369', 374', 348, conductor 327, contacts 438, conductor 327', 568 via composite relay 580 to the composite signalling lead 539, trunk conductor 587, resistor 601 and conductor 601 to the composite relay 603 at exchange B to ground.

The composite relay 603 responds to the recompletion of the energizing circuit therefor to close contacts 604, and recomplete the energizing circuit for the incoming call relay 640, which operates and at its contacts 646 now completes an energizing circuit for its third associate relay 630, the circuit extending from battery over the winding of relay 630, contacts 633, 613, 646 and 693 to ground.

The third associate relay 630 operates, and at its contacts 632 locks up to ground independent of the incoming call relay 640; at its contacts 634 locks the first associate relay 620 to ground over contacts 613, 646 and 693; at its contacts 636 opens a further point in the trunk negative conductor connection; and at its contacts 637 connects 500 ohm battery to the positive conductor 655, the circuit extending from battery over the 500 ohm resistance 609, contacts 615, 626, 637, 651, and 694 to conductor 655 extending over the closed contacts of the operated tens and units relays in line finder 28, and conductor 707, to the first line relay 715 in the connector switch 29; and at contacts 638 releases link relay 710 to mark the call as a verification call.

With battery now connected to conductor 655 and the ground connection to conductor 656 now interrupted, the line relay 715 will be operated and the line relay 710 will be restored. Accordingly, line relay 710 at its contacts 711 interrupts the holding circuit for the associate relay 765 to effect the restoration thereof. The operating circuit for toll trunk relay 775 has been interrupted by certain contacts in the connector so that relay 710 will not operate relay 775.

It is seen from the foregoing description that the counting chain at trunk 16 at the recorder end is operative after registration of three calling party digits to provide a supervisory indication for the checking links in a call from the non-recorder end. It will be recalled that the trunk 16 was similarly operated with the establishment of a call from the recorder end to the non-recorder end to signal the check link, and it is apparent that such arrangement at the trunk 25 at the non-recorder end eliminates the unnecessary duplication of a large amount of equipment. It will be remembered that the toll trunk relay 775 is maintained inoperative in a check call and the supervisory signals were so operative i. e., by maintaining relay 710 operated for the first three digits certain contacts were opened in the connector to prevent relay 775 from operating (on calls from toll operators, relay 710 is not operated until answer, thus providing a circuit for the operation of relay 775 at the end of the first digit). Further by now restoring relay 710 and associate relay 765, the test conductor is prepared to switch-through for checking purposes with receipt of the fourth and last impulse. Relay 745 is operated as a result of testing the busy called line (which is the calling line), and relay 760 is operated shortly thereafter.

The recording of the impulses representing the calling party number are also recorded on the recorder 23 in trunk 16 at this time. Specifically, with receipt of the fourth and last digit at the trunk equipment 16, the series relay 530 and the punch magnet operate. At the end of the digit, relay 530 and the punch magnet restore, in turn restoring the step magnet. Relay 530 at its contacts 532 interrupts the holding circuit for the fourth counting chain relay 460, and at its contacts 535 interrupts the holding circuit for pulse hold relay 510 to effect the restoration thereof. Pulse hold relay 510 operates in the manner heretofore described to cooperate with relay 530 to effect the advancement of the tape 504 one step.

With the restoration of the fourth counting chain relay 460, it is effective at its contacts 461 to complete an energizing circuit to the second flip-flop relay 440, the operating circuit for the relay 440 extending from battery over the winding of relay 440, contacts 444, conductor 391, contacts 366, conductor 395, contacts 461, 453, conductor 407, contacts 553, conductor 415, contacts 434 and 423 to the ground. As the second flip-flop relay 440 now operates, it is effective at its contacts 446 to connect operating ground to the spacer relay 520, the circuit extending from battery over the winding of relay 520, contacts 542, contacts 511, conductor 416, contacts 436 and 446 to ground. Spacer relay 520 now operates and prepares to effect the advancement of the tape five spaces.

At the non-recorder end, relay 740 and 735 operate on the fourth digit, and the cut through of the test conductor is effected after the receipt of the fourth and last digit. That is, the calling line test conductor 723 is connected to the test conductor 657 for the trunk. Specifically, as ring digit relay 740 operates in response to the fourth digit dialled, it completes an operating circuit for the reverting call relay 735, the circuit extending from battery over winding 735, contacts 741, 732, 775', 754 and 762 to the test wire conductor 723 extending to the calling party line 312. Reverting call relay 735 operates, and at its contacts 737 connects the test wire conductor 723 over contacts 737 and 766, the closed contacts of the operated line finder tens and units relays of line finder 28, conductor 657, and contacts 675 to the line superviosory relay 670 and 660 in the trunk, whereby these relays are now connected directly to the calling line P wire 783 and will follow supervision from the answer relay 790 in the originating connector 35.

CHECKING AND TAPE SPACING

As the spacer relay 520 operates following the receipt of the fourth and last digit, it is effective at its contacts 524 to complete an energizing circuit for the pulse hold relay 510, which operates and at its contacts 511 interrupts the energizing circuit for the spacer relay 520. These two relays drive each other in the manner previously described, and the spacer relay 520 causes the counting chain in trunk 16 to advance for checking purposes in the manner described relative to the extension of a call in the direction A—B (recorder to non-recorder end).

The chain advances over the first two steps, and as the third counting chain relay 470 is energized in series with the second counting chain relay 480, it is effective at its contacts 476 to disconnect battery from the signalling lead 539 and at its contacts 476 connects ground thereto. With the advancement of the chain to the fourth relay 460 to energize same, the relay 460 is effective at its contacts 467 to disconnect ground from the signalling lead 530, and is effective at its contacts 466 to reconnect battery thereto. The foregoing procedure is designated herein as the unanswering and reanswering of the non-recording trunk, and it is apparent that the pulse thus transmitted effects release and reoperation of the composite signal relay 603 at trunk 25.

With reference to the equipment in the non-recording trunk 25, with the interruption of the application of battery to the signalling conductor 539, the composite signalling relay 603 thereat responsively restores, and at its contacts 604 interrupts the series holding circuit for the incoming call relay 640 and the answer relay 790 in connector 35 to restore same. As the incoming call relay 640 restores, it is effective at its contacts 646 to interrupt the holding circuit for the first associate relay 620 to effect the restoration thereof.

With the restoration of the answer relay 790 in the connector, answer relay 790 is effective at its contacts 791 to connect direct ground over the closed contacts of the operated units and tens relays in line finder 34, conductor 783, test wire conductor 723, and contacts 737 and 766 to the test wire 657, and contacts 675 to the supervisory relays 660 and 670 in the trunk equipment 25. With the application of direct ground over conductor 657, the supervisory relay 670 is maintained operated and a release circuit for the supervisory relay 660 is completed to restore same. If the calling party had not correctly dialled his own number, his test conductor 783 would not have been connected to the supervisory relay 660 and 670 in the described manner, and the application of ground to the test wire 787 by the restored answer relay 790 would have been ineffective to control the supervisory relay 660 to restore. Accordingly, an operating circuit would be completed for the non-check relay 680 as the associate relay 620 restored, the circuit being completed from battery over the winding of relay 680, contacts 662 of the incorrectly operated relay 660, contacts 644, 621 and 693 to ground. However, if the supervisory relay 660 is properly released, the circuit will be interrupted at contacts 662, and the non-check relay 680 will not be operated.

As the counting chain in the trunk equipment 16 now advances to effect the reapplication of battery to the signalling conductor and to thereby reenergize composite signalling relay 603, the closure of contacts 604 thereon effects reoperation of answer relay 790 and incoming call relay 640. Relay 640 operates and at its contacts 645 interrupts the holding circuit for the second associate relay 610, which being slow to release, holds for a predetermined period of time thereafter before it restores.

Following the elapse of this time period, the relay 610 restores, and at its contacts 614 recompletes an energizing circuit for the first control relay 620, the circuit extending from battery over the winding of relay 620, contacts 614, contacts 646 and 693 to ground. The first associate control relay 620 operates, and at its contacts 627 interrupts the application of 500 ohm battery to the positive conductor of the line finder equipment to effect the release of the check link, it being noted that as the contacts 626 of the first associate relay 620 now reclose, the previous circuit therefor has been interrupted by the restored associate relay 610 and the open contacts 615.

The check-link comprising switches 28, 29 now restores in the conventional manner and with the restoration of the link, the ground for the supervisory trunk relays 660 and 670 is interrupted, and the restoration thereof is effected.

It is noted that the incoming call relay 640 in reoperating was effective at its contacts 642 to connect the 150 ohm directional relay 690 to the test conductor 608 extending through the connector 35, line finder 34, P-wire 723, through the connector 29, line finder 28, to the conductor extending to the line supervisory relays 660 and 670 to effect the reoperation of the line supervisory relay 660, this having been accomplished prior to the release of the second holding relay 610. In the event that the party has properly identified himself in this registration of the calling number, the non-check relay will again be maintained inoperative as a result of the reoperation of the supervisory relay 660. That is, if relay 660 is operated as it should, the operating circuit which extends from battery over the winding of non-check relay 680, contacts 661, 643, 631, 611, 621, and 693 to ground will be interrupted by the open contacts 661 of the operated supervisory relay 660 and the operation of the non-check relay 680 will be prevented.

If the proper calling number had not been dialled, relay 660 would not follow the supervisory signals received from the recording trunk, and the non-check relay 680 would have operated over one of the two circuits described. Non-check relay 680 in operating would be effective at its contacts 683 to lock to ground over contacts 693; at its contacts 681 to interrupt the connection of the negative conductor 607 to the trunk line; at its contacts 682 to apply busy tone to the negative conductor 607 extending back to the handset of the subscriber to indicate to him that the number has been incorrectly dialled; and at its contacts 684 to connect battery to the composite signalling lead 602 to prevent further dialling thereover.

With reference to the equipment in the trunk 16 at the recorder end, the tape member 504 will have been advanced four steps as aforedescribed as a result of the advancement of the counting chain thereat in the checking operation. With the operation of the fourth counting chain relay 460 and the opening of contacts 461, the first flip-flop relay 450 is restored, and an operating circuit is completed for the calling number termination relay 360, the circuit extending from battery over the winding of relay 360, conductor 395, contacts 441, 451, conductor 396, contacts 423 to ground.

The calling number termination relay 360 operates, and at its contacts 362 and 364 completes the trunk talking circuit so that the non-recording subscriber can hear the dial tone or all links busy tone as alternatively applied at the link at the recording end of the equipment. The calling number termination relay 360 is also effective at its contacts 361 to remove the 800 ohm shunt across the finder conductors 301 and 302 which have been seized by the line circuit 17 of the trunk 16, so that subsequent dialling as transmitted by the calling subscriber and received by the trunk equipment 16 may be transmitted into the link at the recorder end. Calling number termination relay 360, at its contacts 369, effects the application of battery to the composite signalling conductor, the application of battery being effected over lamp 316, contacts 369, 375, 348, conductor 327, contacts 438, conductor 327', contacts 568 and the upper winding of the composite signalling relay 582, conductor 539, and over the trunk line 24 to the trunk 25 and the composite relay 603 at the non-recorder end.

DIALLING CALLED PARTY'S NUMBER

Following release of the check link, trunk relays 690, 640, 650, 620 and 630 are in the operated condition at the non-recorder end. As the calling subscriber now transmits the impulses which are representative of the first digit of the number of the called party desired in the exchange A, the battery supply relay 650 follows the dial impulses, and at its contacts 652 effects the retransmission thereof over the signalling lead to the composite signal relay 580 in the trunk equipment 16 at the recorder end, the pulsing being effected over circuit extending from battery over the lamp 647, contacts 652, 685, 697 and the upper winding of composite relay 603 over the trunk line 24 to the composite relay 580 thereat.

Composite relay 580 operates, and at its contacts 581 repeats the pulses to the answer relay 410 and the line relay of the seized selector 19 in the seized link 18, 19, the series circuit extending from battery over the winding of relay 410, conductor 428, contacts 581, conductor 304, contacts 358', conductor 301, the closed contacts of the operated ones of the tens and units relay in finder 18, conductor 214, to the line relay (not shown) in the selector 19 to ground.

Answer relay 410 operates, and at its contacts 413 completes an operating circuit for associate relay 400, and at its contacts 412 effects the pulsing of the series relay 530 and the punch magnet 505 in series in a manner heretofore described relative to receipt of pulses in the recording of the calling party number. The series relay 530 at its contacts 535 completes an operating circuit for pulse hold relay 510, the two relays remaining operated during receipt of each digit, and restoring following termination of the receipt of a digit. Pulse hold relays 510 and 530 cooperate in their restoration following each digit to provide an interdigit space on the tape member 504, as heretofore described, and the series relay 530, at its contacts 531 and 532, effects the advancement of the trunk counting chain, whereby the chain is advanced one step with the receipt of each complete digit.

As the fourth counting chain relay 460 is operated responsive to receipt of the third incoming digit, it is effective at its contacts 462 to complete an operating circuit for the first flip-flop relay 450. As the fourth counting relay 460 restores after the receipt of the final digit, it is effective at its contacts 461 to complete an operating circuit for the called number termination relay 560 (instead of the second flip-flop relay 440 as previously effected), the circuit extending from battery over the winding of relay of 560, contacts 563, conductor 397, contacts 367, conductor 398, contacts 461, 453, conductor 407, contacts 553, conductor 415, contacts 434 and 423 to ground.

Called number termination relay 560 operates, and at its contacts 564 locks up to ground on conductor 396; and at its contacts 561 interrupts the series relay 530 and the punch magnet 505, so that further dialling (should such be effected by the calling party) will not be registered on the trunk equipment register. The called number termination relay 560, at its contacts 562, also connects the punch conductor 513 for control by the first counting chain relay 490, to thereby prepare the punch for receipt of the impulses as controlled by the clock unit 22 and registration on the tape member of the duration of the ensuing call.

It is noted that with receipt of the first digit of the called party number, the selector operates to select an idle connector of the hundreds group represented by the digit received and switches through thereto. As conductors 217, 218, 219 are cut-through, the connector line relay 225 thereat is seized for pulsing in a conventional manner, and relay 220 is connected in series with the checkholding relay 380 by the operated associated answer relay 400, the circuit extending from battery over the winding of relay 220, conductor 218, the closed contacts of the operated units and hundreds relays in selector switch 19, conductor 215, the closed contacts of the operated tens and units relays in line finder 18, conductor 302, conductor 306, contacts 405 (of relay 400 which does not release during pulsing) to the winding of relay 380 and ground.

The permanent operated condition of the second line relay 220 in the connector indicates to the connector that the call is an incoming toll ticketing call and not a check call, or a call from a local subscriber or toll operator. The second line relay 220 in the connector 14 is effective at contacts 222 to prevent the operation of the conversation disconnect relay 265, and at its contacts 221 operates relay 285, which operates and at its contacts 287 is effective to maintain the application of ground on the test conductor 219 extending to the finder selector 18, 19, and at contacts 286 disconnects the test wire verification circuit.

With receipt of the second, third and fourth digits, the connector 14 operates in conventional manner to select the called line and connect ringing current to the line, and as the called subscriber X at sub station 10 removes his receiver from his handset in response to the application of ringing current to his line, an operating circuit is completed for the answer relay 235 in the conventional manner. Answer relay 235 in the connector 14 operates, and at its contacts 236 effects the insertion of a 150 ohm resistance in the test conductor 219 which extends over the finder selector link 18, 19 to conductor 303 of the trunk circuit 16. An operating circuit is thus completed for the supervisory relay 320 thereat.

Line relay 320 operates, and at its contacts 323 connects the pick-up conductor 519 of calendar 21 to the calendar pick-up relay 550. Calendar pick-up relay 550 operates if the calendar 21 is free. If the calendar is not restored, the calendar pick-up relay 550 is maintained connected to the pick-up lead 519 until such time as the calendar restores and effects the application of ground over conductor 519 to the calendar pick-up relay 550 as in the previous description.

As ground is applied to pick-up conductor 519 by the calendar, the calendar pick-up relay 550 operates, and at its contacts 555 connects ground to the start conductor 517 for the calendar 21 to effect the operation thereof in the manner heretofore described; at its contacts 553 interrupts the holding circuit for the first flip-flop relay 450 to effect restoration thereof; and at its contacts 557 completes an obvious operating circuit for the clock control relay 540 to effect the energization thereof.

The calendar 21 is now operative to send out information over the conductors extending to the recorder equipment 23 to effect the recordation thereon of the month, day and hour of day upon the tape member 504 thereat in the manner described relative to the establishment of a connection in the recorder end—non-recorder end connection. Following the recordation of this information upon the tape 504 in the recorder 23, the ground is removed from the pick-up lead 519 and the restoration of the calendar pick-up relay 550 is effected, reoperation thereof being prevented by reason of the interruption of the original energizing circuit therefor by the open contacts 544 on the operated clock control relay 540.

The duration of the call is registered on the recording tape by the clock mechanism 22 in the manner heretofore described, the calendar clock placing ground on the clock lead every 15 seconds to effect a corresponding operation of the trunk counting chain. With each complete operation of the counting chain after the reenergization of the first relay and release of a second relay in the counting chain for a succeeding round, the punch 505 is energized to place a one minute punch on the perforation on the tape 504.

RELEASE

The release of the equipment in the extension of a call to a party at the recorder end of the arrangement is controlled by the calling party. In the event that the called party hangs up first, answer relay 235 restores to interrupt the application of the 150 ohm ground which is extended to the supervisory relay 320 in the trunk to effect the restoration thereof.

Relay 320 in restoring is effective at its contacts 323 to interrupt the connection of the conductor 515 to the spacer relay 520 to terminate the registration of the talking time punches. Should the called party re-lift his receiver prior to release by the calling party, timing is automatically resumed where it left off by the reoperation of the supervisory line relay 320 and the operated spacer relay 520.

With the restoration of the receiver to the handset by the calling party, the seized link 34, 35 is released and the ground extending from the connector 35 of the link over conductor 608 to the trunk 25 is interrupted to effect the restoration of the directional relay 690 in the trunk. Relay 690 responsively restores, and at its contacts 693 interrupts a holding ground for the third incoming call relay 630 to effect the release thereof; at its contacts 695 completes connection of ground through the line relay of line circuit 700 to the incoming call relay 640 to effect the energization thereof, the circuit extending from battery over the winding of relay 640, contacts 604 and 606, contact 695, conductor 655 through the line relay of the line circuit 700 to ground operating the line relay.

With the restoration of the directional relay 690 in the trunk 25 and the opening of the contacts 697, the operating circuit for the composite signalling relay 580 at trunk 16 is interrupted to effect the restoration thereof. Composite relay 580 at its contacts 581 effects interruption of the energizing circuit for the answer control relays 410 and 400 thereat, and connector relay 225 which releases relay 240 to release the connector, line finder, selector and line circuit.

Relay 400 restores and releases 400 which at its contacts 404 completes an operating circuit for the second release relay 430, and at its contacts 403 interrupts the holding circuit for the first release relay 420, which holds for a brief period of time thereafter to maintain an energizing circuit for the second release relay 430. The release of relay 400 opens the holding circuit for relay 450, which restores. Relay 430 in its restoration is effective at its contacts 433 to interrupt the holding circuit for the first flip-flop relay 450 to effect the release thereof. The first release relay 420 is effective in its restoration and the consequent opening of its contacts 423 to interrupt the holding circuit for the calling number termination relay 360, and in turn, the called number termination relay 560 to effect the restoration of each of these relays.

An operating circuit is completed for the spacer relay 520, which extends from battery over the winding of relay 520, contacts 542, 511, conductor 416, contacts 435 and 424 to ground to effect the operation thereof. The spacer relay 520 operates in the manner heretofore described to effect the operation of the stepping magnet 500 in the recorder 23 and the advancement of the tape 504 eight steps to provide the described separation between calls, the flip-flop relays 440 and 450 cooperating with the trunk counting chain relays, the spacer relay 520 and pulse hold relay 510 in effecting such advancement. During this period, the release relay 430 is maintained energized, and at its contacts 437 effects the application of battery over the signalling conductor 539 to block further dialling thereby; and at its contacts 431 applies ground to the incoming test conductor 211 to maintain the trunk 16 busy to all selectors, such as 13, having access thereto until such time as the stepping of the tape in the recorder 23 has been completed and the equipment utilized in the call has been restored. Release of the equipment following stepping of the tape is effected in the manner set forth relative to the establishment of a call in the direction A—B.

What is claimed is:

1. In an automatic telephone exchange, a plurality of subscriber lines therein, switching links for establishing connections between said subscriber lines with seizure thereof by a calling line, and call extending means operative with seizure thereof over one of said links by a calling subscriber to seize an idle one of said regular call establishing links, and link control means associated with said call extending means for extending a connection to the calling party line over the link seized by said call extending means.

2. In an automatic telephone exchange, a plurality of subscriber lines therein, switching links for establishing calls between said subscriber lines with seizure thereof by the calling party, recorder means for automatically recording information regarding the calling and called lines, the time of the call and the length thereof, call extending means operative with seizure thereof by a calling subscriber over one of said links to seize an idle one of said regular call establishing links prior to the dialling of the called line number, means for transmitting impulses representative of the calling party number to said call extending means and impulse repeating means for simultaneously transmitting the impulses received over said first seized link which represent said calling party line to said recorder means, and simultaneously to said seized link to control same to extend a connection to said calling line for verification purposes.

3. In an automatic telephone exchange, a plurality of subscriber lines, a plurality of finder selector switching links accessible to said lines, a plurality of connector switches for establishing connection with said links to other subscriber lines in said exchange, signal means for transmitting impulses representative of a calling party number, recorder means for recording the assigned directory number of the calling line for use in subsequent billing operations, call extending means accessible to said finder selector links for seizing an idle one of said finder selector links and an idle connector, and link control means operative with receipt of the impulses representing the calling party number to transmit the impulses to said recorder for recordation purposes, and to simultaneously transmit said impulses to said seized link and connector to control same in the extension of a connection to the calling party line.

4. An automatic telephone exchange having a plurality of subscriber lines, a plurality of linefinder-selector links accessible to said lines, a plurality of connector switches for establishing connections to the subscriber lines associated with the exchange, means operatively controlled by a subscriber in initiating certain calls to transmit impulses representative of the calling line directory number, recorder means for automatically recording the assigned directory number of the calling line for use in subsequent billing operations as dialled by the calling party, and call extending means operative with seizure thereof over one of said regular links by a calling subscriber in the establishment of said certain class of call to seize an idle one of said regular links and extend a connection to the calling party line as said number is dialled by the calling party.

5. In an automatic telephone exchange having a plurality of subscriber lines, link switching means for establishing connection between the subscriber lines, impulsing means operated by the calling subscriber for transmitting impulses representing the calling line member with the initiation of a call, permanent type recorder means for recording the assigned directory number of the calling line as dialled by the calling party, call extending means operative, responsive to establishment of a call to certain of said subscribers over a seized one of said links, to seize a second idle one of said links, link control means operative to extend a connection thereover to said calling line as the calling number is dialled by the calling party and verification means operative with completion of a connection to a line as controlled by said calling subscriber to check the connection as being established to said calling line.

6. In an automatic telephone exchange having a plurality of subscriber lines, link switching means for establishing connections between subscriber lines impulsing means for each calling subscriber operated with the initiation of a call by the subscriber to transmit impulses representing the calling line number, recorder means for recording the assigned directory number of the calling line as transmitted by the calling party, call extending means accessible over at least one level of the switches of said links, link control means operative with seizure of the call extending means by one of said links in the establishment of a call to seize a second one of said links to control same to extend a connection to the calling line with receipt of the calling number impulses transmitted by the calling party verification means for checking the connection established thereover, and blocking means for preventing further extension of the call by the call extending means with discovery by said verification means of a check connection established to a line other than said calling line.

7. In an automatic telephone exchange having link switching means for establishing connections between local subscriber lines and having trunk circuits accessible to said links for extending connections to subscriber lines at distant exchanges, impulsing means for each subscriber for transmitting impulses representative of his calling number prior to the establishment of a call over said trunks; permanent recorder means for recording the assigned directory number of a calling line and further call information with the establishment of a call over one of said trunk circuits, link control means associated with each of said trunks operative responsive to seizure of its associated trunk by a calling line over a first seized one of said links to seize an idle one of said links to extend a connection to the calling line as controlled by said impulses transmitted by the calling party, and verification means for checking the connection established to verify the calling number impulses transmitted for said call.

8. In an automatic telephone exchange having link switching means for establishing connections between local subscriber lines and having trunk circuits accessible to said links for extending connections to subscriber lines at distant exchanges, impulsing means for each subscriber for transmitting impulses representative of his calling number prior to the establishment of a call over said trunks permanent recorder means for recording the assigned directory number of a calling line and further call information with the establishment of a call over one of said trunk circuits, link control means associated with each of said trunks operative responsive to seizure of its associated trunk by a calling line over a first seized one of said links to seize an idle one of said links, impulsing means associated with said trunk for transmitting said calling number as received thereby simultaneously to said second seized link and said recording means to control said link to extend a connection to a calling line and to control said recorder to record the number indicated by said impulses, and verification means for checking the connection established to verify the calling line number recorded.

9. An automatic telephone system as set forth in claim 8 which includes a single clock and calendar means common to each given group of said trunks for automatically transmitting to said recorder with establishment of the connection to the calling party, indications of the month, time of day, and length of each connection established over the trunk of its assigned group.

10. An automatic telephone exchange as set forth in claim 8 which includes clock and calendar means common to all of said trunks for automatically transmitting impulse indications of the month, time of day, and length of each connection established over each trunk to said recorder, and in which said recorder means comprises a punch member and associated tape for each of said trunks, and means for driving said tape relative to said punch to effect recording thereon as a series of punches in tandem said call information transmitted to said recorder.

11. In an automatic telephone exchange, switching links for establishing connections between local subscriber lines, a group of trunk circuits accessible to said links for extending calls to subscriber lines at distant interconnected exchanges, and accessible to associate trunk means in the distant exchange for extending calls therefrom to the local subscribers, impulsing means for each subscriber for transmitting impulses representative of his calling number to said trunks in the establishment of a call thereover recorder means for recording the assigned directory number of the calling line and further call information with the establishment of a call over said trunk circuits, link control means for each of said trunks operative with seizure of the trunk by a local link to seize an idle local link and to extend the incoming impulses representative of the calling party number over said link seized thereby to control same to extend a connection to the calling line for checking purposes, and operative with seizure by a trunk at the distant exchange to seize a link for extending the incoming connection from the distant trunk to the desired subscriber.

12. An automatic telephone exchange, switching links for establishing connection between local subscriber lines, a group of trunk circuits accessible to said links for extending calls to subscriber lines at distant interconnected exchanges, which trunks are accessible to subscribers in the distant exchange for extending calls therefrom to the local subscribers, impulsing means for each subscriber for transmitting impulses representative of his calling number to said trunks in the establishment of a call thereover, recorder means for recording the assigned directory number of the calling party and further call information with the establishment of a call over one of said trunk circuits, link control means for each of said trunks operative responsive to seizure of the trunk by a local link to seize an idle local link, and to extend the incoming impulses representative of the calling party number to the seized link to control same to extend a connection to the calling line for checking purposes, and means in the trunk operative responsive to seizure thereof by a subscriber at a distant exchange to seize a link for extending the called party impulses to the desired subscriber, and call discriminating means in said trunk operative to transmit a first signal to the link as seized for checking purposes, and operative to transmit a second signal to the link as seized for the purpose of extending a connection incoming from a distant exchange.

13. In an automatic telephone exchange, switching links for establishing connections between local subscriber lines, a group of trunk circuits accessible to said links for exending calls to subscriber lines at distant interconnected exchanges, and accessible to associate trunk means in the distant exchange for extending calls therefrom to the local subscribers, impulsing means for each subscriber for transmitting impulses representative of his calling number to said trunks in the establishment of a call thereover recorder means for recording the assigned directory number of the calling line and further call information with the establishment of a call over one of said trunk circuits, line circuit means for each of said trunks operative with seizure of the trunk by a local link to seize an idle local link and to extend the incoming impulses representative of the calling party number over said link seized thereby to control same to extend a connection to the calling line for checking purposes, and operative with seizure by a trunk at the distant exchange to seize a link for extending the called party impulses from the distant trunk to the desired subscriber, verification means in said trunk operative with seizure of a link for verification purposes to transmit a signal over the loop which extends from the trunk over the trunk seizing connection, the calling line, the check link connected thereto and back to the trunk, and means operative only responsive to the successful extension of the check signal over said loop to enable the trunk to effect further extension of said call.

14. In an automatic telephone exchange, switching links for establishing connections between local subscriber lines including time disconnect means, a group of trunk circuits accessible to said links for extending calls to subscriber lines at distant interconnected exchanges, and accessible to associate trunk means in the distant exchange for extending calls therefrom to the local subscribers, impulsing means for each subscriber for transmitting impulses representative of his calling number to said trunks in the establishment of a call thereover recorder means for recording the assigned directory number of the calling line and further call information with the establishment of a call over one of said trunk circuits, link control means for each of said trunks operative with seizure of the trunk by a local link to seize an idle local link and to extend the incoming impulses representative of the calling party number over said link seized thereby to control same to extend a connection to the calling line for checking purposes, and operative with seizure by a trunk at the distant exchange to seize a link for extending the incoming connection from the distant trunk to the desired local subscriber, call discriminating means in each trunk for transmitting a first signal to the link seized thereby to indicate seizure for purposes of a check call and a second signal to indicate seizure for purposes of extending an incoming call, and call recognition means in each of said links for conditioning said links in accordance with the designation of the signal received including means operative with receipt of a signal indicating a verification call to prepare said link to extend a test connection to the calling line with receipt of the impulses representing the calling party number, and means operative with receipt of a signal indicating an incoming call from the distant exchange to disable the time disconnect equipment in the link.

15. An automatic telephone exchange as set forth in claim 14 in which said trunk circuits include verification means for transmitting a check signal over the trunk seizing link for checking purposes, and call blocking means for preventing the further extension of the talking connections of an outgoing call prior to verification in the event of failure to receive said signal over the test connection established by the check link responsive to the impulses transmitted by the calling party.

16. In an automatic telephone exchange, switching links for establishing connections between local subscriber lines including time disconnect means, a group of trunk circuits accessible to said links for extending calls to subscriber lines at distant interconnected exchanges, and accessible to associate trunk means in the distant exchange for extending calls therefrom to the local subscribers, impulsing means for each subscriber for transmitting impulses representative of his calling number to said trunks in the establishment of a call thereover recorder means for recording the assigned directory number of the calling line and further call information with the establishment of a call over one of said trunk circuits, link control means for each of said trunks operative with seizure of the trunk by a local link to seize an idle local link and to extend the incoming impulses representative of the calling party number over said link seized thereby to control same to extend a connection to the calling line for checking purposes, and operative with seizure by a trunk at the distant exchange to seize a link for extending the incoming connection from the distant trunk to the desired subscriber, call discriminating means in each trunk for transmitting coded polarity pulses to the link seized thereby to indicate the direction of the call being established over the trunk, call recognition means in each of said links operative with receipt of a given signal to prepare said link to extend a test connection from the trunk to the calling line, and means operative with receipt of a signal indicating an incoming call from the distant exchange to remove time disconnect in the link; verification means in each trunk operative with the local establishment of a call to transmit a verifying signal over the trunk seizing link, the calling line, the check connection of link seized for checking and said trunk and check means in the trunk operative with failure to receive the check signal over said circuit to disable the trunk from further extension of the call.

17. In a telephone system having at least a pair of exchanges, each exchange having a plurality of subscriber lines associated therewith and a plurality of links for setting up connections between said subscriber lines, two-way trunk circuit means at each exchange accessible to said links for extending connections between the subscriber lines in the several exchanges; means for connecting each of the trunks at an exchange with a corresponding paired trunk at a second one of said exchanges, impulsing means for each subscriber for transmitting impulses representative of his calling number to said trunks in the establishment of a call thereover, recorder means at only one trunk of each pair for recording for subsequent billing purposes the directory number of the calling line and further information for each call established over the trunk pair, impulsing means in each trunk for transmitting the information as received to said recorder means, and verification means for checking the calling line number of the local subscriber as transmitted to said recorder means with the establishment of a call over said trunk pair.

18. In a telephone system having at least a pair of exchanges, each exchange having a plurality of subscriber lines associated therewith and a plurality of links for setting up connections between said subscriber lines, two way trunk means at each exchange accessible to said links for extending connections between the subscriber lines in the several exchanges; means for connecting each of the trunks at an exchange with a corresponding paired trunk at a second one of said exchanges, impulsing means for each subscriber for transmitting impulses representative of his calling number to said trunks in the establishment of a call thereover, recorder means at only one trunk of each pair for recording for subsequent billing purposes the directory number of the calling line in either direction over the trunk pair, and further information for impulsing means in each trunk for transmitting the information as received to said recorder means, verification means for checking the calling line number of the local subscriber as transmitted to said recorder means with the establishment of a call over said trunk pair including control means for completing a test connection to the calling party line simultaneously with the registration thereof on said recorder, check signal means for transmitting a signal over said connection, the calling line, and the trunk seizing line; and checking means operative only with receipt of said signal at a predetermined time for enabling the trunk to extend the call to the distant exchange.

19. In a telephone system having at least a pair of exchanges, each exchange having a plurality of subscriber lines associated therewith and a plurality of links for setting up connections between said subscriber lines, two way trunk means at each exchange accessible to said links for extending connections between the subscriber lines in the several exchanges; means for connecting each of the trunks at an exchange with a corresponding paired trunk at a second one of said exchanges, impulsing means for each subscriber for transmitting impulses representative of his calling number to said trunks in the establishment of a call thereover, recorder means at only one trunk of each pair for recording for subsequent billing purposes the directory number of the calling line in either direction over the trunk pair, and further information for each call established over the trunk pair, impulsing means in each trunk for transmitting the information so received to said recorder means, verification means for checking the calling line number of the local subscriber as transmitted to said recorder means with the establishment of a call over said trunk pair including control means for completing a test connection to the calling line number simultaneously with the recordation thereof on said recorder, check signal means for transmitting a signal over said connection, the calling line, and the trunk seizing link; checking means operative only with receipt of said signal at a predetermined time for enabling the trunk to extend the call to the distant exchange; and blocking means included in said one trunk for preventing the impulses representing the calling line number extended to said one trunk for recording purposes from advancing to the exchange link seized by said one trunk for call-extending purposes.

20. In a telephone system as set forth in claim 18 which includes a central office and a plurality of two way trunk pairs for interconnecting same with a series of remote offices, said one trunk of each pair having said recorder means disposed at said central office.

21. In a telephone system having at least a pair of exchanges, each exchange having a plurality of subscriber lines associated therewith and a plurality of links for setting up connections between said subscriber lines; trunk means at each exchange accessible to said links for extending connections between the links in the several exchanges, means for connecting said trunks at said respective exchanges in pairs, impulsing means for each subscriber for transmitting impulses representative of his calling number to said trunks in the establishment of a call thereover, recorder means at only one trunk of each pair for recording the directory number of the calling line for a call established in either direction over said trunk pair, link seizing equipment in each of said trunks for seizing an idle one of said regular links in the associated exchange for checking purposes responsive to initiation of an outgoing trunk call relative to that exchange and impulsing means for simultaneously transmitting the impulses representative of the calling party number to said seized link to control same to extend a test connection to said calling line and to said recorder to control same to record the line number dialled.

22. A trunk repeating circuit for use in extending connections between subscribers of two interconnecting exchanges, the subscribers of the exchanges having access to said trunk means over associated link switching equipment, and in which call information including calling party number is transmitted over the seizing link to the seized trunk, said trunk means comprising a trunk seizing path to which said links of the local exchange have access for the purpose of establishing an outgoing call thereover, link seizing means including a path extending to the local links for seizing an idle one of said local links, link control means associated with said trunk operated responsive to seizure of the trunk by one of said links in the establishment of an outgoing call thereover to seize an idle one of said local links over said link seizing path, and impulse repeating means for transmitting the impulses representative of the calling party number, as received, over said link seizing path to the seized local link to control same to extend a test connection to the calling line for vertification of the calling number transmitted.

23. A trunk repeating circuit for use in extending connections between subscribers of two interconnecting exchanges, the subscribers of the exchanges having access to said trunk means over associated link switching equipment, and in which call information including calling party number is transmitted over the seizing link to the seized trunk, trunk means comprising a trunk seizing path to which said links of the local exchange have access for the purpose of establishing an outgoing call thereover, recorder means for recording the calling number and further information relative to the call with establishment of a call thereover, a second path for seizing an idle one of said local links, seizing means associated with said trunk operated responsive to seizure by one of said links over said first path to seize an idle one of said links over said second path for vertification purposes, and impulse repeating means for transmitting the impulses representing the calling party number, as received, simultaneously to said second local link to control same to extend a test connection to the calling party line for verification of the calling number received and to said recorder means for recording thereon.

24. A trunk repeating circuit for use in extending connections between subscribers of two interconnecting exchanges, the subscribers of the exchange having access to said trunk means over associated link switching equipment, and in which call information including calling party number is transmitted over the seizing link to the seized trunk, said trunk means comprising a trunk seizing path to which said links of the local exchange have access for the purpose of establishing an outgoing call thereover, recorder means for recording the impulses representing the calling number and further information relative to the call with establishment of an outgoing call thereover, a second path for seizing an idle one of said local links, seizing means associated with said trunk operated responsive to seizure by one of said links to seize an idle one of said links over said second path for verification purposes, impulse repeating means for transmitting the impulses representing the calling party number, as received, simultaneously to said second local link to control same to extend a test connection to the calling party line for verifying the number received and to said recorder means for recording thereon, and test means connected to said first and second trunk paths for transmitting a verification signal over said first path whereby the signal is extended over the trunk seizing link for said call, the calling subscriber line, the link seized by said trunk and over said second trunk path to said test means.

25. A trunk repeating circuit for use in extending connections between subscribers of two interconnecting exchanges, the subscribers of the exchange having access to said trunk means over associated link switching equipment, and in which call information including calling party number is transmitted over the seizing link to the seized trunk, said trunk means comprising a trunk seizing path to which said links of the local exchange have access for the purpose of establishing an outgoing call thereover, recorder means for recording the impulses representing the calling number and further information relative to the call with establishment of an outgoing call thereover, a second path for seizing an idle one of said local links, seizing means associated with said trunk operated responsive to seizure by one of said links to seize an idle one of said links over said first path for verification purposes, impulse repeating means for transmitting the impulses representing the calling party number, as received, simultaneously to said second local link to control same to extend a test connection to the calling party line for verifying the number received and to said recorder means for recording thereon, test means connected to said first and second trunk paths for transmitting a verification signal over said first path whereby the signal is extended over the trunk seizing link for said call, the calling subscriber line, the link seized by said trunk and said second trunk path, supervisory means connected to said second path for checking receipt of said verification signal over said test connection and blocking means operative with failure of said supervisory means to detect said check signal to terminate further extension of the connection.

26. A trunk repeating circuit for use in extending connections between subscribers of two interconnecting exchanges, the subscribers of exchanges having access to said trunk means over associated link switching equipment, and in which call information including calling party number is transmitted over the seizing link to the seized trunk, said trunk means comprising a trunk seizing path to which said links of the local exchange have access for the purpose of establishing an outgoing call thereover, an incoming path to which a paired trunk in a second exchange has access for establishing a call thereover to the local exchange, a link seizing path for seizing an idle one of said local links, link seizing means associated with said trunk operated responsive to seizure of the trunk by said distant trunks or one of said local links, and signal means in said trunk for transmitting a first given signal over said second path to said seized link to indicate an incoming call and a second given signal over said second path to indicate the outgoing call.

27. A trunk repeating circuit for use in extending connections between subscribers of two interconnecting exchanges, the subscribers of the exchanges having access to said trunk means over associated link switching equipment, and in which information concerning the calling and called number of each call is transmitted to the trunk said trunk circuit comprising punch means for recording on a tape member as a series of punches in tandem the calling party number, called party number, the month, day, time of day and the duration of the call for subsequent billing purposes, and recorder control means for controlling spacing of the information as extended to said recorder, including a space control means for providing a first number of spaces between the digits of each recorded number and providing a second predetermined number of spaces between the punches of certain of the groups, and calendar and clock control means for connecting a common exchange calendar and clock unit to said recorder to extend calendar information in impulse form to said recorder operative responsive to answer by the called party.

28. A two way trunk repeating circuit for use with a second paired trunk circuit in extending connections between subscribers of two interconnecting exchanges, the subscribers of the exchanges having access to said trunk means over associated links, and in which call information including the calling party number is transmitted over the seizing link to the seized trunk with initiation of a call thereover said trunk means at one of said exchanges only having recorder means for recording the number of the calling party for a call established in either direction, each of said trunks having seizing means operated with establishment of a call thereover in either direction to seize an idle one of said links, impulse repeating means operative with establishment of a call by a local subscriber to transmit the calling party number, as received, over the local link seized thereby to extend a test connection to the calling line for verifying the number received, and simultaneously to said recorder means at said one trunk, and verification enabling means at said one trunk only for controlling the seized trunk at a predetermined time to transmit a test signal over said test connection.

29. A repeater circuit as set forth in claim 28 in which said verification enabling means includes a counting chain connected to operate with receipt of the impulses representative of the calling party number of a call established by a subscriber at either exchange to count the digits of the calling number and to enable the trunk associated with the calling party end responsive to receipt of all of the digits of the calling party number.

30. A switching link for use in an automatic telephone exchange adapted to extend calls of four different origins thereover including a local subscriber call, a toll call, an incoming ticketing call, and a verification call, including conversation timing means for timing local subscriber calls and interrupting the connection with the expiration of a predetermined time period, an input and output path comprising two talking conductors and a test conductor, line relay means for responding to incoming signals received over said input path, and discriminatory control means including connecting means for connecting the incoming test conductor directly through the link to the outgoing test conductor, and disconnect means for effecting time disconnect of the conversation timing means in said link, and means controlled by said line relay means responsive to receipt of a first signal indicating receipt of a verification call to render effective said connecting means and means controlled by said line relay means responsive to receipt of a signal indicating a ticketed incoming call, or a toll call to operate said disconnect means.

31. A switching link for use in an automatic telephone exchange as set forth in claim 30 in which said verification and identification signal and said ticketing call identification signal are received over alternate ones of said conductors and in which said line relay means include a first and second line relay, one of said line relays being connected to respond to each incoming impulse received over one of said incoming conductors another of said line relays being connected to the other conductor to respond to signals received thereover.

32. Calendar means for use with trunking equipment in an automatic telephone exchange including a series of mechanical information storing registers for marking the month, day, hour, and tenth of hour, a counting chain, a sequence switch, a start relay for initiating operation of said sequence switch, means controlled by said sequence switch in its stepping to successively connect said counting chain to each of said information storing registers, driving means for advancing said counting chain to transmit impulses over an output circuit indicative of the information stored on each connected register, and stop driving circuit operative with the complete transmission of the information stored on the connected register to clear the counting chain to advance the sequence switch a further step to connect the chain to a successive one of said registers.

33. An automatic telephone system having at least two exchanges, each exchange having a plurality of subscribers and a plurality of trunk circuit means for extending calls between the subscribers of the exchanges, one trunk at a station being paired with a corresponding trunk at the other station and interconnected thereto, recorder means in only one trunk of each pair of trunks for recording information concerning each call established over each associated trunk pair, calendar means common to a group of said trunks for transmitting the month, day, hour and tenths of hour to the recorder means of a trunk pair seized for establishment of a call, marking means on said calendar for indicating a busy or an idle condition, calendar test means in each of said trunks for extending the trunk for connection to said calendar with receipt of a signal indicating answer by the called subscriber, and operative only with detection of an idle calendar condition to connect the associated trunk and recorder means thereto.

34. An automatic telephone system having at least two exchanges, each exchange having a plurality of subscribers and a plurality of trunk circuit means for extending calls between the subscribers of the exchanges, a trunk at each station being paired with a corresponding trunk at another station with which it is interconnected, in which information concerning each call is transmitted in impulse form to said trunks recorder means in only one trunk of each pair of trunks for recording information concerning each call and for recording the time duration of each call established thereover, clock means for transmitting an impulse once with the elapse of each given time interval, clock connecting means for connecting the recorder bearing trunk of a pair to said clock means with the establishment of a connection over a trunk pair, and connecting means in said trunk for counting said time interval representing impulses recorded thereover and transmitting a marking impulse to said recorder with each advancement of the count to a predetermined figure.

35. An automatic telephone exchange, switching links for establishing connection between local subscriber lines, a group of trunk circuits accessible to said links for extending calls to subscriber lines at distant interconnected exchanges, which trunks are accessible to subscribers in the distant exchange for extending calls therefrom to the local subscribers, impulsing means for each subscriber for transmitting impulses representative of his calling number to said trunks in the establishment of a call thereover, recorder means for recording the assigned directory number of the calling line and further call information with the establishment of a call over one of said trunk circuits, link control means for each of said trunks operative responsive to seizure of the trunk by a local link to seize an idle local link, and to extend the incoming impulses representative of the calling line number to the seized link to control same to extend a connection to the calling line for checking purposes, and means in the trunk operative responsive to seizure thereof by a subscriber at a distant exchange to seize a link for extending the called line impulses to the desired subscriber, call discriminating means in said trunk operative to transmit a first signal to the link as seized for checking purposes, and operative to transmit a second signal to the link as seized for the purpose of extending a connection incoming from a distant exchange, and signalling means included in said call discriminating means for transmitting coded polarity impulses of different characteristics to the link seized thereby to identify the different calls.

36. An automatic telephone exchange, switching links for establishing connection between local subscriber lines, a group of trunk circuits accessible to said links for extending calls to subscriber lines at distant interconnected exchanges, which trunks are accessible to subscribers in the distant exchange for extending calls therefrom to the local subscribers, impulsing means for each subscriber for transmitting impulses representative of his calling number to said trunks in the establishment of a call thereover, a recorder means for recording the assigned directory number of the calling line and further call information with the establishment of a call over one of said trunk circuits, link control means for each of said trunks operative responsive to seizure of the trunk by a local link to seize an idle local link, and to extend the incoming impulses representative of the calling line number to the seized link to control same to extend a connection to the calling line for checking purposes, and means in the trunk operative responsive to seizure thereof by a subscriber at a distant exchange to seize a link for extending the called line impulses to the desired subscriber, call discriminating means in said trunk operative to transmit a first signal to the link as seized for checking purposes, and operative to transmit a second signal to the link as seized for the purpose of extending a connection incoming from a distant exchange, and signalling means included in said call discriminating means for transmitting coded polarity impulses in given timed relation with the control impulses transmitted to the link to distinguish between check and incoming calls.

37. In an automatic telephone exchange, switching links for establishing connections between local subscriber lines, said links including conversation timing means for timing local subscriber calls and interrupting the connection with the expiration of predetermined time period, toll trunk relay means for effecting disconnect of said timing only with the extension of a toll call thereover, and input and output paths for each link comprising two talking conductors and a test conductor, trunk circuits accessible to said links for extending calls to subscriber lines at distant exchanges and accessible to associated trunk means in the distant exchange for extending calls therefrom to local subscribers, impulsing means for each subscriber for controlling a link to seize a trunk and transmitting impulses representative to his assigned directory number to the trunk with the initiation of a call thereover, means in the link for connecting the test conductor thereof to the calling line, recorder means for recording the assigned directory number of the calling line and further call information with the establishment of a call over one of the trunk circuits, link control means for each of the trunks operative to seize an idle one of said links with the establishment of a call over the trunk in either direction, impulsing means in said trunk operative with receipt of the impulses representing the calling party number to record the directory number as received and to simultaneously transmit the impulses to the link seized by the trunk to control the same to extend a test connection to the calling party line, line relay means in each of said links, discriminatory means in each of said links including testing means for connecting a test connection from the trunk through the link to its test conductor extending to the calling party line, and means in said link controlled by said line relays therein responsive to receipt of a first signal indicating receipt of a verification call to operate said testing means and controlled responsive to receipt of a second signal indicating a ticketed incoming call to render said conversation timing means ineffective.

38. In a telephone system having at least a pair of exchanges, each exchange having a plurality of subscriber lines associated therewith and a plurality of links for setting up connections between said subscriber lines, two-way trunk circuit means at each exchange accessible to said links for extending connections between the subscriber lines in the several exchanges; means for connecting each of the trunks at an exchange with a corresponding paired trunk at a second one of said exchanges, impulsing means for each subscriber for transmitting impulses representative of his calling number to said trunks in the establishment of a call thereover, recorder means at only one trunk of each pair for recording for subsequent billing purposes the directory number of the calling line and further information for each call established over the trunk pair, impulsing means in each trunk for transmitting the information as received to said recorder means, verification means for checking the calling line number of the local subscriber as transmitted to said recorder means with the establishment of a call over said trunk pair, and timing means included only in said recorder trunk for controlling the trunk at the originating end of the call to render its associated verification equipment operative at a predetermined time during the extension of the call.

39. A trunk repeating circuit as set forth in claim 24 in which said test means includes a counting chain for counting the number of digits in the calling party number as received, means operative with detection of receipt of the complete calling number by the counting chain to initiate a second cycle thereof, check signal transmitting means operated at a predetermined time period during the second cycle of the chain to transmit a signal over the first path to the calling line test connection and said second path; and supervisory means operated only with receipt of said signal over said test connection at a predetermined period during the second cycle of the counting chain to enable the trunk for further extension of the call.

40. A trunk repeating circuit as set forth in claim 24 in which said test means includes a counting chain for counting the number of digits of a calling party number as received, means operative with detection of receipt of the complete calling number by the counting chain to initiate a second cycle thereof, check signal transmitting means operated at a predetermined time period during the second cycle of the chain to transmit a signal over the first path to the calling line test connection and said second path; supervisory relay means operated only with receipt of said signal over said test connection at a predetermined period during the second cycle of the counting chain to enable the trunk to further extend the call, and checking means on said counting chain operated only during two predetermined steps thereof to prepare said supervisory means for operation over said checking circuit, and blocking means operative with said supervisory relay means in the restored condition during said checking operation for disabling the trunk and transmitting busy tone to the calling subscriber.

41. A trunk repeating circuit as set forth in claim 24 which includes a punch recorder means and a tape member which is punched by said recorder in accordance with impulses received thereby representing call information, and in which said test means includes a counting chain for counting the number of digits in the calling party number as received, means operated with detection of receipt of the complete calling number by the counting chain to initiate a second cycle thereof, check signal transmitting means operated at a predetermined time period during the second cycle of the chain to transmit a signal over the first path to the calling line test connection and said second path; supervisory means operated only with receipt of said signal over said test connection at a predetermined period during the second cycle of the counting chain to enable the trunk to further extend the call, and means controlled by said counting chain with each step thereof during said counting operation to control advancement of the tape a predetermined number of spaces, whereby the spaces on the tape between the punches indicate the end of the calling number and the point of initiation of further call information.

42. A calendar means as set forth in claim 32 for use in a telephone exchange in which the groups of digital information concerning each call are recorded on a tape as a series of punches in tandem and which includes advancing means for moving the tape to separate the punches representing various call information by spaces of a predetermined value, which calendar includes spacing means for transmitting a predetermined number of spacing impulses to the recorder advancing means prior to the transmission of said information bearing impulses thereby, and for transmitting a predetermined number of spacing impulses between each digit of a group, and a predetermined number of spaces between the various information groups.

43. An automatic telephone system as set forth in claim 33 in which each of said recorder bearing trunk means includes start means operative responsive to connection of the trunk to the calendar to transmit a start signal to said calendar.

44. In a telephone system for serving a plurality of subscribers, means accessible to the subscribers for connecting a calling line with a called line, switch means controlled by the calling subscriber by dialing the digits of his own telephone number to connect with his own line, recording means for making a record of the called and the calling party number simultaneously with the dialing thereof by the calling party, and calendar means automatically operative to transmit to said recording means the time of call initiation and the call duration with the calling and called party numbers.

45. In a telephone system for serving a plurality of subscribers, a plurality of trunk circuits, means accessible to subscribers for seizing an idle one of said trunks and connecting a calling line with a called line over said trunk circuit, switch means controlled by the calling subscriber by dialing the digits of his own telephone number to connect with his own line, means in said trunk for making a record of the called and calling party numbers simultaneously with the dialing thereof by the calling party, and calendar means common to a number of said trunk circuits automatically operative to record the time of call initiation and the call duration on the record with the calling and called party numbers.

46. An arrangement as set forth in claim 45 in which said record means includes a tape member and a punch and a stepping magnet connected to operate with receipt of the information designating impulses to make a punch tape record of such information.

47. In a telephone system for serving telephone subscribers, a trunk circuit, means accessible to said subscribers for connecting a calling line with a called line over said trunk circuit, switch means controlled by the calling subscriber by dialing the digits of his own telephone number to complete a loop from said trunk over a number of said automatic switches to his own line and back to the trunk responsive to the accurate dialing of his own number, means for recording said calling party number simultaneous with extension of said loop connection over said switches, means in said trunk for sending a signal over said loop back to said trunk to verify completion of said loop over said automatic switches to said calling line and back to said trunk, and means operative to block further extension of the call by the subscriber with failure of said test means to detect said completion of said loop.

48. A switching link for use in an automatic telephone exchange adapted to extend calls of one of four different origin types thereover including a local subscriber call, a toll call, an incoming ticketing call and a verification call, said link including conversation timing means for timing local subscriber calls, means for rendering said timing conversation effective with the establishment of a call not originating from a ticketing trunk; means for rendering the timing means ineffective on calls from toll operators; means for establishing a test conductor connection through the link with the extension of a verification call thereover, and discriminatory means for determining the origin of the call extended to the link and effecting the corresponding link operation comprising a pair of relays operative in combination to different predetermined positions in accordance with the nature of the call being received.

References Cited in the file of this patent

UNITED STATES PATENTS

| | | |
|---|---|---|
| 1,673,420 | Ostline | June 12, 1928 |
| 1,800,240 | Zoller | Apr. 4, 1931 |
| 1,962,619 | Rumpf | June 12, 1934 |
| 2,385,228 | Ostline | Sept. 18, 1945 |
| 2,426,981 | Blake | Sept. 9, 1947 |
| 2,486,722 | Stehlik | Nov. 1, 1949 |
| 2,586,704 | Ostline | Feb. 19, 1952 |